United States Patent
Yundt-Pacheco

(10) Patent No.: US 6,760,683 B2
(45) Date of Patent: Jul. 6, 2004

(54) METHOD OF EVALUATING PERFORMANCE OF A HEMATOLOGY ANALYZER

(75) Inventor: John C. Yundt-Pacheco, Fairview, TX (US)

(73) Assignee: Xyletech Systems, Inc., Plano, TX (US)

(*) Notice: Subject to any disclaimer, the term of this patent is extended or adjusted under 35 U.S.C. 154(b) by 0 days.

(21) Appl. No.: 10/365,928

(22) Filed: Feb. 13, 2003

(65) Prior Publication Data

US 2003/0120462 A1 Jun. 26, 2003

Related U.S. Application Data

(63) Continuation of application No. 09/625,121, filed on Jul. 25, 2000.

(51) Int. Cl.$^7$ .......................... G06F 15/30; G01N 37/00
(52) U.S. Cl. ......................................... 702/182; 702/81
(58) Field of Search ............................... 702/27, 30, 35, 702/81–84, 85, 86, 179, 180, 182–188; 714/736; 422/3, 119

(56) References Cited

U.S. PATENT DOCUMENTS

| | | | |
|---|---|---|---|
| 4,202,033 A | 5/1980 | Strobel | 436/183 |
| 4,848,154 A | * 7/1989 | Panzica | 73/493 |
| 4,858,154 A | 8/1989 | Anderson et al. | 702/81 |
| 5,532,941 A | * 7/1996 | Lin | 702/84 |
| 5,574,906 A | 11/1996 | Morris | 707/1 |
| 5,701,902 A | * 12/1997 | Vari et al. | 600/473 |
| 5,798,267 A | * 8/1998 | Harasymiw | 436/97 |
| 5,835,384 A | 11/1998 | Lin | 702/84 |
| 6,098,116 A | * 8/2000 | Nixon et al. | 710/8 |
| 6,142,017 A | 11/2000 | Glassey | 73/299 |

* cited by examiner

*Primary Examiner*—Marc S. Hoff
*Assistant Examiner*—Manuel L. Barbee
(74) *Attorney, Agent, or Firm*—J. David Wharton; Stinson Morrison Hecker LLP

(57) ABSTRACT

A method for evaluating the performance of an instrument, particularly a hematology analyzer, by comparing its operating data with data compiled from a group of like instruments is provided. The method contemplates collecting historical data which is deposited in a central database where it may be retrieved by any participating laboratory. The participating laboratory performs an analysis and then accesses the database to retrieve data obtained from comparable instruments performing like analyses. The comparative analysis is then conducted from which a determination may be made with regard to a particular instrument.

14 Claims, 9 Drawing Sheets

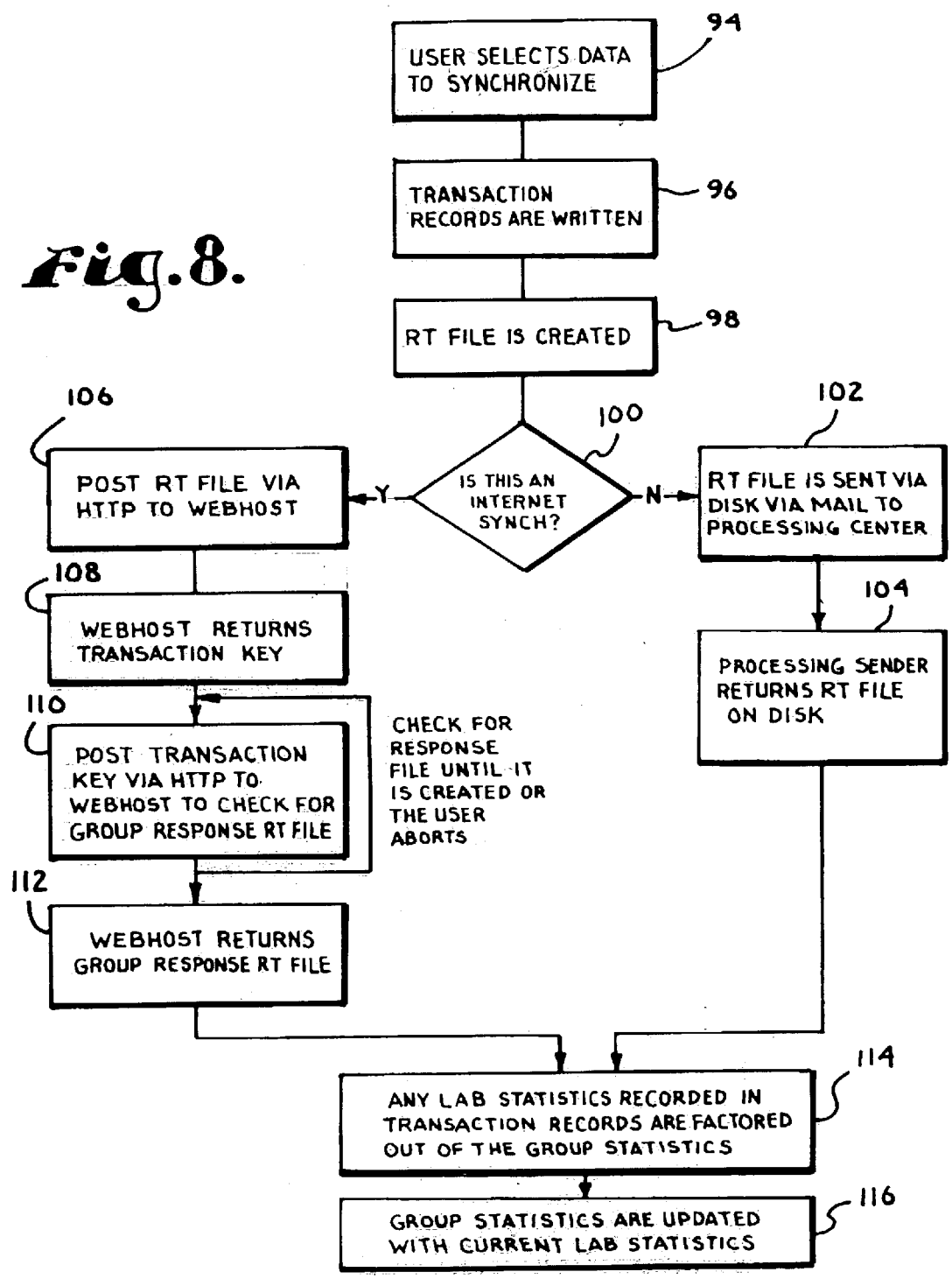

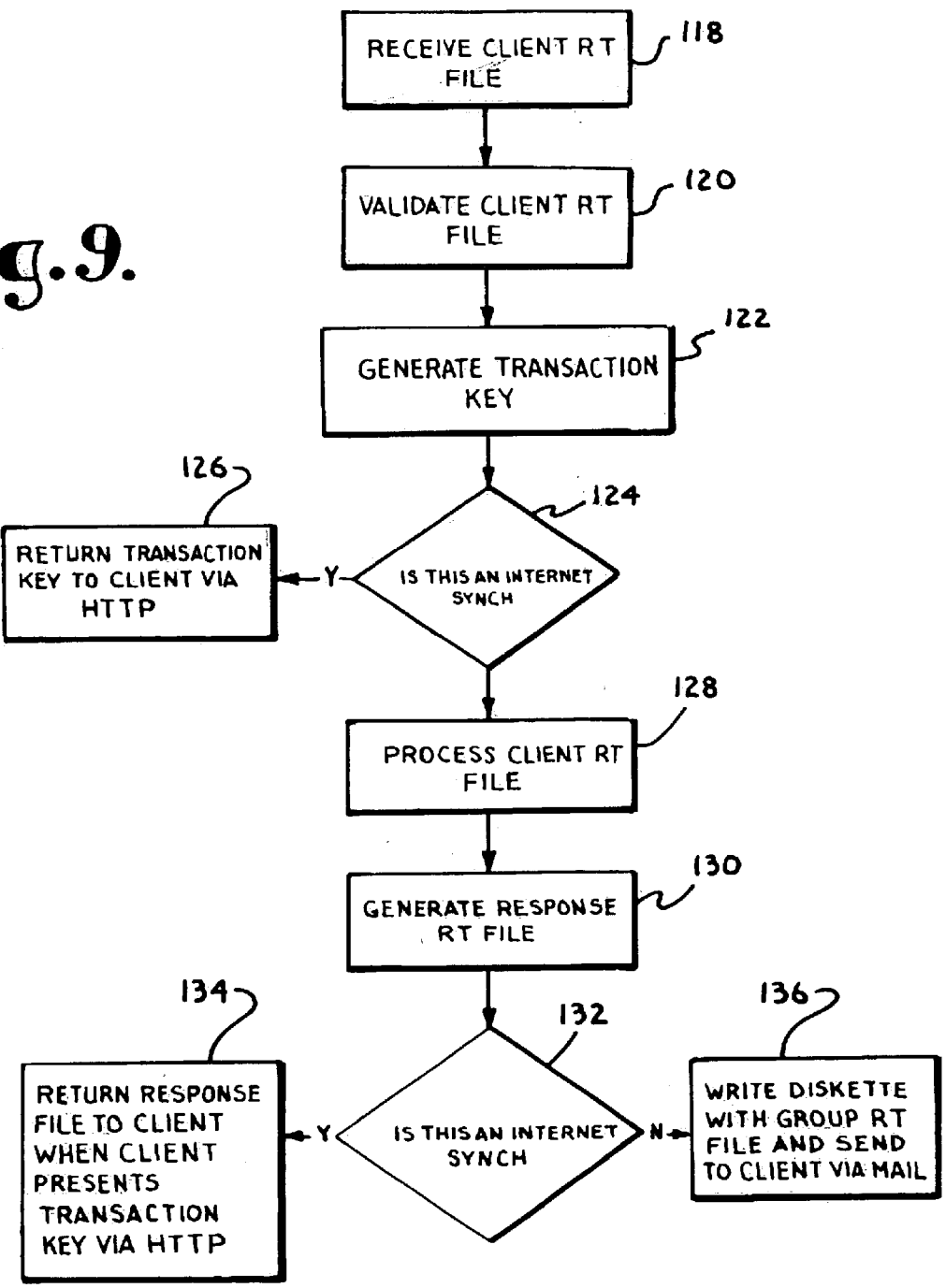

METHOD OF EVALUATING PERFORMANCE OF A HEMATOLOGY ANALYZER

CROSS-REFERENCE TO RELATED APPLICATIONS

This application is a Continuation of U.S. patent application Ser. No. 09/625,121, filed on Jul. 25, 2000, which is incorporated herein in its entirety.

STATEMENT REGARDING FEDERALLY SPONSORED RESEARCH OR DEVELOPMENT

Not Applicable.

BACKGROUND OF THE INVENTION

Quality control data is generated in the clinical laboratory by causing an analyzer to test known specimens (controls). Such data is typically gathered from a number of instruments all testing the same control substance. The data is then normally subjected to statistical analysis to determine if a particular analyzer is functioning properly, or "in control," prior to testing patient specimens. In many instances, United States federal law mandates daily testing of the analytical system prior to testing specimens from humans. Even when not required by law, daily evaluations of the analytical systems is considered to be proper laboratory practice.

One common method of statistical analysis is based on the mean and standard deviation of the data over time. If new data differs from historical data by a pre-determined statistical variation (e.g., three standard deviations from the mean), the analyzer may be malfunctioning.

Various rules have been developed for conducting a statistical analysis of the data. The so-called Westgard rules normally compare new data from an instrument in a particular laboratory against historical data from that same laboratory. However, analyzing only the data from the same instrument within the same laboratory, rather than from a comparable peer group working with different instruments in different laboratories, can cause a test to suggest an instrument is malfunctioning, when in fact it is not.

Under the Clinical Laboratory Improvement Act of 1988, laboratories testing certain analytes on human specimens are required to participate in a testing program in which a designated agency distributes blind samples to a group of participating laboratories. The results are tabulated and analyzed according to rules specified by government regulation. For example, the grading limits for glucose state that a participant laboratory must have a result falling within 6 mg/dL from the mean of the group or +−10% of the mean of the group, whichever is greatest. The grading limits under the federal regulations are generally more liberal than the Westgard rules because they are based to some degree on clinical significance of allowable error. In addition, the historical data used for comparative analysis is collected from a peer group of different analyzers in different laboratories, which is believed to be more reliable information than that selected from a single analyzer.

An inter-laboratory quality assurance program is disclosed in U.S. Pat. No. 4,858,154, which is incorporated herein by reference. Prior art systems for doing comparative analysis on inter-laboratory data have relied upon electronic data input from a number of laboratories to a central computer where the data is analyzed and a report is sent to the participating laboratory in either electronic or hard-copy form. The shortcomings of these prior art systems include the fact that there is normally a delay of anywhere from several days to weeks to obtain a report from the data processing center. By the time the report is received and there is an indication of malfunction of a particular analyzer, hundreds or thousands of specimens may have already been processed. Heretofore, there has been no procedure for a participating laboratory to input data and then synchronize their data with the historical data prior to analysis. It has also heretofore not been possible to obtain real time analysis to permit the laboratory to make an immediate determination of the reliability of a particular instrument.

A further shortcoming of the prior art has been that the participating laboratory which is coupled with a central data repository to select the most appropriate category of data for comparative analysis. For example, in some instances it may be preferable to make a comparative analysis with instruments in a particular geographic region, while in other instances it may be desirable to do the comparative analysis based upon a particular instrument model.

1. Field of the Invention

This invention relates to a method of comparative analysis between historical group data and current analytical data for the purpose of validating the operating accuracy of an instrument. In particular, the invention relates to a method of verifying the operating accuracy of hematology analyzers by comparing current data generated by testing a control substance with historical data collected from a group of similar analyzers testing the same control substance.

BRIEF SUMMARY OF THE INVENTION

It is therefore an object of the present invention to allow analysis of an instrument based on the federal regulations or the Westgard Rules for evaluating the data on an on-demand, rather than a periodic, basis.

It is therefore an object of the present invention to provide a method of evaluating the performance of an instrument by comparing operating data with historical data whereby the current data can be input to a global database prior to making the comparative analysis.

Another objective of this invention is to provide a method for evaluating the performance of an instrument by comparing operating data with historical data whereby the historical data may be accessed and retrieved prior to conducting the comparative analysis.

Another very important object of the invention is to provide a procedure for evaluating instrument performance by comparing operating data with historical data whereby the historical data is grouped into categories for comparative analysis and the evaluation procedure may include selecting a particular group of data for comparative analysis purposes.

Another one of the aims of the present invention is to provide a procedure for evaluating the performance of an instrument, particularly a hematology analyzer, wherein all of the procedural features set forth in the foregoing objectives are available instantaneously in real time by any participating laboratory.

Still another one of the objects of the invention is to provide a method of evaluating the performance of an instrument as set forth in the aims and objects preceding wherein each participating laboratory may communicate directly with the repository so that the historical database is continuously updated.

To accomplish these and other objectives, a user preferably begins by conducting an operation on a desired instrument and obtaining individual data from this operation. The user then stores the individual data in a client database on a client computer, such as a PC. The user also preferably stores in the client database rules for analyzing the data and a report capability to display the results of such analysis. The client computer is provided with a capability for transferring data, such as a modem providing access to the Internet, to exchange data with a global database on a server computer. Alternatively, such data transfer between the client database and the global database could occur via a diskette. The global database contains data generated by conducting a substantially identical operation on a group of like instruments.

The user selects desired attributes and the desired group data and then synchronizes to a desired extent the data in the client database with the data obtained from the global database. During synchronization, the data from the operation is transferred to a global database. Similarly, the local database can accept data from the global database corresponding to the user's selected instrument(s).

After synchronization, the local client database contains current statistical data concerning the peer-groups in which the laboratory is participating and other peer-groups of interest to the user. Using the client database, the user can then immediately perform desired statistical analyses, among other reasons, to set the group mean for analysis of the daily that data in accordance with federal regulations.

BRIEF DESCRIPTION OF THE DRAWINGS

In the accompanying drawings, which form a part of the specification and are to be read in conjunction therewith and in which like reference numerals are used to indicate like parts in the various views:

FIG. 8 is a flowchart illustrative of a software program for synchronizing data at a local client database with data at a webhosted database; and FIG. 9 is a flowchart illustrative of a software program for synchronizing data at a webhosted database with data at a local client database.

DETAILED DESCRIPTION OF EMBODIMENTS

The invention is preferably carried out in a data processing environment comprising a client computer containing a client database, a server computer containing a global database and a capability for data transfer between the client computer and the server computer. The client computer is preferably a personal computer (PC) or similar unit. The client database is preferably programmed using a commercially available database software, such as Microsoft Access, although other software having a data management capability could be used. As will be understood by those skilled in the art, the client database is preferably programmed to allow a user to easily carry out the necessary data management, such as inputting data, and statistical operations. Such programming could be achieved using Borland's Delphi 4 language, the C++ language or the Java language.

The global computer is preferably a Unix web server class computer containing the global database, which is preferably implemented using the Microsoft SQL or the Oracle database program. The global database preferably is stored on an Internet web server having an application server software, such as Oracle Application Server, Windows DNA or Netscape Application Server. An important requirement of the global server is that it have a relational database software and a Web connection software.

The data transfer capability is preferably a communication link implemented using a high-speed Internet connection, although standard analog telephone Internet connections can suffice. Alternatively, the global server and client computer are capable of exchanging data stored by using a standard diskette.

Figure 1:
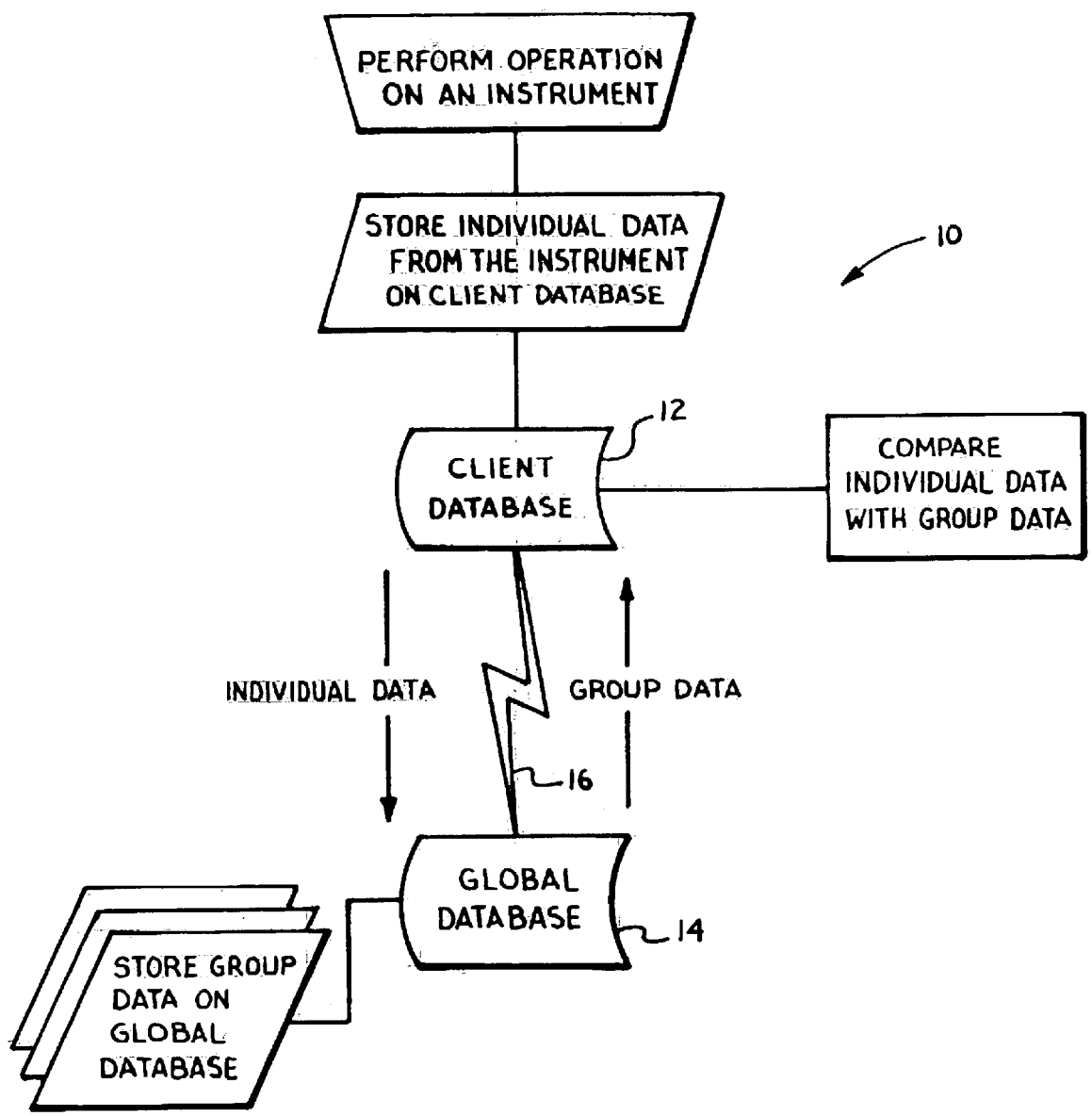
FIG. 1 is a flowchart overview of the invention showing a single client computer and client database.

With reference initially to FIG. 1, a flow diagram illustrative of the present invention is illustrated generally by the reference numeral 10. As illustrated, this embodiment of the present invention necessitates a client data base 12 and a global data base 14 connectable via a communications network, indicated by reference numeral 16. The local client database 12 maintains QC (Quality Control) data that has originated from the lab, peer-group data that has been transmitted from the webhost, rules on how to analyze the QC data, the necessary auxiliary records for maintaining the system (i.e. instrument, test, and unit records, access times, etc.) and has the ability to produce various statistical summaries of groupings of data dynamically; i.e., the QC data mean for a set of analytes for a defined time range.

The global database 14 (or webhost) maintains the QC data from the local clients and has the ability to produce various statistical summaries of groupings of the data dynamically; i.e., the mean of all clients from a definable geographical region for a set of analytes for a defined time range.

The Local QC Network Client has the ability to import local QC data from the LIS and can synchronize with the Global QC Network database on demand. Upon synchronization, the global system receives any new or modified data from the client system since the last synchronization. The global system then updates its group statistical summaries and transmits the summarized group data to the requesting client along with any new or modified auxiliary records for system maintenance information that need to be distributed. This propagates the global QC database to the client each time synchronization occurs.

After synchronization, the local client database contains current statistical summaries of the peer-groups that the laboratory is participating in and other peer-groups that the laboratory has expressed an interested in. These statistical summaries may then be used, among other things, to set the group mean for analysis of the daily QC data with the CLIA '88 rules.

The local client system has extensive data analysis capabilities. It allows the user to define two statistical blocks of data (stat block A and stat block B) to be analyzed where a statistical block has the following selection criterion:

Identity: either an instrument in this laboratory or a group of instruments in this laboratory, the laboratories in a user definable specific peer-group, the laboratories in a country, or all the laboratories in the world.

Time Frame: a specification can be made of the time frame over which to look at the data.

Shift: when the identity is an instrument in the client laboratory or a group of instruments, a specification can be made to select work shift or combine the data derived from all work shifts.

Peer-Group Type: data can be combined with:
a specific instrument, test, method, and reagent,
a specific instrument and test without regard to method and reagent,
a specific instrument, test and method without regard to reagent,
a test and method without regard to instrument or reagent,
a test and reagent without regard to instrument or method
a test without regard to instrument, method or reagent.

In each instance of instrument, the user may specify a class of instruments, which behave in a similar fashion.

Once the statistical blocks are defined, the system can produce a statistical analysis of the selected data including: number of points in the data set, mean of the data set, median of the data set, standard deviation of the data set, coefficient of variation of the data set, the standard deviation index of 1 statistical block in reference to the other, the coefficient of variation index of 1 statistical block in reference to the other.

The data can also be plotted using Levey-Jennings plots, Youden Plots, or Yundt Plots, with the frame of reference being able to be changed from stat block A to stat block B.

Accordingly, this approach embodies the following aspects of the invention:

1) The group data is available in a local database for manipulation and analysis.

2) The group data is collected electronically from the participant laboratories through the synchronization process.

3) The group data can be refreshed upon demand.

4) The group data can be used in the analysis of daily QC for bias and relative imprecision.

5) The daily QC data can be plotted against the group data dynamically in a variety of ways (against a given timeframe, with different types of plots).

6) The ability to compare to group data in real time gives the laboratorian the only means of knowing he/she is in compliance with the regulatory requirements of CLIA at any time the instrument is operational.

7) The group which is defined by the user can be modified dynamically.

Figure 2:
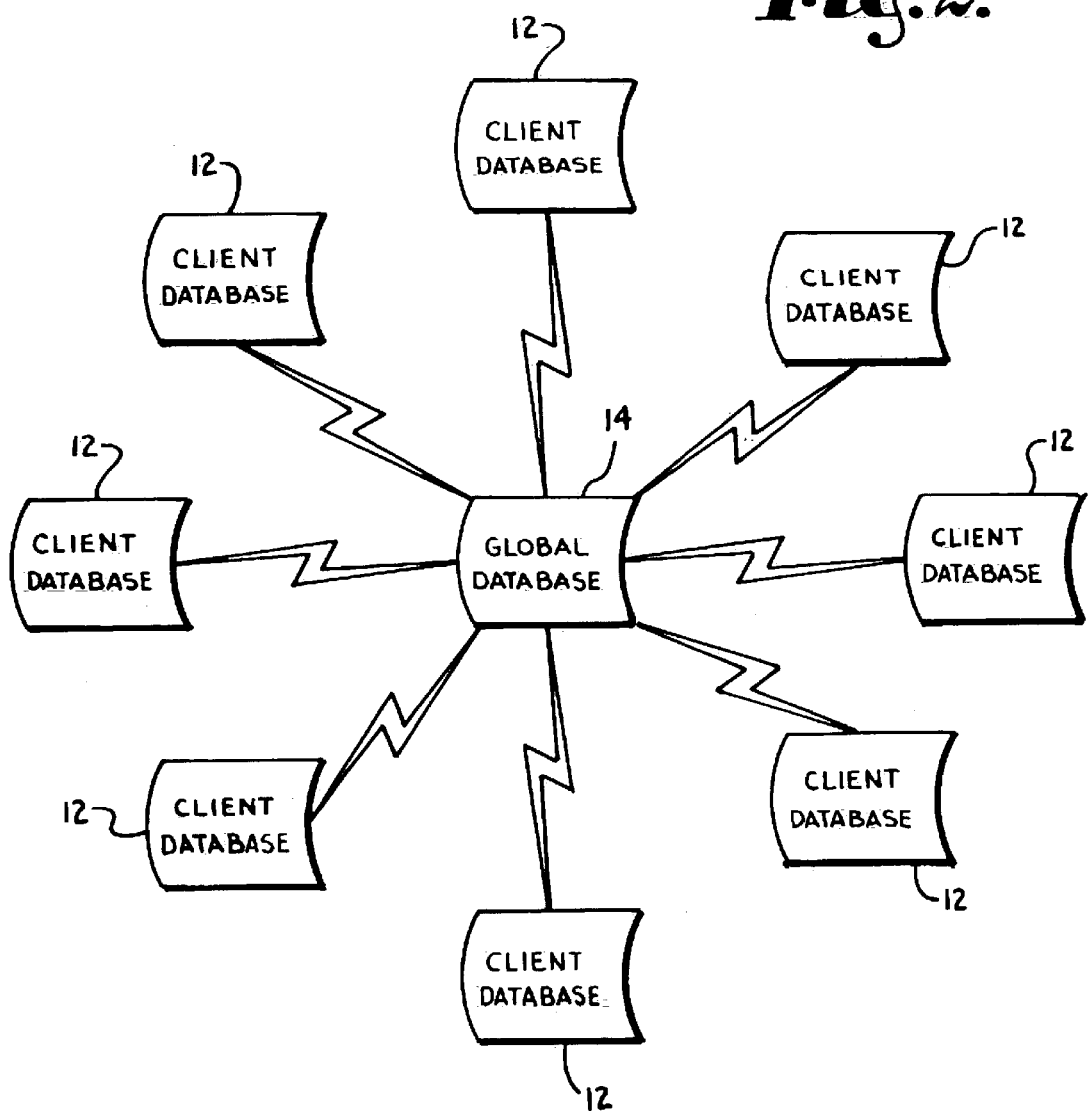
FIG. 2 is a flowchart of the invention illustrating multiple client computers in communication with the global database.

With reference now to FIG. 2, a schematic representation of an overall system according to the present invention is illustrated. In particular, a plurality of client data bases 12 are connected to global data base 14. As will be understood and appreciated, statistical analyses are performed based upon input from each of the plurality of client data bases 12.

Figure 3:
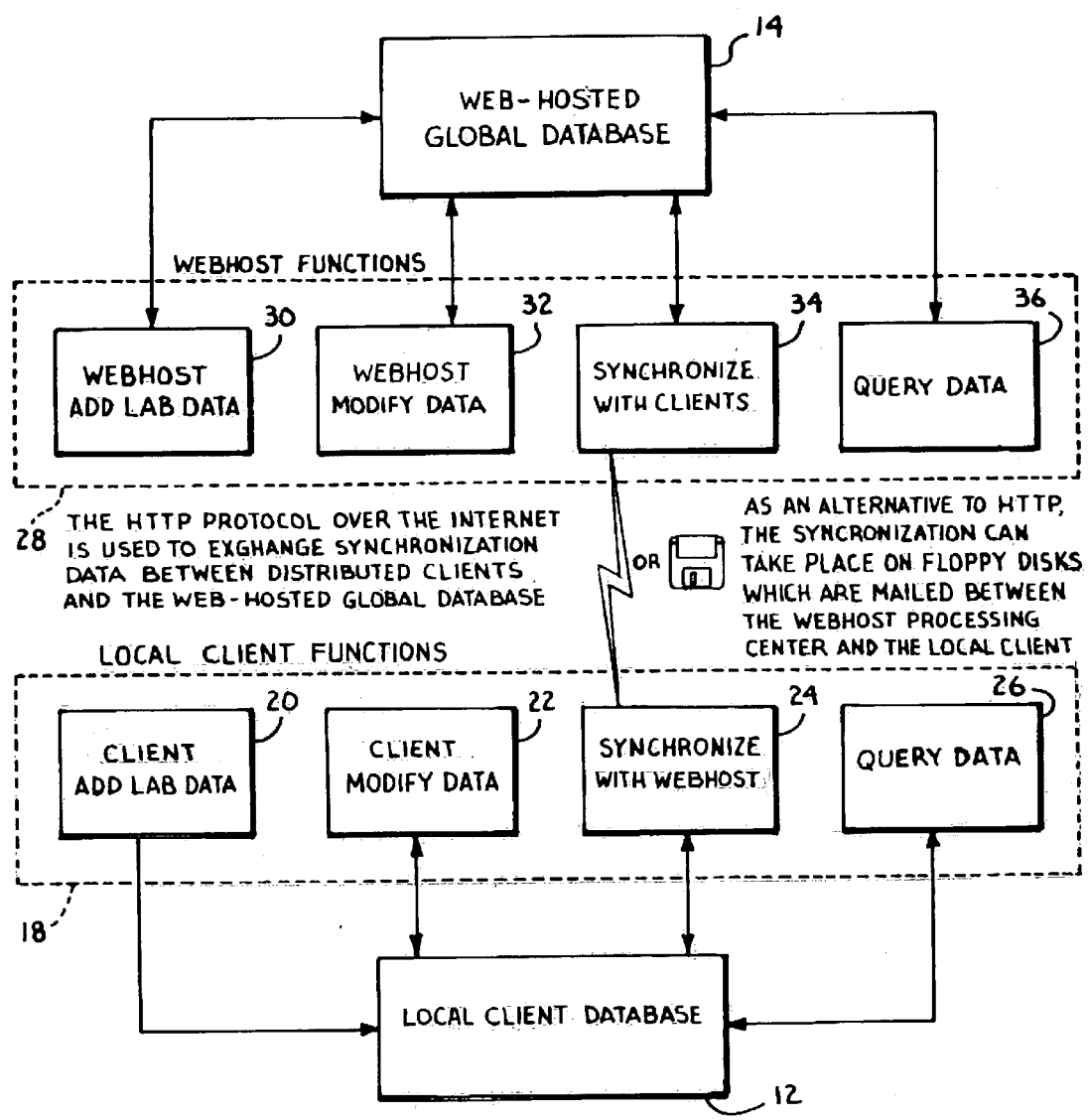
FIG. 3 is a detailed block diagram illustrative of the Quality Control network and system of the present invention.

With reference to FIG. 3, a more detailed block diagram indicative of the present invention and, particularly, indicative of the distributed quality control at work functionality principles of the present invention, local client functions are indicated generally within box 18. As illustrated, these functions include a "Client Add Lab Data" function which permits the client to add data to the local client data base, as indicated at reference numeral 20, a "Client Modified Data" function, indicated by reference numeral 22, which permits the local client to modify data in the local client data base, a synchronize with webhost function, indicated at reference numeral 24, which permits data in the local client data base 12 to be synchronized with data in the webhost global data base 14, and a query data function, indicated at step 26, permitting the local client to query data in the local data base.

As also illustrated, those functions within the box 28 are carried out at the host server for the global data base 14. In particular, web host functions include a "Webhost Add Lab Data" function, indicated by reference numeral 30, a "Webhost Modify Data" function indicated by reference numeral 32, a "Synchronize With Clients" function indicated by reference numeral 34, and a "Query Data" function indicated by reference numeral 36.

With reference now to FIGS. 4–9, each of the functions indicated by reference numerals 20, 22, 24, and 30, 32 and 34 are illustrated and described in detail.

Figure 4:
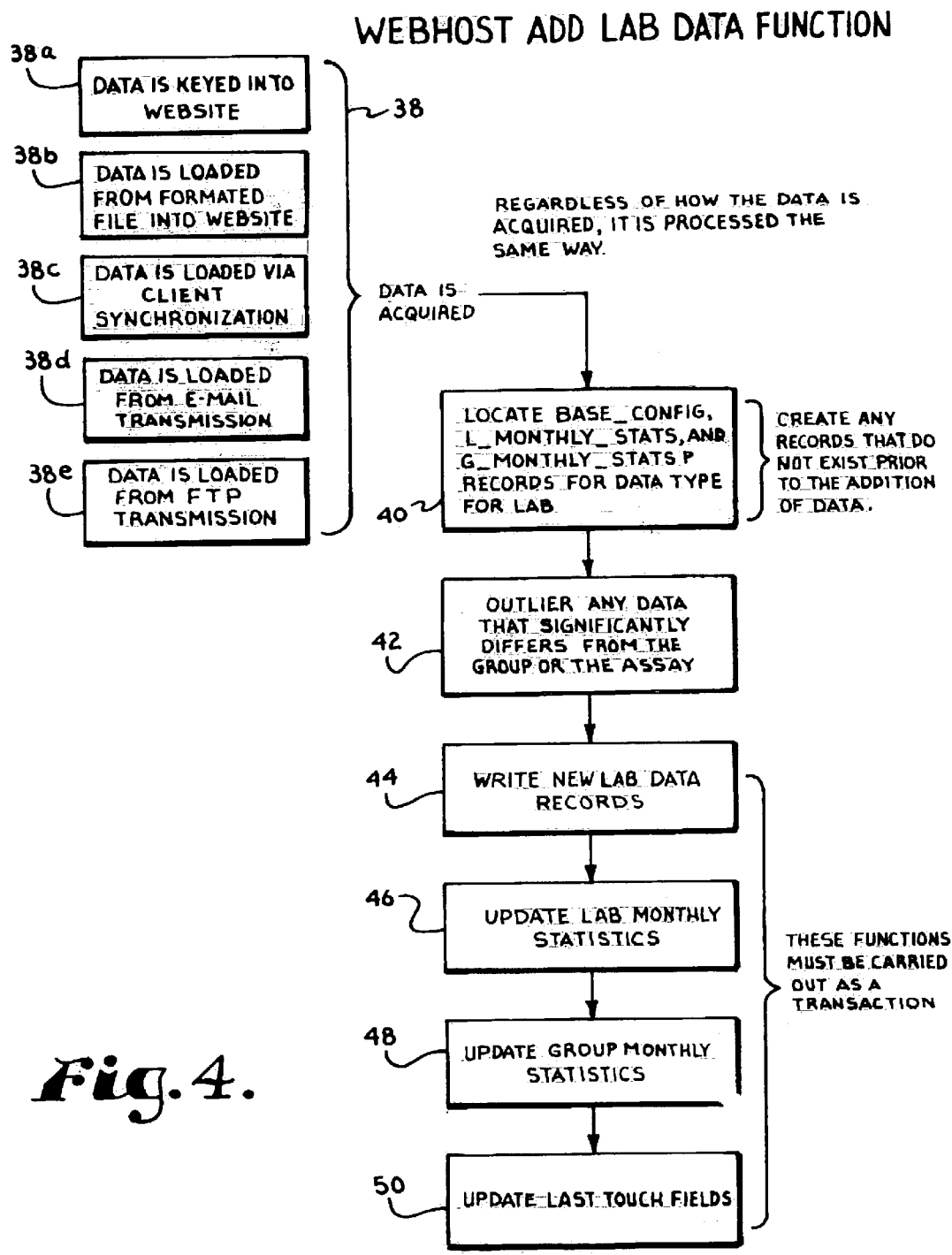
FIG. 4 is a flowchart illustrative of a software program for adding laboratory data to a webhosted database.

In particular, with reference to FIG. 4, the "Webhost Add Lab Data" function 30 is illustrated and described. As indicated generally by reference numeral 38, lab data to be added to the webhosted global data base 14 is acquired. Acquisition of this data may be made in a number of ways, such as entering the data into the website through a keypad, as indicated at reference numeral 38a, loading the data from a formatted file onto the website, as indicated by reference numeral 38b, loading the data directly from the local client database utilizing client synchronization as indicated at reference numeral 38c, loading the data from an e-mail transmission, as indicated at step 38d, or loading the data from an FTP transmission, as indicated at step 38e.

Regardless of how the data is acquired, it is processed in the same way. In particular, as indicated at step 40, records necessary for processing the acquired data are located or, if non-existent, created. As indicated at step 42, any data that significantly differs from the group or the assay, based upon a comparison performed at the web host server, is outliered. Then, as indicated at step 44, new lab data records, based upon the acquired data, are written. Lab monthly statistics are then updated, as indicated at step 46. Group monthly statistics are then updated as indicated at step 48, and last touch fields are updated as indicated at step 50. It will be understood and appreciated that the time period other than monthly may be programmed.

Figure 5:
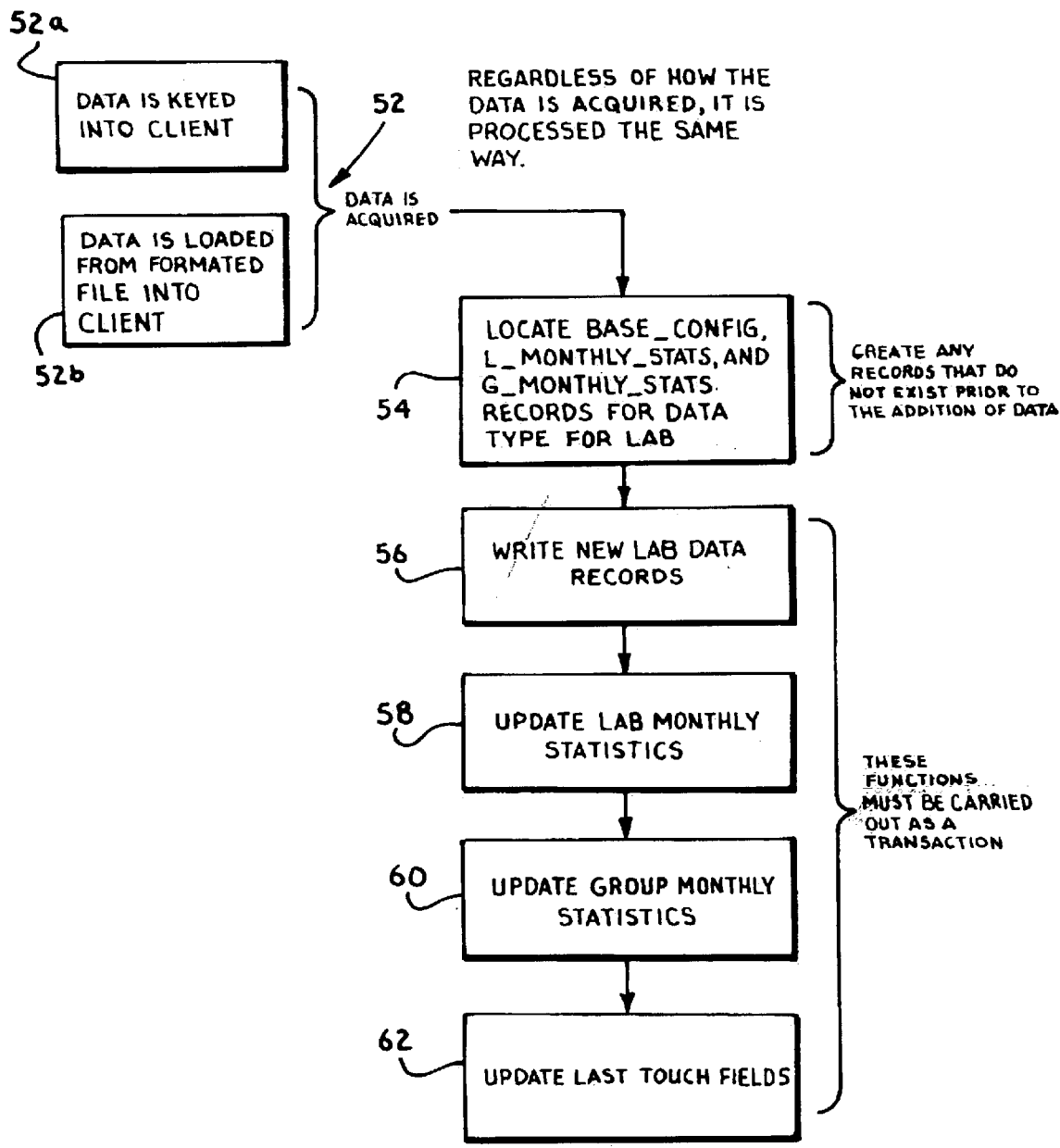
FIG. 5 is a flowchart illustrative of a software program for adding laboratory data to a local client database.

As illustrated in FIG. 5, the "Client Add Lab Data" function 20 is illustrated and described. As illustrated at step 52, data is acquired. Data may be acquired by keying the data into the client data base 12, as indicated at step 52*a*, or may be loaded from a formatted file into the client, as indicated at step 52*b*. It will be understood and appreciated that various ways of acquiring data are contemplated and within the scope of the present invention. Regardless of how the data is acquired, it is processed in the same way. In particular, as indicated at step 54, those records necessary for processing the data are located or, if non-existent, created. The new lab data records are then written, as indicated at step 56, the monthly statistics (e.g., lab and group) are updated based upon the added data as indicated at steps 58 and 60, respectively, and the last touch fields are updated as indicated at step 62.

Figure 6:
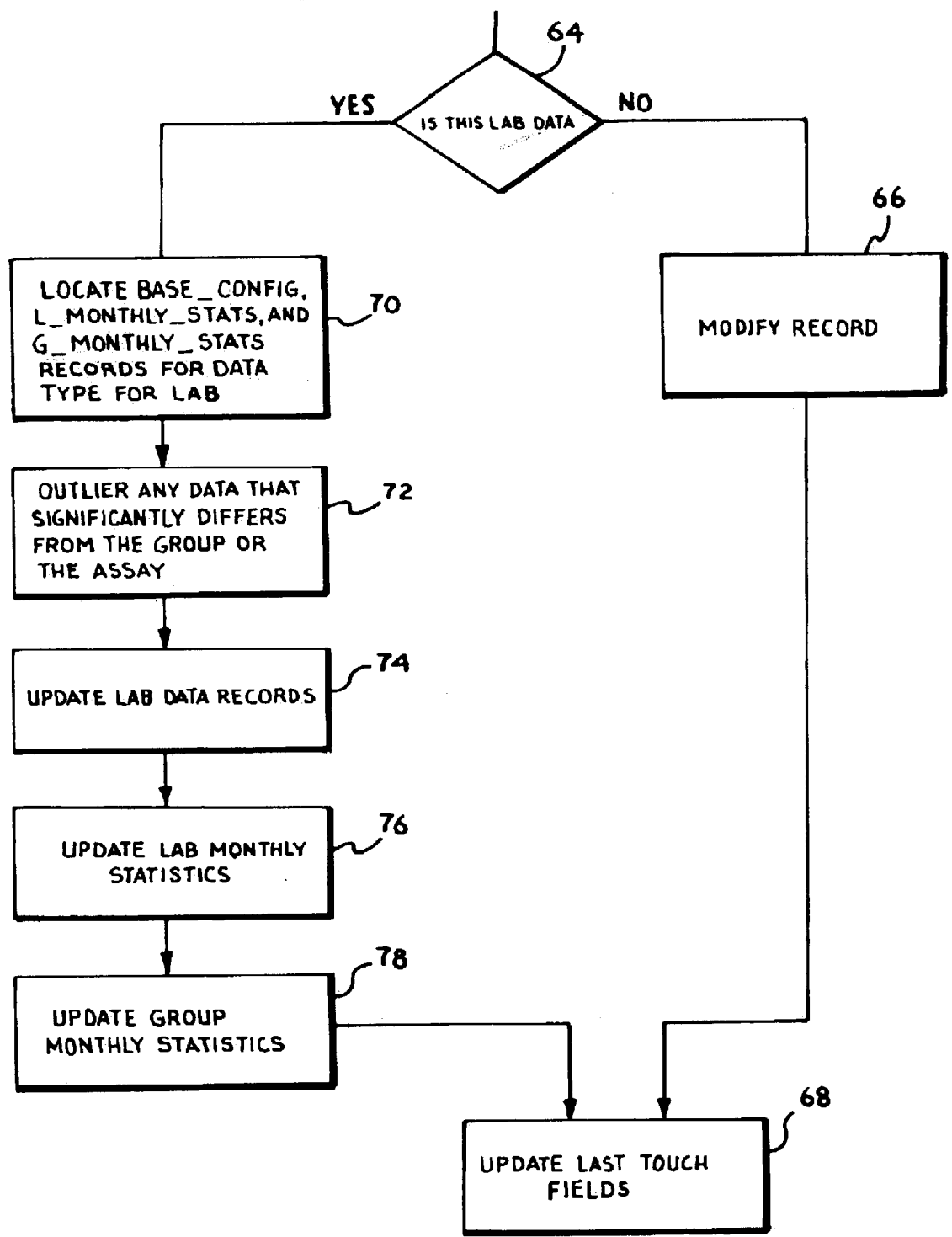
FIG. 6 is a flowchart illustrative of a software program for modifying data acquired at a webhosted database.

With reference now to FIG. 6, the "Webhost Modify Data" 32 is illustrated and described. In particular, the server at the webhost determines whether the data is data from a lab, as indicated at reference numeral 64. In the event the data is not lab data, a corresponding record is modified as indicated at step 66, and the last touch fields are updated as indicated at step 68. However, when the webhost server determines that the lab data is lab data, at step 64, processing advances to step 70, where the necessary records are located or created. Processing then advances through steps 72, 74, 76 and 78 where, correspondingly, any data that significantly differs from the group or the assay is outliered, and the lab data records, lab monthly statistics, and group monthly statistics are updated. Processing then advances to step 68 where the last touch fields are updated.

Figure 7:
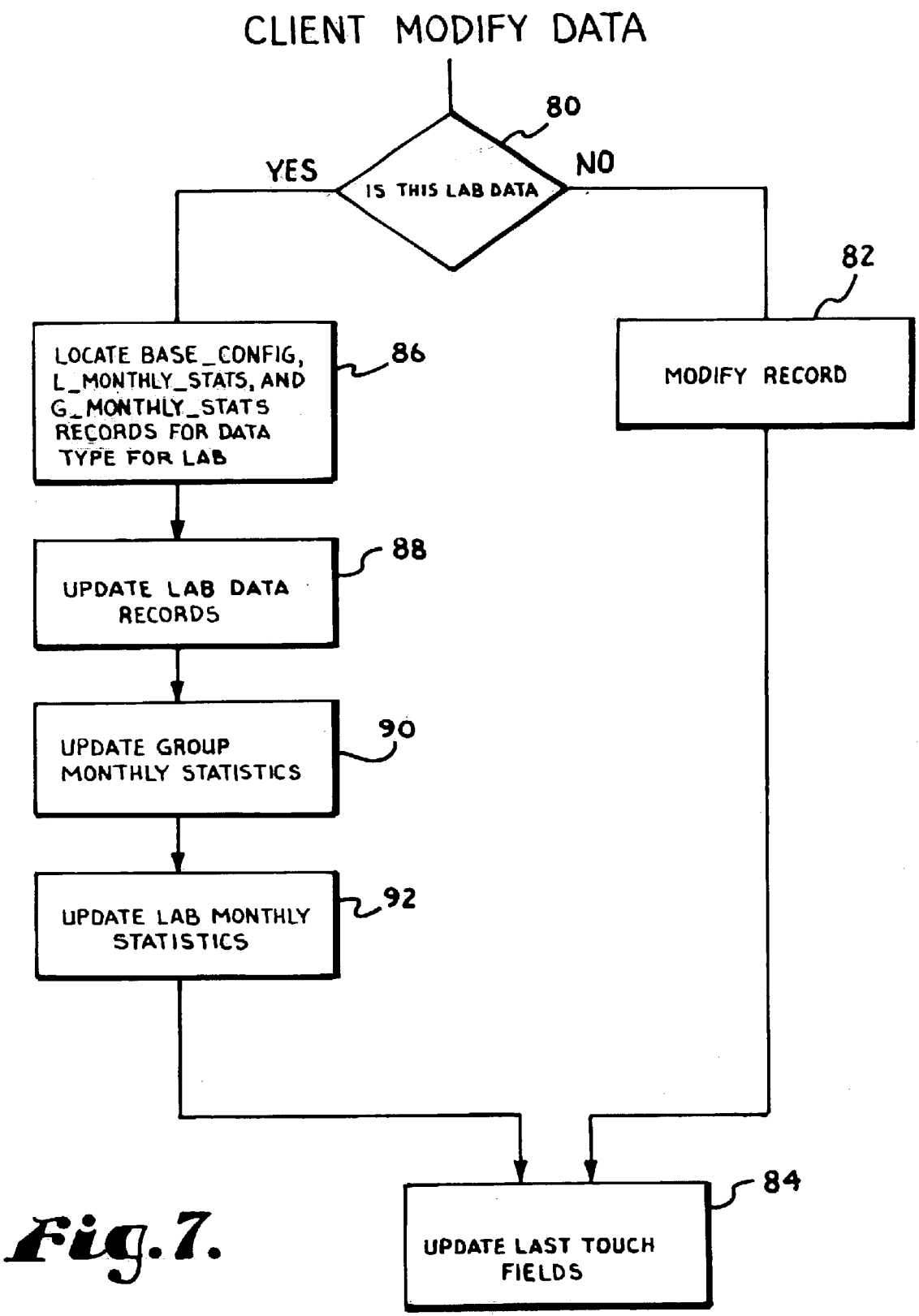
FIG. 7 is a flowchart illustrative of a software program for modifying data at a local client database.

With reference now to FIG. 7, the "Client Modify Data" function 22 is illustrated and described. In particular, the local client server determines at step 80 whether the data is lab data. When it is determined that the data is not lab data, a corresponding record is modified, as indicated at step 82, and the last touch fields are then updated as indicated at step 84. However, when it is determined at step 80 that the data is lab data, processing advances to step 86, at which the necessary records are retrieved or created. Processing then advances to step 88, at which lab data records are updated, to step 90, at which group monthly statistics are updated, and to step 92, at which lab monthly statistics are updated. Processing then advances to step 84 where the last touch fields are updated.

With reference now to FIG. 8, the "Client Synchronize Webhost" function 24 is illustrated and described. In particular, utilizing an input, a user selects data at the local client database 12 to synchronize, as indicated at step 94. At step 96, transaction records are written. At step 98, an RT file is created. At step 100, a determination is made whether local client server is synchronized via an Internet connection with the processor hosting the global database 14. In the event there is no such Internet synchronization, processing advances to step 102, so that the RT file may be sent via a disk through the mail to the processing center. Processing then advances at step 104, at which the processing center returns a group response RT file on the disk (including the processed data updates) to the local client.

When, however, it is determined at step 100 that an Internet synchronization is in place, processing advances to step 106 so that the RT file may be transmitted to the global data base 14 via an Internet protocol. Processing then advances to step 108 at which the web host processing center returns a transaction key to the local client. At step 110, the client sends a post transaction key back to the website to check for a group response RT file. This check is continued periodically until the group response RT file is located, or until the user aborts the process. Assuming the process is not aborted by the user, once the group response RT file is located, the webhost processing center returns the group RT file to the local client, as indicated at step 112. Following step 104 or step 112, as the case may be, processing advances to step 114, at which any lab statistics recorded in the transaction records are factored out of the group statistics. Processing then advances to step 116, at which group statistics are updated with current laboratory statistics.

With reference now to FIG. 9, the "Webhost Synchronize With Client" function 34 is illustrated and described. In particular, at step 118, the webhost processing center receives the client RT file. The webhost server then validates the client RT file as indicated at step 120. The transaction key, described in FIG. 8, is generated as indicated at step 122. At step 124, a determination is made whether there is an Internet synchronization between the webhost processor and the processor at the local client. In the event there is such an Internet synchronization, the transaction key is returned to a client via an Internet protocol, as indicated at step 126. If not, the transaction key must be turned in a more traditional manner. As indicated at step 128, the webhost server processes the client RT file. At step 130, the webhost server generates a response RT file. As indicated at steps 132, 134, and 136, in the event there is an Internet synchronization between the webhost server and the local client processor, the response file is returned to the client when the client presents the transaction key via an Internet communication. When, however, there is no such Internet synchronization, the response file is to the client via mail on a diskette.

The following software code corresponds to the previously described function blocks 20, 22, and 24, and 30, 32, and 34, as indicated by the various headings throughout the code.

From the foregoing it will be seen that this invention is one well adapted to attain all ends and objects hereinabove set forth together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

Webhost Add Lab Data and Modify Data Functions

Here is the PL-SQL Code for the Webhost Add Lab Data and Modify Data functions:

First, we locate or create the Base_Config, L_Monthly_Stats, and G_Monthly_Stats records.

```
-- Find the specified base_config, create if necessary.
FUNCTION GetCreateBaseConfig(
cTestCode  test.code%TYPE ,
cLotNumber  lot.lot_number%TYPE ,
cInstCode  instrument.code%TYPE ,
cReagCode  reagent.code%TYPE,
cMthCode  method.code%TYPE
)
RETURN INTEGER IS
  iBCId base_config.id%TYPE;

CURSOR bc_cursor IS
    SELECT id
    FROM base_config
    WHERE test_code = cTestCode
    AND lot_number = cLotNumber
    AND inst_code = cInstCode
    AND NVL(meth_code,'0') = NVL(cMthCode,'0')
    AND NVL(reag_code,'0') = NVL(cReagCode,'0');
  bc_rec bc_cursor%ROWTYPE;
BEGIN
  OPEN bc_cursor;
  FETCH bc_cursor INTO bc_rec;
  IF bc_cursor%FOUND THEN
    CLOSE bc_cursor;
    iBCId := bc_rec.id;
  ELSE
    CLOSE bc_cursor;

INSERT INTO base_config
    (test_code, inst_code, lot_number, reag_code, meth_code, last_touch)
    VALUES
    (cTestCode, cInstCode, cLotNumber, cReagCode, cMthCode, sysdate);

OPEN bc_cursor;
    FETCH bc_cursor INTO bc_rec;
    iBCId := bc_rec.id;
    CLOSE bc_cursor;

END IF;
```

```
  RETURN(iBCId);
END;
--

-- Find the specified GMS record, create if necessary
FUNCTION GetCreateGMS(
iCntryId  country.id%TYPE ,
iBCId  base_config.id%TYPE ,
dMonth  DATE )
RETURN INTEGER IS
   iGMSId g_monthly_stats.id%TYPE;

CURSOR gms_cursor IS
      SELECT id
      FROM g_monthly_stats
      WHERE NVL(country_id,0) = NVL(iCntryId,0)
      AND bcfg_id = iBCId
      AND rep_month = dMonth;
   gms_rec gms_cursor%ROWTYPE;

CURSOR prevgms_cursor IS
      SELECT id, cum_num_pts, cum_mean, cum_sd
      FROM g_monthly_stats
      WHERE NVL(country_id,0) = NVL(iCntryId,0)
      AND bcfg_id = iBCId
      AND rep_month < dMonth
      ORDER BY rep_month DESC;
   prevgms_rec prevgms_cursor%ROWTYPE;
BEGIN
   OPEN gms_cursor;
   FETCH gms_cursor INTO gms_rec;
   IF gms_cursor%FOUND THEN
      CLOSE gms_cursor;
      iGMSId := gms_rec.id;
   ELSE
      CLOSE gms_cursor;

OPEN prevgms_cursor;
      FETCH prevgms_cursor INTO prevgms_rec;
      IF prevgms_cursor%NOTFOUND THEN
         INSERT INTO g_monthly_stats (country_id, bcfg_id, rep_month)
         VALUES (iCntryId, iBCId, dMonth);
      ELSE
         INSERT INTO g_monthly_stats (country_id, bcfg_id, rep_month,
            cum_num_pts, cum_mean, cum_sd)
         VALUES (iCntryId, iBCId, dMonth, prevgms_rec.cum_num_pts,
            prevgms_rec.cum_mean, prevgms_rec.cum_sd);
      END IF;
```

```
    CLOSE prevgms_cursor;

OPEN gms_cursor;
    FETCH gms_cursor INTO gms_rec;
    iGMSId := gms_rec.id;
    CLOSE gms_cursor;
  END IF;

RETURN(iGMSId);
END;
--

-- Find the specified LMS record, creating if necessary
FUNCTION GetCreateLMS(
iLabId   lab.id%TYPE ,
iShift IN l_monthly_stats.shift%TYPE ,
iUnitId   unit.id%TYPE ,
cInstSer   inst_list.inst_ser%TYPE ,
iBCId   base_config.id%TYPE ,
dMonth  DATE )
RETURN INTEGER IS
  iLMSId l_monthly_stats.id%TYPE;

CURSOR lms_cursor IS
    SELECT id
    FROM l_monthly_stats
    WHERE lab_id = iLabId
    AND inst_ser = cInstSer
    AND shift = iShift
    AND bcfg_id = iBCId
    AND unit_id = iUnitID
    AND rep_month = dMonth;

CURSOR lms_cur IS
    SELECT *
    FROM l_monthly_stats
    WHERE lab_id = iLabId
    AND inst_ser = cInstSer
    AND shift = iShift
    AND bcfg_id = iBCId
    AND unit_id != iUnitID
    AND rep_month = dMonth;

lms_rec lms_cursor%ROWTYPE;
lms_rec1 lms_cur%ROWTYPE;

CURSOR prevlms_cursor IS
    SELECT id, cum_num_pts, cum_mean, cum_sd
```

```
    FROM l_monthly_stats
    WHERE lab_id = iLabId
    AND shift = iShift
    AND inst_ser = cInstSer
    AND bcfg_id = iBCId
    AND rep_month < dMonth
    ORDER BY rep_month DESC;

prevlms_rec prevlms_cursor%ROWTYPE;
BEGIN

OPEN lms_cursor;
  FETCH lms_cursor INTO lms_rec;
  IF lms_cursor%FOUND THEN
     CLOSE lms_cursor;
     iLMSId := lms_rec.id;
  ELSE
     CLOSE lms_cursor;

OPEN lms_cur;
     FETCH lms_cur INTO lms_rec1;
     IF lms_cur%FOUND and nvl(lms_rec1.mtd_num_pts,0) = 0 THEN
         update l_monthly_stats set
             unit_id = iUnitId
         WHERE lab_id = iLabId
         AND inst_ser = cInstSer
         AND shift = iShift
         AND bcfg_id = iBCId
         AND rep_month = dMonth;
         iLMSId := lms_rec1.id;
         CLOSE lms_cur;
     else OPEN prevlms_cursor;
         FETCH prevlms_cursor INTO prevlms_rec;
         IF prevlms_cursor%NOTFOUND THEN INSERT INTO l_monthly_stats (lab_id, shift, unit_id,
inst_ser, bcfg_id, rep_month)
             VALUES (iLabId, iShift, iUnitId, cInstSer, iBCId, dMonth);
         ELSE INSERT INTO l_monthly_stats (lab_id, shift, unit_id,
inst_ser, bcfg_id, rep_month,
             cum_num_pts, cum_mean, cum_sd)
             VALUES (iLabId, iShift, iUnitId, cInstSer, iBCId, dMonth,
prevlms_rec.cum_num_pts,
             prevlms_rec.cum_mean, prevlms_rec.cum_sd);
```

```
   END IF;
   CLOSE prevlms_cursor;

OPEN lms_cursor;
   FETCH lms_cursor INTO lms_rec;
   iLMSId := lms_rec.id;
   CLOSE lms_cursor;

end if;
  END IF;

RETURN(iLMSId);
END;
--
--
-- Create any dependent records for the lab_data record
FUNCTION PrepWriteLD(
cTestCode IN test.code%TYPE ,
cLotNumber IN lot.lot_number%TYPE ,
cInstSer  IN inst_list.inst_ser%TYPE ,
cInstCode IN instrument.code%TYPE ,
cReagCode IN reagent.code%TYPE ,
cMthCode IN method.code%TYPE ,
iLabId IN lab.id%TYPE ,
iShift IN l_monthly_stats.shift%TYPE ,
iUnitId IN unit.id%TYPE ,
dDateTime IN DATE )
RETURN INTEGER IS
   --
   --
   iCntryId COUNTRY.ID%TYPE;
   --
   --
   iBCId BASE_CONFIG.ID%TYPE;
   --
   --
   iLMSId L_MONTHLY_STATS.ID%TYPE;
   --
   --
   iGMSId G_MONTHLY_STATS.ID%TYPE;
BEGIN
   SELECT country_id
   INTO iCntryId
   FROM lab
   WHERE id = iLabId;

/* Get bc_id, Create if not exists */
   iBCId := GetCreateBaseConfig(cTestCode, cLotNumber, cInstCode,
```

```
  cReagCode, cMthCode);

iLMSId := GetCreateLMS(iLabId, iShift, iUnitId, cInstSer, iBCId,
FIRST_DAY(dDateTime));
--htp.p(ilmsid);

iGMSId := GetCreateGMS(iCntryId, iBCId, FIRST_DAY(dDateTime));
    iGMSId := GetCreateGMS(NULL, iBCId, FIRST_DAY(dDateTime));
    RETURN(iLMSId);
  END;
```

Next, the Data Outliering, Writing/Updating Lab Data Records, and Updating Lab Statistics are done:

```
/*This is the function called to insert or update lab data in the
database. It also calls UpdateGroupData. SetLabData updates the lab
month and cumulative statistics. It outliers in
real-time. */

PROCEDURE SetLabData(
  iLMSId IN INTEGER,
  dRepDateTime IN DATE,
  iNumPts IN INTEGER,
  nMean IN NUMBER,
  nInSD IN NUMBER,
  cOpcode IN VARCHAR2,
  cInOutliered IN VARCHAR2 DEFAULT 'N')
IS
  iGMSId INTEGER;
  iBCId INTEGER;
  iLabId INTEGER;
  iCntryId INTEGER;
  iUnitId INTEGER;
  dLDDate DATE;
  nConvFactor NUMBER;
  nSD NUMBER;
  iDeltaOutliered INTEGER;
  dCurrDate DATE;
  cOutliered VARCHAR2(1);
  bcfg_rec base_config%rowtype;

CURSOR lmsc_cursor (iLabId lab.id%TYPE,
      iBCId base_config.id%TYPE, dMonth DATE, cInstSer
inst_list.inst_ser%TYPE,
      iShift l_monthly_stats.shift%TYPE) IS
    SELECT *
    FROM l_monthly_stats
    WHERE lab_id = iLabId
    AND inst_ser = cInstSer
    AND bcfg_id = iBCId
    AND shift = iShift
    AND rep_month > dMonth
    FOR UPDATE;

lmsc_rec lmsc_cursor%ROWTYPE;
  lms_rec l_monthly_stats%ROWTYPE;
  gms_rec g_monthly_stats%ROWTYPE;
```

```
    CURSOR ld_cursor IS
      SELECT *
      FROM lab_data
      WHERE lms_id = iLMSId
      AND rep_date_time = dRepDateTime
      FOR UPDATE;
    ld_rec ld_cursor%ROWTYPE;
BEGIN
  dLDDate := TRUNC(dRepDateTime);
  cOutliered := cInOutliered;
  IF iNumPts = 0 THEN
    nSD := NULL;
  ELSE
    nSD := nInSD;
  END IF;

SELECT *
  INTO lms_rec
  FROM l_monthly_stats
  WHERE id = iLMSId;

SELECT TRUNC(SYSDATE)
  INTO dCurrDate
  FROM dual;

iBCId := lms_rec.bcfg_id;
  iLabId := lms_rec.lab_id;
  iUnitId := lms_rec.unit_id;

iDeltaOutliered := 0;

SELECT conv_factor
  INTO nConvFactor
  FROM unit
  WHERE id = iUnitId;

SELECT country_id
  INTO iCntryId
  FROM lab
  WHERE id = iLabId;

LOCK TABLE g_monthly_stats, g_rolling_stats
  IN SHARE ROW EXCLUSIVE MODE;

SELECT *
  INTO gms_rec
  FROM g_monthly_stats
```

```
WHERE bcfg_id = iBCId
AND rep_month = FIRST_DAY(dLDDate)
AND country_id IS NULL;
gms_rec.cum_mean := gms_rec.cum_mean / nConvFactor;
gms_rec.cum_sd := gms_rec.cum_sd / nConvFactor;
gms_rec.cum_num_pts := NVL(gms_rec.cum_num_pts,0);

select * into bcfg_rec from base_config
where id = iBCId;
bcfg_rec.assay_high := bcfg_rec.assay_high / nConvFactor;
bcfg_rec.assay_low := bcfg_rec.assay_low / nConvFactor;

gms_rec.cum_sd := greatest(0.05, nvl(gms_rec.cum_sd,0));
IF iNumPts > 0 THEN
   IF gms_rec.cum_num_pts <= 20 AND
         (bcfg_rec.assay_high IS NOT NULL AND bcfg_rec.assay_low IS NOT NULL AND
      (nMean*2 > 5*bcfg_rec.assay_high - 3*bcfg_rec.assay_low
      OR nMean*2 < 5*bcfg_rec.assay_low - 3*bcfg_rec.assay_high))
      OR (nMean < NVL(nSD,0)) THEN
      cOutliered := 'Y';
      iDeltaOutliered := iDeltaOutliered + NVL(iNumPts,0);
   ELSIF gms_rec.cum_num_pts > 20 AND
         ((NVl(nMean,0) > NVL(gms_rec.cum_mean,0) +
3.0*NVL(gms_rec.cum_sd,0)) OR
         (NVL(nMean,0) < NVL(gms_rec.cum_mean,0) -
3.0*NVL(gms_rec.cum_sd,0))) THEN
      cOutliered := 'Y';
      iDeltaOutliered := iDeltaOutliered + NVL(iNumPts,0);
   END IF;
END IF;

OPEN ld_cursor;
FETCH ld_cursor INTO ld_rec;
IF ld_cursor%FOUND THEN
   if ld_rec.outliered = 'Y' then
         iDeltaOutliered := iDeltaOutliered - nvl(ld_rec.num_pts,0);
   end if;
END IF;

CALC.SetStats(lms_rec.mtd_num_pts, lms_rec.mtd_mean, lms_rec.mtd_sd);
IF ld_cursor%FOUND THEN
   CALC.OutStats(ld_rec.num_pts, ld_rec.mean, ld_rec.sd);
ELSE
   ld_rec.num_pts := 0;
   ld_rec.mean := 0;
   ld_rec.sd := 0;
   ld_rec.outliered := 'N';
```

```
END IF;
IF iNumPts > 0 THEN
   CALC.InStats(iNumPts, nMean, nSD);
END IF;
CALC.GetStats(lms_rec.mtd_num_pts, lms_rec.mtd_mean, lms_rec.mtd_sd);

CALC.SetStats(lms_rec.mtd_num_excluded, lms_rec.mtd_mean_excluded,
lms_rec.mtd_sd_excluded);
  IF ld_rec.outliered = 'Y' THEN
    CALC.OutStats(ld_rec.num_pts, ld_rec.mean, ld_rec.sd);
  END IF;
  IF cOutliered = 'Y' AND iNumPts > 0 THEN
    CALC.InStats(iNumPts, nMean, nSD);
  END IF;
  CALC.GetStats(lms_rec.mtd_num_excluded, lms_rec.mtd_mean_excluded,
lms_rec.mtd_sd_excluded);

CALC.SetStats(lms_rec.cum_num_pts, lms_rec.cum_mean, lms_rec.cum_sd);
IF ld_cursor%FOUND THEN
   CALC.OutStats(ld_rec.num_pts, ld_rec.mean, ld_rec.sd);
END IF;
IF iNumPts > 0 THEN
   CALC.InStats(iNumPts, nMean, nSD);
END IF;
CALC.GetStats(lms_rec.cum_num_pts, lms_rec.cum_mean, lms_rec.cum_sd);

CALC.SetStats(lms_rec.cum_num_excluded, lms_rec.cum_mean_excluded,
lms_rec.cum_sd_excluded);
  IF ld_rec.outliered = 'Y' THEN
    CALC.OutStats(ld_rec.num_pts, ld_rec.mean, ld_rec.sd);
  END IF;
  IF cOutliered = 'Y' AND iNumPts > 0 THEN
    CALC.InStats(iNumPts, nMean, nSD);
  END IF;
  CALC.GetStats(lms_rec.cum_num_excluded, lms_rec.cum_mean_excluded,
lms_rec.cum_sd_excluded);

UPDATE l_monthly_stats
SET
   mtd_num_pts = lms_rec.mtd_num_pts,
   mtd_mean = lms_rec.mtd_mean,
   mtd_sd = lms_rec.mtd_sd,
   mtd_num_excluded = lms_rec.mtd_num_excluded,
   mtd_mean_excluded = lms_rec.mtd_mean_excluded,
   mtd_sd_excluded = lms_rec.mtd_sd_excluded,
   cum_num_pts = lms_rec.cum_num_pts,
   cum_mean = lms_rec.cum_mean,
   cum_sd = lms_rec.cum_sd,
```

```
    cum_num_excluded = lms_rec.cum_num_excluded,
    cum_mean_excluded = lms_rec.cum_mean_excluded,
    cum_sd_excluded = lms_rec.cum_sd_excluded,
      last_touch = sysdate
  WHERE id = iLMSId;

OPEN lmsc_cursor(lms_rec.lab_id, lms_rec.bcfg_id, lms_rec.rep_month,
           lms_rec.inst_ser, lms_rec.shift);
  LOOP
    FETCH lmsc_cursor INTO lmsc_rec;
    EXIT WHEN lmsc_cursor%NOTFOUND;

CALC.SetStats(lmsc_rec.cum_num_pts, lmsc_rec.cum_mean,
lmsc_rec.cum_sd);
     IF ld_cursor%FOUND THEN
        CALC.OutStats(ld_rec.num_pts, ld_rec.mean, ld_rec.sd);
     END IF;
     IF iNumPts > 0 THEN
        CALC.InStats(iNumPts, nMean, nSD);
     END IF;
     CALC.GetStats(lmsc_rec.cum_num_pts, lmsc_rec.cum_mean,
lmsc_rec.cum_sd);

CALC.SetStats(lmsc_rec.cum_num_excluded,
lmsc_rec.cum_mean_excluded, lmsc_rec.cum_sd_excluded);
     IF ld_rec.outliered = 'Y' THEN
        CALC.OutStats(ld_rec.num_pts, ld_rec.mean, ld_rec.sd);
     END IF;
     IF cOutliered = 'Y' AND iNumPts > 0 THEN
        CALC.InStats(iNumPts, nMean, nSD);
     END IF;
     CALC.GetStats(lmsc_rec.cum_num_excluded,
lmsc_rec.cum_mean_excluded, lmsc_rec.cum_sd_excluded);

UPDATE l_monthly_stats
    SET
      cum_num_pts = lmsc_rec.cum_num_pts,
      cum_mean = lmsc_rec.cum_mean,
      cum_sd = lmsc_rec.cum_sd,
      cum_num_excluded = lmsc_rec.cum_num_excluded,
      cum_mean_excluded = lmsc_rec.cum_mean_excluded,
      cum_sd_excluded = lmsc_rec.cum_sd_excluded
    WHERE CURRENT OF lmsc_cursor;
  END LOOP;
  CLOSE lmsc_cursor;
```

```
UpdateGroupData(iBCId, dLDDate, iCntryId,
  ld_rec.num_pts, ld_rec.mean, ld_rec.sd, ld_rec.outliered,
  iNumPts, nMean, nSD, cOutliered, nConvFactor);

IF iNumPts > 0 THEN
  IF ld_cursor%FOUND THEN
    UPDATE lab_data
    SET
      num_pts = iNumPts,
      mean = nMean,
      sd = nSD,
      outliered = cOutliered,
      op_code = cOpcode
    WHERE CURRENT OF ld_cursor;
  ELSE
    INSERT INTO lab_data (lms_id, rep_date_time, num_pts, mean, sd, outliered, op_code)
      VALUES (iLMSId, dRepDateTime, iNumPts, nMean, nSD, cOutliered, cOpcode);
  END IF;
ELSE
  DELETE lab_data
  WHERE CURRENT OF ld_cursor;
END IF;
CLOSE ld_cursor;
END;
```

Finally, the Group Statistics are Updated:
This is the code for updating the Peer Group statistics.

```
PROCEDURE UpdateGroupData(
  iBCId IN base_config.id%TYPE,
  dLDDate IN DATE,
  iCntryId IN country.id%TYPE,
  old_num_pts IN INTEGER,
  old_mean IN NUMBER,
  old_sd IN NUMBER,
  old_outliered IN lab_data.outliered%TYPE,
  new_num_pts IN INTEGER,
  new_mean IN NUMBER,
  new_sd IN NUMBER,
  new_outliered IN lab_data.outliered%TYPE,
  conv_factor IN NUMBER)
IS
  iDeltaOutliered INTEGER;
  iInit INTEGER;
  dCurrDate DATE;
  dGDSDate DATE;

CURSOR gms_cursor(
    iCntryId country.id%TYPE,
      iBCId base_config.id%TYPE,
      dMonth DATE) IS
  SELECT *
  FROM g_monthly_stats
  WHERE bcfg_id = iBCId
  AND rep_month = dMonth
  AND NVL(country_id,iCntryId) = iCntryId
  FOR UPDATE;

CURSOR gmsc_cursor(
    iCntryId country.id%TYPE,
    iBCId base_config.id%TYPE,
    dMonth DATE) IS
  SELECT *
  FROM g_monthly_stats
  WHERE NVL(country_id,0) = NVL(iCntryId,0)
  AND bcfg_id = iBCId
  AND rep_month > dMonth
  FOR UPDATE;
  gmsc_rec gmsc_cursor%ROWTYPE;

gms_rec gms_cursor%ROWTYPE;

BEGIN
```

```
    iDeltaOutliered := 0;
    IF old_outliered = 'Y' THEN
       iDeltaOutliered := iDeltaOutliered - NVL(old_num_pts,0);
    END IF;
    IF new_outliered = 'Y' THEN
       iDeltaOutliered := iDeltaOutliered + NVL(new_num_pts,0);
    END IF;

/* FIND THE RIGHT G_MONTHLY_STATS for world */
    OPEN gms_cursor(iCntryId, iBCId, FIRST_DAY(dLDDate));
    LOOP
       FETCH gms_cursor INTO gms_rec;
          EXIT WHEN gms_cursor%NOTFOUND;

/* UPDATE G_MONTHLY_STATS */
       CALC.SetStats(gms_rec.mtd_num_pts, gms_rec.mtd_mean,
gms_rec.mtd_sd);
       IF old_num_pts > 0 THEN
          IF old_outliered = 'N' THEN
             CALC.OutStats(old_num_pts, old_mean, old_sd, conv_factor);
          END IF;
       END IF;
       IF new_num_pts > 0 THEN
          IF new_outliered = 'N' THEN
             CALC.InStats(new_num_pts, new_mean, new_sd, conv_factor);
          END IF;
       END IF;
       CALC.GetStats(gms_rec.mtd_num_pts, gms_rec.mtd_mean,
gms_rec.mtd_sd);
       gms_rec.mtd_num_excluded := NVL(gms_rec.mtd_num_excluded,0) +
iDeltaOutliered;

CALC.SetStats(gms_rec.cum_num_pts, gms_rec.cum_mean,
gms_rec.cum_sd);
       IF old_num_pts > 0 THEN
          IF old_outliered = 'N' THEN
             CALC.OutStats(old_num_pts, old_mean, old_sd, conv_factor);
          END IF;
       END IF;
       IF new_num_pts > 0 THEN
          IF new_outliered = 'N' THEN
             CALC.InStats(new_num_pts, new_mean, new_sd, conv_factor);
          END IF;
       END IF;
       CALC.GetStats(gms_rec.cum_num_pts, gms_rec.cum_mean,
gms_rec.cum_sd);
       gms_rec.cum_num_excluded := NVL(gms_rec.cum_num_excluded,0) +
iDeltaOutliered;
```

```
    UPDATE g_monthly_stats
    SET
      mtd_num_pts = gms_rec.mtd_num_pts,
      mtd_mean = gms_rec.mtd_mean,
      mtd_sd = gms_rec.mtd_sd,
      mtd_num_excluded = gms_rec.mtd_num_excluded,
      cum_num_pts = gms_rec.cum_num_pts,
      cum_mean = gms_rec.cum_mean,
      cum_sd = gms_rec.cum_sd,
      cum_num_excluded = gms_rec.cum_num_excluded
    WHERE CURRENT OF gms_cursor;

OPEN gmsc_cursor(gms_rec.country_id, gms_rec.bcfg_id,
gms_rec.rep_month);
    LOOP
      FETCH gmsc_cursor INTO gmsc_rec;
      EXIT WHEN gmsc_cursor%NOTFOUND;

CALC.SetStats(gmsc_rec.cum_num_pts, gmsc_rec.cum_mean,
gmsc_rec.cum_sd);
      IF old_num_pts > 0 THEN
        IF old_outliered = 'N' THEN
          CALC.OutStats(old_num_pts, old_mean, old_sd,
conv_factor);
        END IF;
      END IF;
      IF new_num_pts > 0 THEN
        IF new_outliered = 'N' THEN
          CALC.InStats(new_num_pts, new_mean, new_sd, conv_factor);
        END IF;
      END IF;
      CALC.GetStats(gmsc_rec.cum_num_pts, gmsc_rec.cum_mean,
gmsc_rec.cum_sd);
      gmsc_rec.cum_num_excluded := NVL(gmsc_rec.cum_num_excluded,0) +
iDeltaOutliered;
      UPDATE g_monthly_stats
      SET
        cum_num_pts = gmsc_rec.cum_num_pts,
        cum_mean = gmsc_rec.cum_mean,
        cum_sd = gmsc_rec.cum_sd,
        cum_num_excluded = gmsc_rec.cum_num_excluded
      WHERE CURRENT OF gmsc_cursor;
    END LOOP;
    CLOSE gmsc_cursor;
  END LOOP;
  CLOSE gms_cursor;
END;
```

Local Client Add Lab Data and Modify Data Functions

Here is the Delphi code for the Local Client Add Lab Data/Modify Data functions:
First, we locate or create the Base_Config, L_Monthly_Stats, and
G_Monthly_Stats records.

```
function
TDM.find_or_autocreate_LMS_CALC(bc_id:longint;ilist_id:longint;time_stamp:TDat
eTime;shift:longint;unit_code:longint):boolean;
{
    Assumes that ilist_id and bc_id are good.

1. Determine monthly date
   2. try to "find" first.  If the record exists, set LMS_CALC to point to
      it and exit (return true).
   3. not found, so need to auto create, first prepare an insert
   4. auto-create LMS record
   5. apply cached updates
}
var
    adjusted_date:TDateTime;
    cum_num_pts: LongInt;
    cum_mean: Double;
    cum_sd: Double;
begin
    //Step 1.
    adjusted_date:=strip_to_month(time_stamp);

//Step 2.
    if (get_LMS_from_key(bc_id,ilist_id,adjusted_date,shift)=TRUE) then
    begin
        wwTable_L_MONTHLY_STATS.IndexFieldNames:='ID';
        wwTable_LMS_CALC.Refresh;

wwTable_LMS_CALC.FindKey([wwTable_L_MONTHLY_STATS.FieldByName('id').AsInteger]
);
        result:=TRUE;
        exit;
    end;

//Step 3.
    if (get_INST_LIST_from_id(ilist_id)=FALSE) then
        Abort;

with wwQuery_WORK do
    begin
        Active:=FALSE;
        SQL.Clear;
        SQL.Add('Select cum_num_pts, cum_mean, cum_sd from L_MONTHLY_STATS');
        SQL.Add('WHERE');
        SQL.Add('BCFG_ID = '+IntToStr(bc_id));
        SQL.Add('AND');
        SQL.Add('LAB_ID = '+wwTable_INST_LIST.FieldByName('lab_id').AsString);
        SQL.Add('AND');
        SQL.Add('REP_MONTH < :REPMONTH');
        SQL.Add('ORDER BY REP_MONTH DESC');
        ParamByName('REPMONTH').AsDateTime:=adjusted_date;
        Active:=TRUE;
```

```
        if EOF and Bof then
        begin
            cum_num_pts := 0;
            cum_mean := 0.0;
            cum_sd := 0.0;
        end
        else
        begin
            First;
            cum_num_pts := FieldByName('cum_num_pts').AsInteger;
            cum_mean := FieldByName('cum_mean').AsFloat;
            cum_sd := FieldByName('cum_sd').AsFloat;
        end;
    end;

//Step 4.
    with wwTable_LMS_CALC do
    begin
        Refresh;
        Insert;
        FieldValues['id']:=get_autoinc_value('L_MONTHLY_STATS');

FieldValues['lab_id']:=wwTable_INST_LIST.FieldByName('lab_id').AsInteger;
        FieldValues['bcfg_id']:=bc_id;
        FieldValues['rep_month']:=adjusted_date;
        FieldValues['inst_ser']:=wwTable_INST_LIST.FieldValues['inst_ser'];
        FieldValues['shift']:=shift;
        FieldValues['unit_id']:=unit_code;
        FieldValues['cum_num_pts'] := cum_num_pts;
        FieldValues['cum_mean'] := cum_mean;
        FieldValues['cum_sd'] := cum_sd;
        FieldByName('VIOLATION').AsString:='U';
        FieldByName('LAST_TOUCH').AsDateTime:=Now;
        Post;
    end;

//Step 5.
    Database1.ApplyUpdates([wwTable_LMS_CALC]);

result:=TRUE;
end;

function TDM.find_or_autocreate_GMS(bc_id: integer; rep_date: TDateTime;
country_id: Variant): boolean;
{
    1. If the record exists, set GMS point to it and exit
    2. auto create a GMS record
    3. apply cached updates }
var
    adjusted_date:TDateTime;
    cum_num_pts: LongInt;
    cum_mean: Double;
    cum_sd: Double;
begin
    adjusted_date:=strip_to_month(rep_date);
```

```
//Step 1.
if get_GMS_from_key(bc_id,adjusted_date, country_id) then
begin
    result:=TRUE;
    exit;
end;

//Step 2.
with wwQuery_WORK do
begin
    Active:=FALSE;
    SQL.Clear;
    SQL.Add('Select cum_num_pts, cum_mean, cum_sd from G_MONTHLY_STATS');
    SQL.Add('WHERE');
    SQL.Add('BCFG_ID = '+IntToStr(bc_id));
    SQL.Add('AND');
    if VarIsNull(country_id) then
        SQL.Add('COUNTRY_ID IS NULL')
    else
        SQL.Add('COUNTRY_ID = '+IntToStr(country_id));
    SQL.Add('AND');
    SQL.Add('REP_MONTH < :REPMONTH');
    SQL.Add('ORDER BY REP_MONTH DESC');
    ParamByName('REPMONTH').AsDateTime:=adjusted_date;
    Active:=TRUE;

if EOF and Bof then
    begin
        cum_num_pts := 0;
        cum_mean := 0.0;
        cum_sd := 0.0;
    end
    else
    begin
        First;
        cum_num_pts := FieldByName('cum_num_pts').AsInteger;
        cum_mean := FieldByName('cum_mean').AsFloat;
        cum_sd := FieldByName('cum_sd').AsFloat;
    end;
end;

with wwTable_G_MONTHLY_STATS do
begin
    Insert;
    FieldValues['id']:=get_autoinc_value('G_MONTHLY_STATS');
    FieldValues['bcfg_id']:=bc_id;
    FieldValues['rep_month']:=adjusted_date;
    FieldValues['country_id']:=country_id;
    FieldValues['cum_num_pts']:= cum_num_pts;
    FieldValues['cum_mean']:= cum_mean;
    FieldValues['cum_sd']:= cum_sd;
    Post;
end;

//Step 3.
Database1.ApplyUpdates([wwTable_G_MONTHLY_STATS]);

result:=TRUE;
``` end;

Next, we create the new lab data records:

```
function
TDM.update_LAB_DATA(bc_id:longint;ilist_id:longint;time_stamp:TDateTime;shift:
longint;
    npts:longint;mean:double;SD:double;unit_code:longint;outlier:boolean;
    opcode:string;user_notes:string):boolean;
(
    This function controls the whole process of adding/editing lab data
    records.  lms and gms records are updated automatically
    from this function.

Parameters:
       BC_ID: Base Config ID
       ILIST_ID: Inst_list ID
       time_stamp: time stamp
       shift: lab shift (1-3)
       npts: number of points (must be >=0)
       mean, sd: stats for point.  When npts is <=1, sd is always set to zero.
          When npts=0, mean is set to zero.

returns TRUE on success, FALSE on an unexpected exception

0. If npts is less than zero, exit (this is not a legal value for npts)
       Otherwise, format SD/mean if the npts<=1.
    1. Try to find an existing lab data record.  If one exists, this is
       going to be an edit.  Otherwise, this is going to be an insert:
       fill in the LMS_ID.
    2. call _update_lab_data, which will fill in the npts/mean/sd/opcode &
outlier
       and then do an "applyupdates"
    3. Find or autocreate a LMS record for this lab data record, this is a pre-
step
       for Step 4 --- update LMS
    4. update LMS
    5. Find or autocreate a GMS record
    6. update GMS
)
begin
    result := FALSE;

//Step 0.
    if (npts<0) then
        Abort;
    if (npts=0) then
    begin
        mean:=0;
        SD:=0;
    end;
    if (npts=1) then
        SD:=0;

//Step 1.
    if
(get_LAB_DATA_from_id(wwTable_LMS_CALC.FieldByName('id').AsInteger,time_stamp)
=FALSE) then
```

```
   begin
       wwTable_LAB_DATA.Insert;

wwTable_LAB_DATA.FieldByName('LMS_ID').AsInteger:=wwTable_LMS_CALC.FieldByName
('id').AsInteger;
       wwTable_LAB_DATA.FieldByName('REP_DATE_TIME').AsDateTime:=time_stamp;
   end
   else
   begin
       wwTable_LAB_DATA.Edit;
   end;

//Step 2.
   _update_lab_data(npts,mean,SD,opcode,outlier,user_notes);

//Step 3.
   if
(find_or_autocreate_LMS_CALC(bc_id,ilist_id,time_stamp,shift,unit_code)=FALSE)
then
       Abort;

//Step 4.
   update_LMS(wwTable_LAB_DATA);

//Step 5.
   REP_MONTH:=wwTable_LMS_CALC.FieldByName('REP_MONTH').AsDateTime;
   country_id:=wwTable_LAB.FieldByName('country_id').AsInteger;
   if (find_or_autocreate_GMS(bc_id,REP_MONTH,country_id)=FALSE) then
       exit;

//Step 6.
   update_GMS(wwTable_LMS_CALC);

//returns TRUE on success
   result:=TRUE;
end;

procedure TDM._update_lab_data(npts:integer;mean,SD:double;opcode:string;
           outlier:boolean;user_notes:string);
{
   This internal private function is the part of "update_lab_data"
   which actually sets the LAB_DATA record's values.

ASSUMES: You are already in EDIT or INSERT mode and the LMS_ID and
       REP_DATE_TIME have already been set.

1. Fill in npts, mean, SD, opcode & outlier state.
   2. Post & ApplyUpdates
}
begin
   //Step 1.
   wwTable_LAB_DATA.FieldByName('num_pts').AsInteger:=npts;
   wwTable_LAB_DATA.FieldByName('mean').AsFloat:=mean;
   wwTable_LAB_DATA.FieldByName('SD').AsFloat:=SD;
   wwTable_LAB_DATA.FieldValues['OP_CODE']:=opcode;

if (outlier=TRUE) then
       wwTable_LAB_DATA.FieldByName('outliered').AsString:='Y'
   else
```

```
    wwTable_LAB_DATA.FieldByName('outliered').AsString:='N';

wwTable_LAB_DATA.FieldByName('USER_NOTES').AsString:=user_notes;

//Step 2.
wwTable_LAB_DATA.Post;

Database1.ApplyUpdates([wwTable_LAB_DATA,wwTable_LMS_CALC,wwTable_G_MONTHLY_STATS]);
end;
```

Then, we update the Lab_Monthly_Statistics:

```
procedure TDM.update_LMS(DataSet: TDataSet);
{
    Part of the primary calculation logic, update LMS due to lab data changed ASSUMES wwTable_LMS_CALC is set up with the LAB_DATA's LMS

1. ...
    2. ...
    3. ...

Step 1, 2, 3 is to recalculate LMS record by using CalcStats object 4. write to LMS_CALC
}
var
    old_num_pts, new_num_pts: Integer;
    old_mean, new_mean: Double;
    old_sd, new_sd: Double;
    mtd_num_pts, cum_num_pts: Integer;
    mtd_mean, cum_mean: Double;
    mtd_sd, cum_sd: Double;
begin
    //Step 1.
    CS_LMS_mtd.InitStats;
    CS_LMS_cum.InitStats;
    CS_LMS_mtd.SetStats(wwTable_LMS_CALC.FieldByName('mtd_num_pts').AsInteger,
        wwTable_LMS_CALC.FieldByName('mtd_mean').AsFloat,
        wwTable_LMS_CALC.FieldByName('mtd_sd').AsFloat);
    CS_LMS_cum.SetStats(wwTable_LMS_CALC.FieldByName('cum_num_pts').AsInteger,
        wwTable_LMS_CALC.FieldByName('cum_mean').AsFloat,
        wwTable_LMS_CALC.FieldByName('cum_sd').AsFloat);

//Step 2.
    if (DataSet.State <> dsInsert) and
       (not InRecalc) and
       (DataSet.FieldByName('outliered').OldValue <> 'Y') then
    begin
        old_num_pts := DataSet.FieldByName('num_pts').OldValue;
        old_mean    := DataSet.FieldByName('mean').OldValue;
        old_sd      := DataSet.FieldByName('sd').OldValue;
        CS_LMS_mtd.OutStats(old_num_pts, old_mean, old_sd);
        CS_LMS_cum.OutStats(old_num_pts, old_mean, old_sd);
    end;

//Step 3.
    if ((DataSet.State = dsInsert) or (DataSet.State = dsEdit)) and
```

```
        (DataSet.FieldByName('outliered').AsString <> 'Y') then
    begin
        new_num_pts := DataSet.FieldByName('num_pts').AsInteger;
        new_mean    := DataSet.FieldByName('mean').AsFloat;
        new_sd      := DataSet.FieldByName('sd').AsFloat;
        CS_LMS_mtd.InStats(new_num_pts, new_mean, new_sd);
        CS_LMS_cum.InStats(new_num_pts, new_mean, new_sd);
    end;

CS_LMS_mtd.GetStats(mtd_num_pts, mtd_mean, mtd_sd);
    CS_LMS_cum.GetStats(cum_num_pts, cum_mean, cum_sd);

//Step 4.
    with wwTable_LMS_CALC do
    begin
        Edit;
        FieldByName('mtd_num_pts').AsInteger := mtd_num_pts;
        FieldByName('mtd_mean').AsFloat := mtd_mean;
        FieldByName('mtd_sd').AsFloat := mtd_sd;
        FieldByName('cum_num_pts').AsInteger := cum_num_pts;
        FieldByName('cum_mean').AsFloat := cum_mean;
        FieldByName('cum_sd').AsFloat := cum_sd;
        FieldByName('VIOLATION').AsString:='U';
        FieldByName('LAST_TOUCH').AsDateTime:=Now;
        Post;
    end;
end;
```

And the Group Monthly Statistics:

```
procedure TDM.update_GMS(DataSet: TDataSet);
{
    Part of the primary calculation logic 1. determine old and new staff
    2. determine country ID etc.
    3. call update_GMS_statistics to update GMS record
}
var
    old_mtd_num_pts, new_mtd_num_pts: Integer;
    old_mtd_mean, new_mtd_mean: Double;
    old_mtd_sd, new_mtd_sd: Double;
    num_pts, cum_num_pts: Integer;
    mean, cum_mean: Double;
    sd, cum_sd: Double;
    BC_ID:integer;
    REP_MONTH:TDateTime;
    unit_conversion_factor:double;
    SN:variant;
    the_query:TwwQuery;
    country_id:integer;
    LAB_ID:integer;
begin
    //Step 1.
    if DataSet.State <> dsInsert then
    begin
        if VarIsNull(DataSet.FieldByName('mtd_num_pts').OldValue) then
            old_mtd_num_pts := 0
```

```
            else
                old_mtd_num_pts:=DataSet.FieldByName('mtd_num_pts').OldValue;
            if VarIsNull(DataSet.FieldByName('mtd_mean').OldValue) then
                old_mtd_mean := 0.0
            else
                old_mtd_mean:=DataSet.FieldByName('mtd_mean').OldValue;
            if VarIsNull(DataSet.FieldByName('mtd_sd').OldValue) then
                old_mtd_sd := 0.0
            else
                old_mtd_sd:=DataSet.FieldByName('mtd_sd').OldValue;
        end
        else
        begin
            old_mtd_num_pts := 0;
            old_mtd_mean := 0.0;
            old_mtd_sd := 0.0;
        end;

new_mtd_num_pts:=DataSet.FieldByName('mtd_num_pts').AsInteger;
        new_mtd_mean:=DataSet.FieldByName('mtd_mean').AsFloat;
        new_mtd_sd:=DataSet.FieldByName('mtd_sd').AsFloat;

//Step 2.
        LAB_ID:=Dataset.FieldByName('LAB_ID').AsInteger;
        if (wwTable_LAB.FieldByName('id').AsInteger<>LAB_ID) then
            get_LAB_from_ID(LAB_ID);
        country_id:=wwTable_LAB.FieldByName('country_id').AsInteger;

//Step 3.
        update_GMS_statistics(BC_ID,REP_MONTH,country_id,
            old_mtd_num_pts,old_mtd_mean,old_mtd_SD,
            new_mtd_num_pts,new_mtd_mean,new_mtd_SD,
            unit_conversion_factor);
end;
```

These functions rely on the following Calculation Support Routines:

```
//-- The following is the calcstats unit for TCalcStats object that is used to
do calculation--//
unit calcstats;
{
    The TCalcStats unit implement's Knuth's algos for computing num_pts,
    mean and SD on a population. You can add points to the population and
    take them away. The population never has a negative number of points.

This unit does not do any try/except stuff for speed reasons.

For an example on how to use this, look at the RTQA source.

N1,A1 and B1 represent the "cache"... used when adding or subtracting
        things from the "state" (the population).
    N2,A2 and B2 represent the "state".. the population as it currently
        stands.

Nx=the total number of points
    Ax=the total number of points * the mean of all points
    Bx=much more complicated
}
```

```
interface
   type
      TCalcStats = class(TObject)
      private
         N1, N2: LongInt;
         A1, A2: Double;
         B1, B2: Double;
         procedure CalcSubPop(ANPts: LongInt; AMean: Double; ASD: Double);
         procedure CalcSuperPop(ANPts: LongInt; AMean: Double; ASD: Double);
      public
         procedure InitStats;
         { AConvFactor - The number to multiply by to convert
           statistics from a smaller population into units
           used by a larger population. Number to divide by
           to convert from a larger population's statistics
           into units used by a smaller population. Defaults
           to 1.0, i.e. no conversion. }
         procedure SetStats(ANPts: LongInt; AMean: Double; ASD: Double;
            AConvFactor: Double = 1.0);
         procedure GetStats(out ANPts: LongInt; out AMean: Double; out ASD:
Double;
            AConvFactor: Double = 1.0);
         procedure InStats(ANPts: LongInt; AMean: Double; ASD: Double;
            AConvFactor: Double = 1.0);
         procedure OutStats(ANPts: LongInt; AMean: Double; ASD: Double;
            AConvFactor: Double = 1.0);

procedure copy_from(source_calcstat:TCalcStats);
         procedure OutStats_CS(other_stats:TCalcStats;
            AConvFactor: Double = 1.0);
      end;

implementation uses Math;

procedure TCalcStats.InitStats;
{
    Reset the state to zero.
}
begin
    N2 := 0;
    A2 := 0.0;
    B2 := 0.0;
end;

procedure TCalcStats.SetStats(ANPts: LongInt; AMean: Double; ASD: Double;
AConvFactor: Double);
{
    Sets the state.
}
begin
    CalcSuperPop(ANPts, AMean * AConvFactor, ASD * AConvFactor);
end;

procedure TCalcStats.GetStats(out ANPts: LongInt; out AMean: Double; out ASD:
Double; AConvFactor: Double);
{
```

```
   Used to yield the num_pts/mean/SD currently in the object state.
}
begin
   if N2 > 0 then
   begin
      ANPts := N2;
      AMean := (A2 / N2) / AConvFactor;
   end
   else
   begin
      ANPts := 0;
      AMean := 0.0;
   end;

if N2 > 1 then
   begin
      ASD := (Sqrt(Abs((B2 - ((A2*A2) / N2)) / (N2-1)))) / AConvFactor;
   end
   else
   begin
      ASD := -1.0;
   end;
end;

procedure TCalcStats.CalcSubPop(ANPts: LongInt; AMean: Double; ASD: Double);
{
   Internal function for transferring from num_pts/mean/SD into
   the Nx,Ax & Bx of the "cache".
}
begin
   N1 := ANPts;
   A1 := N1 * AMean;
   if N1 < 1 then
      B1 := 0.0
   else
      B1 := ((A1*A1) / N1) +
            ((ASD*ASD) * (N1 - 1));
end;

procedure TCalcStats.CalcSuperPop(ANPts: LongInt; AMean: Double; ASD: Double);
{
   Internal function for transferring from num_pts/mean/SD into
   the Nx,Ax & Bx of the "state".
}
begin
   N2 := ANPts;
   A2 := N2 * AMean;
   if N2 < 1 then
      B2 := 0.0
   else
      B2 := ((A2*A2) / N2) +
            ((ASD*ASD) * (N2 - 1));
end;

procedure TCalcStats.InStats(ANPts: LongInt; AMean: Double; ASD: Double;
AConvFactor: Double);
{
   add a num_pts,mean,SD to the object state.
}
```

```
begin
   if N2 = 0 then
   begin
      SetStats(ANPts, AMean, ASD, AConvFactor);
   end
   else
   begin
      CalcSubPop(ANPts, AMean * AConvFactor, ASD * AConvFactor);

A2 := A2 + A1;
      B2 := B2 + B1;
      N2 := N2 + N1;
   end;
end;

procedure TCalcStats.OutStats(ANPts: LongInt; AMean: Double; ASD: Double;
AConvFactor: Double);
{
   extract a num_pts,mean,SD from the object state.
}
begin
   if (N2 <> 0) and (ANPts <> 0) then
   begin
      CalcSubPop(ANPts, AMean * AConvFactor, ASD * AConvFactor);

A2 := A2 - A1;
      B2 := B2 - B1;
      N2 := N2 - N1;
      if (N2<0) then
         N2:=0;
   end;
end;

procedure TCalcStats.copy_from(source_calcstat:TCalcStats);
begin
   N1:=source_calcstat.N1;
   N2:=source_calcstat.N2;
   A1:=source_calcstat.A1;
   A2:=source_calcstat.A2;
   B1:=source_calcstat.B1;
   B2:=source_calcstat.B2;
end;

procedure TCalcStats.OutStats_CS(other_stats:TCalcStats;
            AConvFactor: Double = 1.0);
var
   num_pts:integer;
   mean,SD:double;
begin
   other_stats.GetStats(num_pts,mean,SD,AConvFactor);
   OutStats(num_pts,mean,SD);
end;

end.
```

Client Synchronize with Webhost Function

The Synchronize with Webhost function allows the Client to transmit it's data to the Webhost and to receive the Webhost group data so that at the end of a synchronization, the Webhost has any updates that have been made to the Local Client's data set and the Local Client has any updates that have been made to the Webhost's data set for groups which exist on the Local Client.

The data is transmitted in the following "RT" Format:

RT Files are ASCII based and semicolon delimited. They may be arbitrarily large. A line of RT data is prefixed by a two letter code which defines the context of the line. There are twelve prefixes:

RT Prefixes
| | |
|---|---|
| VV | Version Info |
| ID | Lab ID information |
| IR | Instrument Record |
| LR | Lot Record |
| CH | Configuration Header |
| CD | Configuration Data |
| SR | Summary Result Record |
| GR | Group Result Record |
| OD | Outliered Date Record |
| EE | Error Message |
| MM | Message |
| CC | Comment |
| XX | End of file |

CH/CD records will always occur before any data records.

Empty strings are interpreted as a "NULL".

Dates are always in the format MM-DD-YYYY

Times are always in the format HH:MM:SS and HH is in 24-hour (military) format.

Timestamps are MM-DD-YYYY_HH:MM:SS

RT Files will end with the ^ symbol on a line by itself. If the RT File is from the RTQC Server, the line EOF marker will be ^~
Here is a sample file from a client to the RTQC server:

```
VV;RT1;1;17;02-05-2000_08:35:02
CC;This is a sample CLIENT.RT file
ID;HTX;hemat
IR;AxSYM;123;1;LOT1;2;LOT2;3;LOT3;F;;T;Hema1
LR;LOT1
SR;ALB;01;01;mg/dl;1;08/09/1998;7:51:14;1;5.667;0.13;N;SJM
SR;ALB;01;01;mg/dl;1;08/10/1998;11:51:14;1;5.667;0.13;N;FNH
```

```
SR;ALB;01;01;mg/dl;1;08/11/1998;10:51:14;4;5.667;0.13;N;GBP
LR;LOT2
SR;ALB;01;01;mg/dl;1;08/11/1998;11:01:27;4;11.11;0.31;N;SJM
LR;LOT3
SR;ALB;01;01;mg/dl;1;08/11/1998;11:42:39;5;20.6;0.71;N;ABC
IR;IMX;sil;1;LOT1;2;LOT2
LR;LOT1
SR;T4;02;03;u/l;1;08/10/1998;11:21:33;75.56;1.03;N;ABC
LR;LOT2
SR;T4;02;03;u/l;1;08/10/1998;11:28:33;176.7;4.03;N;ABC
XX;C032A498
^
```

Here is a sample file from the RTQC server to a client:

```
VV;RT1;1;17;02-06-2000_11:12:41
CC;This is a sample SERVER.RT file
ID;HTX;hemat
CH;REAGENT;ID;DESCRIPTION
CD;Hema-1;Hematronix Reagent #1
CD;Hema-2;Hematronix Reagent #2
CH;TEST;ID;DESCRIPTION
CD;TOX;245 Trioxin
IR;AxSYM
LR;LOT1;
GR;Belgium;T4;other;C4;08/01/1998;5;2.99;0.31;47;3.01;0.29
GR;;T4;other;C4;08/01/1998;16;3.03;0.32;213;3.21;0.41
GR;Belgium;ACET;other;C4;08/01/1998;5;2.99;0.31;43;3.01;0.79
GR;;ACET;other;C4;08/01/1998;5;2.99;0.31;43;3.01;0.79
OD;T4;02;03;u/l;1;08/10/1998;11:21:33;75.56;1.03;N;ABC
GR;Belgium;UPRO;other;C4;08/01/1998;5;2.99;0.31;21;3.01;3.14
GR;;UPRO;other;C4;08/01/1998;5;2.99;0.31;21;3.01;3.14
LR;LOT2;
GR;Belgium;T4;other;C4;08/01/1998;5;6.99;0.31;47;3.01;2.2
GR;;T4;other;C4;08/01/1998;5;6.99;0.31;47;3.01;2.2
GR;Belgium;ACET;other;C4;08/01/1998;15;2.99;0.31;43;13.01;6.4
GR;;ACET;other;C4;08/01/1998;15;2.99;0.31;43;13.01;6.4
LR;LOT3;
GR;Belgium;T4;other;C4;08/01/1998;5;42.99;0.31;47;3.01;10.1
GR;;T4;other;C4;08/01/1998;5;42.99;0.31;47;3.01;10.1
XX;D3958D40
^~
```

VV : Version Info

Format:
VV ; RT Version Tag; Conversation Number ; Optional Transaction Identifier ; Optional Server Timestamp Sample:
VV;RT1;1
or
VV;RT1;1;307
Or
VV;RT1;1;307;02-05-2000_08:35:02

Details:
The VV line identifies a files as an RT file and contains its version number.

There are three conversations:
1: Normal
2: RTQA Backup
3: Normal, but group records should not be rectified; they should be read "as is".

The Optional Transaction Identifier only applies to files which are part of a two-way conversation, such as those between RTQA and RTQC. The transaction identifier is produced by the client (RTQA) and, when the group stats response file is produced by the server (RTQC), the transaction id is copied into its VV record. If no transaction identifier exists then RTQC will simply leave it blank. The server (RTQC) will never add/alter/delete a transaction identifier.
Transaction Identifiers are 32-bit integers.

The Server Timestamp is used to maintain "last touch" information about a client. When RTQC creates a file which contains this timestamp and ends the file with the ^~ EOF marker

ID : Lab ID information

Format:
ID ; Lab's Login Name ; Lab's Password

Sample:
ID;203;Green3

Details:
An ID record sets the lab for which the following data in the RT file applies to. An ID record will usually be the first line in an RT file, unless it contains group data. Any number of ID records may appear in a file. That is to say, an RT file may contain data for an arbitrary number of labs (including all labs in the database for ease of mass export). An ID record is always followed by an IR (Instrument) record.

IR : Instrument Record

Format:
IR ; Instrument Type ; Instrument Serial Number ; $1^{st}$ lot's level ; $1^{st}$ lot code ; $2^{nd}$ lot's level ; $2^{nd}$ lot code ; $3^{rd}$ lot's level ; $3^{rd}$ lot code ; use_meth ; meth_code ; use_reag ; reag_code
=or=
IR ; Instrument Type If the instrument has less than 3 lots, fill the remaining slots with the empty string Sample:
*for a client instrument with 3 lots:*
IR;AXSYM;10242;1;LMC11299;2;LMC21299;3;LMC31299;F;;F;
*for a client instrument with only 2 lots:*
IR;AXSYM;773;1;LMC11299;2;LMC21299;;T;Meth1;T;Reag1
*for a client instrument with only 1 lot:*
IR;AXSYM;408;1;LMC11299;;;;T;Meth2;F;

*For group stats:*
IR;AXSYM

Details:
An Instrument Record indicates that the following data will be based on this instrument. Any number of Instrument Records may appear in an RT file. IR records are always followed by LR (Lot) Records. There are two types of IR records. The first, which contains a serial number and lot numbers, pertains to a particular physical instrument at a laboratory. The second type, which only contains an instrument type, is used with group statistics. Note that the second type of IR record should not be used with client data as it does not contain sufficient information to indicate a particular instrument.

LR : Lot Record

Format:
LR ; Lot Code

Sample:
LR;LMC11299;

Details:
A Lot Record indicates that the following data will be based on this lot. Lot Records are not explicitly mandated to appear in any order. Note that the levels were set up by the preceding IR record.

CH : Configuration Header

Format:
CH ; Table Name ; {Field Name}

Sample:
CH;BASE_CONFIG;TEST_CODE;INST_CODE;METH_CODE;REAG_CODE;LOT_NUMBER;H1;LO;SD;

Details:
This is the record used to update configuration between the web server and client. It tells the reader that the next "CD" records will apply to a particular table. Please note that this is a somewhat sensitive record, as it is important that primary keys, foreign keys and the like may cause database integrity issues if the data is not correct or is entered in the wrong order.

CD : Configuration Data

Format:
CD; {Field Data}

Sample:
`CD;T4;T4-Uptake`

Details: This contains the field data which is to be applied to the table defined by an earlier "CH" record. If a record with the same primary key already exists, this will write over the existing entry. Otherwise, a new record will be created with the CD data.

SR : Summary Result Record (data point(s))

Format:
SR ; Test Code ; Meth Code ; Reag Code ; Unit ; shift ; date in MM/DD/YYYY format ; time in HH:MM:SS format ; number of points ; mean ; SD ; Outlier ; Opcode Sample:
`SR;T4;other;C4;mg/dl;1;08/17/1998;12:04:21;5;2.99;0.31;N;SJM`

Details:
The Summary Result Record contains a collection of points for the test/meth/reag/unit/shift indicated in the record. Note the lab, instrument and lot have been set by preceding "ID", "IR" and "LR" records. It is valid to send an SR record with zero points; this is the "RT" way of saying "delete". Note that one may resend .RT files an arbitrary number of times, which implies that if the SR record's date/time already exists in the database, the SR is meant to be an EDIT. Similar rules apply to GR records.

GR : Group Result Record

Format:
GR ; Group ID ; Test Code ; Meth Code ; Reag Code ; date in MM/DD/YYYY format ; group # of points ; group mean ; group SD ; cum # of points ; cum mean ; cum SD Sample:
`GR;Belgium;T4;other;C4;08/01/1998;5;2.99;0.31;47;3.01;0.29`

Details:
The Group Result Record contains the physical data for the test/meth/reag/unit indicated in the record. Note the instrument and lot have been set by preceding "IR" and "LR" records. Note that a NULL Group ID means "world". GR records are generally only produced by the server (RTQC).

OD : Outliered Data Record

Format:
OD ; Test Code ; Meth Code ; Reag Code ; Unit ; shift ; date in MM/DD/YYYY format ; time in HH:MM:SS format ; number of points ; mean ; SD ; Outlier ; Opcode Sample:
```
OD;T4;other;C4;mg/dl;1;08/17/1998;12:04:21;5;2.99;0.31;N;SJM
```

Details:
The server (RTQC) produces OD records when client data has been outliered by the server. The purpose of this record is to allow the client to reconcile their group stats with the RTQC group stats. OD records are only necessary for servers which return GR data back to clients. A client will never produce an OD record.

* The OD record follows the same format as the SR record.

EE : Error Record

Format:
EE ; Error Description

Sample:
```
EE;Corrupted File Detected
```

Details:
This is a special type of "MM" (Message) Record which contains information about an error. It would be used if, for instance, one uploaded a file with a bad lab id.

MM : Message

Format:
MM ; Message String

Sample:
```
MM;The upload occurred at 3:14PM and lasted for 41 seconds
```

Details:
MM lines contain textual information. Their nature depends on the context of the file, and will (most likely) not appear in anything exchanged between the RT Web Server and the RTQA client. They may appear in client-to-instrument conversations (for instance) to alert one another of situations or to download special information, such as QC events.

CC : Comment (always ignored by parser)

Format:
CC ; Any text

Sample:
CC;This is the start of group data for this lab

Details:
CC lines can appear at *any* point in an RT file and are only of use to us for debug purposes. CC lines should be discarded by an RT parser.

XX : End of File

Format:
XX ; Checksum number (32-bit)

Sample:
XX;300C1852

Details:
This is always the last line of an RT file (not counting the end of file marker). The Checksum algorithm is the "Adler320File" algorithm which appears on page 294 of the SysTools2 User Manual. The checksum is always 8 characters long; if the CRC number itself is smaller, fill the space with zeroes.

Client Synchronize with Webhost Function

The following is a synopsis of the Delphi code to implement the Client Synchronize Function

```
//--------------------------------------------//
Outline of Sync
1. Connect to RTQC
2. POST our file (the file is obtained from export).. the server returns the
     KEY in its response message, or it returns the "BadFile" or other error
     messages (this means the Sync is aborted)
3. POST a "start processing this KEY" message to server to tell it
     to actually do the import, RTQC server will check the file and update
     lab data for this lab in the server if neccessary and prapere the return
     file thatcontains group stats etc. information
4. POST a "checking" message which includes the KEY to the RTQC server
     at some regular interval. The server responds with:
         A. unable to connect (server is down or your stuff is configured wrong)
         B. invalid key (error)
         C. error (unable to process your report... )
         D. still working (call back later, I'm importing your posted
             file/creating the output file)
         E. your file (which contains group stats and possibly some table data)
5. Assuming you get to step E, download the file. The filename is derived from
     the KEY.
```

6. This file contains a lot of stats and RTQA (RTQC - Data Manager) will start to import this file to update Lab data (Group Coordinator only), or update Configurations or Group Stats in RTQA (RTQC - Data Manager)

NOTE: The post file and the download file is in our RT format
//----------------------------------------//

When import the download file from the server the following functions will process the importing line by line
```
//Process RT lines
process_ID(the_string:string);
process_IR(the_string:string);
process_LR(the_string:string);
process_CH(the_string:string);
process_CD(the_string:string);
process_SR(the_string:string);
process_GR(the_string:string);
process_OD(the_string:string);
process_EE(the_string:string);
process_MM(the_string:string);
process_CC(the_string:string);
process_XX(the_string:string);
process_AR(the_string:string);
process_GA(the_string:string);
```

//----------------------------------------//

```
process_ID(the_string:string) - identify the LAB, check password etc.
process_IR(the_string:string) - identify the instrument
process_LR(the_string:string) - identify the lot number
process_CH(the_string:string) - identify the header for importing configuration data
process_CD(the_string:string) - import configuration data
process_SR(the_string:string) - update lab data
process_GR(the_string:string) - update group stats
process_OD(the_string:string) - process outliered lab data
process_EE(the_string:string) - identify error messages
process_MM(the_string:string) - process server messages
process_CC(the_string:string) - process server comments
process_XX(the_string:string) - check CRC
process_AR(the_string:string) - process action event
process_GA(the_string:string) - process group coordinator //---This function is a major function to export to a RT format file and POST it to the server//
function TForm_EXPORT.perform_lab_export:integer;
{
    POINT OF ENTRY for exporting a lab's RT data.
}
var
    records_to_export:integer;
begin
    refresh_tables;

current_transaction:=RTQX_TRANSACTION.begin_transaction;
    if (Assigned(Form_CONNECT)=FALSE) or
      (Form_CONNECT.Visible=FALSE) then
        INI_LAST_EXPORT_FILENAME:=export_filename;
```

```
    records_to_export:=create_export_file_for_one_lab;
    if (master_abort) then
    begin
       try
           CloseFile(export_fp);
       except
       end;

say(rsAborted);

delete_file_if_it_exists(export_filename);

Close;
       RTQX_TRANSACTION.delete_transaction(current_transaction);
    end
    else
    begin
       RTQX_TRANSACTION.end_transaction(current_transaction);
       export_complete:=TRUE;
    end;
end;
```

```
//----------------------------------------//
"perform_lab_expor" function will call transaction unit and transaction unit
has four major functions to build a trasnaction function begin_transaction:integer;
procedure add_lab_to_transaction(trans_id:integer;LAB_ID:integer);
procedure end_transaction(trans_id:integer);
procedure delete_transaction(trans_id:integer);

Transaction unit is used to create the "TRANSACTION" record, which is the
state of the database's LMSes at the time of an export.  This info
is used when RTQA reads back the group stats for the transaction and
needs to rectify them with its own LMSes (as LMSes can change
between the time that a transaction is begun and completed, most
notably for disk based customers).

//----------------------------------------//

//-- This function is a major function to deal with group stats when import
from the server--//
procedure TForm_IMPORT.rectify_group_records;
{
    This processes the GR_Info array.  The GR_Info array will contain any
    and all GR records and any ODs (Outliered Data records) that apply to
    a particular GR) This builds/autocreates the GMS records and does
    all of the "TRANSACTION" stuff with moving out the previous LMSes
    contributions/OD contributions and adding in the new LMS' conributions.
    This gets really involved, as there can be n number of LMSes for any
    GMS, and there can by n GMS for any BC_ID (multi-country), and of
    course the outlier business.  Here goes...

0. If there's nothing in the array.. great!  Just exit.
    1. Cycle through the GR_Info array...
       1.1 set stats.  (this used to be where the outlier code was.. it has been
pulled from this version as of 09/02/99)
       1.2 cycle through LMSes for this GR value (those with the same
```

```
                BC_ID and timestamp).
        1.2.1 if we've reached the end of the LMSes for this BC, or if
              we've moved into the next month, break.
        1.2.2 figure the "old LMS" value, which means deriving this
                from the TRANSACTION_LMS record if one exists.  If one
                does not, the "old LMS" did not exist; it's new.
        1.2.3 pull out the "old LMS" stats out of the running GMS stats
        1.2.4 add the current LMS stats to the running GMS stats
    1.3 outstats
    1.4 find/autocreate and write GMS
  2. set the "refresh data" flag so that SUMMARY gets refreshed.
}
var
   i,LMS_ID:integer;
   m_accum,c_accum:TCalcStats;
   lms_m_accum,lms_c_accum:TCalcStats;
   conversion_factor : double;
begin
   //Step 0.
   if (Length(GR_Info)<1) then
      exit;

add_notes(rsRectifyGroupStats);

m_accum:=TCalcStats.Create;
   c_accum:=TCalcStats.Create;
   lms_m_accum:=TCalcStats.Create;
   lms_c_accum:=TCalcStats.Create;
   m_accum.InitStats;
   c_accum.InitStats;

with DM.wwTable_L_MONTHLY_STATS do
   begin
      IndexFieldNames:='BCFG_ID;REP_MONTH';
      //Step 1.
      for i:=0 to (Length(GR_Info)-1) do
      begin
         //Step 1.1
         if (is_group_coordinator = False) then begin m_accum.SetStats(GR_Info[i].mtd_num_pts,GR_Info[i].mtd_mean,GR_Info[i].mtd_SD);

c_accum.SetStats(GR_Info[i].cum_num_pts,GR_Info[i].cum_mean,GR_Info[i].cum_SD);

//Step 1.2
             FindNearest([GR_Info[i].BC_ID,GR_Info[i].timestamp]);
             while (EOF=FALSE) and (conversation_id<>3) do
             begin
                //Step 1.2.1
                if (FieldByName('BCFG_ID').AsInteger<>GR_Info[i].BC_ID or
                   (FieldByName('REP_MONTH').AsDateTime<>GR_Info[i].timestamp)
then
                   break;

// get conversion factor
                conversion_factor := 1.0;
                if (DM.get_UNIT_from_ID(FieldByName('UNIT_ID').AsInteger)=True)
then
```

```
conversion_factor:=DM.wwTable_UNIT.FieldByName('CONV_FACTOR').AsFloat;

//Step 1.2.2
            LMS_ID:=FieldByName('id').AsInteger;

pull_out_stats_from_TRANSACTION_LMS(LMS_ID,lms_m_accum,lms_c_accum,
                  conversion_factor);

//Step 1.2.3
            m_accum.OutStats_CS(lms_m_accum);
            c_accum.OutStats_CS(lms_c_accum);
            //Do We need conversion factor here ? NO, we don't
            // By debug, it seems no difference
            //m_accum.OutStats_CS(lms_m_accum,conversion_factor);
            //c_accum.OutStats_CS(lms_c_accum,conversion_factor);

//Step 1.2.4
            m_accum.InStats(FieldByName('MTD_NUM_PTS').AsInteger,
               FieldByName('MTD_MEAN').AsFloat,
               FieldByName('MTD_SD').AsFloat,conversion_factor);
            c_accum.InStats(FieldByName('CUM_NUM_PTS').AsInteger,
               FieldByName('CUM_MEAN').AsFloat,
               FieldByName('CUM_SD').AsFloat,conversion_factor);
            Next;
          end;

//Step 1.3 m_accum.GetStats(GR_Info[i].mtd_num_pts,GR_Info[i].mtd_mean,GR_Info[i].mtd_SD);

c_accum.GetStats(GR_Info[i].cum_num_pts,GR_Info[i].cum_mean,GR_Info[i].cum_SD);
        end;// if (is_group_coordinator = False)

//Step 1.4
        DM.find_or_autocreate_GMS(GR_Info[i].BC_ID,
          GR_Info[i].timestamp,
          GR_Info[i].COUNTRY_ID);
        DM.wwTable_G_MONTHLY_STATS.Edit;
        DM.wwTable_G_MONTHLY_STATS.FieldByName('MTD_NUM_PTS').AsInteger:=
          GR_Info[i].mtd_num_pts;
        DM.wwTable_G_MONTHLY_STATS.FieldByName('MTD_MEAN').AsFloat:=
          GR_Info[i].mtd_mean;
        DM.wwTable_G_MONTHLY_STATS.FieldByName('MTD_SD').AsFloat:=
          GR_Info[i].mtd_SD;
        DM.wwTable_G_MONTHLY_STATS.FieldByName('CUM_NUM_PTS').AsInteger:=
          GR_Info[i].cum_num_pts;
        DM.wwTable_G_MONTHLY_STATS.FieldByName('CUM_MEAN').AsFloat:=
          GR_Info[i].cum_mean;
        DM.wwTable_G_MONTHLY_STATS.FieldByName('CUM_SD').AsFloat:=
          GR_Info[i].cum_SD;
        DM.wwTable_G_MONTHLY_STATS.Post;

DM.Database1.ApplyUpdates([DM.wwTable_G_MONTHLY_STATS]);
      end; // for i
    end; // with DM.wwTable_L_MONTHLY_STATS //Step 2.
    refresh_DATA:=TRUE;//refresh SUMMARY & DATA ENTRY screens
```

```
end;

procedure TForm_IMPORT.pull_out_stats_from_TRANSACTION_LMS(LMS_ID:integer;
   var lms_m_accum:TCalcStats;var lms_c_accum:TCalcStats;const
conversion_factor:double);
{
   1. If there isn't a transaction_lms then there wasn't any data for this
      tmirl/month before we synced.  So, just fill in zeros and exit.
   2. get unit conversion factor (now replaced by conversion_factor parameter)
   3. load the (non-unit converted) LMS values into the accumulators
}
begin
   //Step 1.
   if (DM.get_TRANSACTION_LMS_from_ID(current_transaction,LMS_ID)=FALSE) then
   begin
      lms_m_accum.InitStats;
      lms_c_accum.InitStats;
      exit;
   end;

//Step 2. // no loger need it, we pass conversion_factor as a parameter
   {if (DM.get_UNIT_from_ID(unit_id)=FALSE) then
      exit;
   conversion_factor:=DM.wwTable_UNIT.FieldByName('CONV_FACTOR').AsFloat;}

//Step 3.
   with DM.wwTable_TRANSACTION_LMS do
   begin
      lms_m_accum.SetStats(FieldByName('MTD_NUM_PTS').AsInteger,
         FieldByName('MTD_MEAN').AsFloat*conversion_factor,
         FieldByName('MTD_SD').AsFloat*conversion_factor);
      lms_c_accum.SetStats(FieldByName('CUM_NUM_PTS').AsInteger,
         FieldByName('CUM_MEAN').AsFloat*conversion_factor,
         FieldByName('CUM_SD').AsFloat*conversion_factor);
   end;
end;
```

Webhost Synchronize with Client Functionality

The following PL-SQL procedures implement the Webhost Synchronize with Client Functionality:

This is the code that handles the syncronization on the server.
Upload stores the uploaded file to the database and validates it.
Start_Proc adds the ProcessFile job to the Job Queue.
ProcessFile parses the file and adds/modifies the lab data.
Check_Status returns the status as Done/NotDone/Server Error/Server Inaccessible/WrongKey.

```
procedure check_status(
    iOid in integer) is cStatus     varchar2(15);
    flag        integer;
    failures    integer;
    iJobId  integer;

cursor ch is
        select status, job_id
        from upload_histories
        where oid = iOid;
begin
    select count(*) into flag
    from upload_histories
    where oid = iOid;

if flag != 0 then
        open ch;
        loop
            fetch ch into cStatus, iJobId;
            exit when ch%notfound;

if cStatus = 'Start' then
                exit;
            end if;
        end loop;
        close ch;

select count(1) into flag
        from dba_jobs
        where job = iJobId;

if flag != 0 then
            select failures into failures
            from dba_jobs
```

```
                where job = iJobId;

if failures is not null then
                cStatus := 'Fail';
            end if;
        end if;
    else
        cStatus := 'Wrong';
    end if;

if cStatus = 'Wrong' then
        htp.p('MM;WrongKey');
    elsif cStatus = 'Process' then
        htp.p('MM;NotDone');
    elsif cStatus = 'Fail' then
        htp.p('MM;Server Unaccessible');
    else
        htp.p('MM;Done');
    end if;

Exception
    when others then
        htp.p('EE;Server Error');
end;
------------------------------------------------
procedure upload(
    file in varchar2) is line          long;
    cCode         varchar2(50);
    cName         varchar2(250);
    iNum          integer;
    pos           integer;
    pos1          integer;
    iLabID        integer;
    cPasswd       varchar2(50);
    str           varchar2(450);
    cHeader       varchar2(250);
    host          varchar2(100);
    addr          varchar2(100);
    CurCrc        integer;
    CurCrc1       integer;
    len           integer;
    checkSum      varchar2(8);
    cLine         varchar2(100);
    cSum          varchar2(8);
    cFullName     varchar2(256);
    dLastUpdate   date;
```

```
    dDate      date;
    iFirstLab  integer;
    f_out      UTL_FILE.FILE_TYPE;
    f_log      UTL_FILE.FILE_TYPE;
    iIdError   integer;
    iIdNum     integer;
    IError integer;

begin
    iError := 0;

pos := instr(file, ':');
    if pos = 0 then
        pos := instr(file, '/', -1);
        if pos != 0 then
            cFileName := substr(file, pos+1);
        else
            cFileName := file;
        end if;
    else
        cFileName := file;
    end if;

dDate := to_date('01/01/1999', 'dd/mm/rrrr');

select length, cont.oid, fullname
    into filelen, iOid, cFullName
    from websys.ows_content cont, websys.ows_object obj
    where cont.oid = obj.oid
    and owner = 'RTQC'
    and name = cFileName;

host := owa_util.get_cgi_env('remote_host');
    addr := owa_util.get_cgi_env('remote_addr');

pos := instr(file, '\', -1);
    if pos != 0 then
        cFileName := substr(file, pos+1);
    else
        pos := instr(file, '/', -1);
        if pos != 0 then
            cFileName := substr(file, pos+1);
        else
            cFileName := file;
        end if;
    end if;

insert into upload_histories
```

```
    (filename, file_length, lab_id, date_from,
      http_user_agent, remote_host, remote_addr,
      remote_user, time_stamp, lgrp_id, oid, status)
values
    (cFileName, filelen, 2, null, 'Sync', host,
      addr, null, sysdate, null, iOid, 'Start');
commit;

str := to_char(sysdate, 'yyyyddmmhh24miss');
str := '/2_'||str||'\'||file;

websys.owa_content.rename_document(cFullName, str);

lrdata.set_object(iOid);
CurCrc := 1;
CurCrc1 := 1;
iFirstLab := 0;
cSum := null;

line := lrdata.get_line;

if line is null then
    htp.p('MM;'||iOid||'.rt1;');
    f_out := UTL_FILE.fopen(out_dir, iOid||'.rt1', 'w');
    f_log := UTL_FILE.fopen(log_dir, iOid||'.log', 'w');
    cLine := 'VV;RT1;1;';
    printLine(f_out, cLine, CurCrc);
    cLine := 'EE;not RT file';
    printLine(f_out, cLine, CurCrc);
    UTL_FILE.put_line(f_out, 'XX;'||toCode(CurCrc));
    UTL_FILE.put_line(f_out, '^~');
    UTL_FILE.fclose(f_out);
    cLine := 'RT file format error';
    UTL_FILE.put_line(f_log, cLine);
    UTL_FILE.fclose(f_log);
    update upload_histories set
        status = 'Error'
    where oid = iOid;
    return;
end if;

pos := instr(line, ';', 1, 1);
cCode := substr(line, 1, pos-1);

pos1 := instr(line, ';', 1, 4);
if pos1 = 0 then
    cHeader := substr(line,1,100)||';';
```

```
else
      cHeader := substr(line, 1, pos1);
end if;

if cCode != 'VV' or pos = 0 then
      htp.p('MM;'||iOid||'.rt1;');
      f_out := UTL_FILE.fopen(out_dir, iOid||'.rt1', 'w');
      f_log := UTL_FILE.fopen(log_dir, iOid||'.log', 'w');
      cLine := 'VV;RT1;1;';
      printLine(f_out, cLine, CurCrc);
      cLine := 'EE;RT file format error';
      printLine(f_out, cLine, CurCrc);
      UTL_FILE.put_line(f_out, 'XX;'||toCode(CurCrc));
      UTL_FILE.put_line(f_out, '^~');
      UTL_FILE.fclose(f_out);
      cLine := 'RT file format error';
      UTL_FILE.put_line(f_log, cLine);
      UTL_FILE.fclose(f_log);
      update upload_histories set
            status = 'Error'
      where oid = iOid;
      return;
end if;

len := length(line) + 2;
CurCrc1 := CRC(line||CR||LF, len, CurCrc1);

begin
loop line := lrdata.get_line;
      exit when line is null;

line := ltrim(rtrim(line));

pos := instr(line, ';');
      cCode := substr(line, 1, pos-1);

if cCode = 'XX' then
            pos1 := instr(line, ';', 1, 2);
            if pos1 != 0 then
                  cSum := substr(line, pos+1, pos1-pos-1);
            else
                  cSum := substr(line, pos+1);
            end if;
            cSum := substr(cSum,1,8);

checkSum := toCode(CurCrc1);
```

```
        if checkSum != cSum and cSum != 'DEADBEEF' then
            raise checksum_error;
        end if;
    else
        len := length(line) + 2;
        CurCrc1 := CRC(line||CR||LF, len, CurCrc1);
    end if;

if cCode = 'ID' then
        pos1 := instr(line, ':', 1, 2);
        cName := substr(line, pos+1, pos1-pos-1);

pos := instr(line, ';', 1, 3);
        if pos != 0 then
            str := substr(line, pos1+1, pos-pos1-1);
        else
            str := substr(line, pos1+1);
        end if;

select count(*) into iNum
        from lab_prefs
        where login_name = cName;

if iNum != 0 then
            select lab_id, password, last_update
            into iLabId, cPasswd, dDate
            from lab_prefs
            where login_name = cName;

if cPasswd is not null and str = cPasswd then
                if iFirstLab = 0 then
                    iFirstLab := iLabId;
                end if;
            end if;

end if;
    end if;
end loop;

Exception
    when checksum_error then
        cSum := null;
        iError := 1;
    when others then
        htp.p('MM;'||iOid||'.rt1;');
        f_out := UTL_FILE.fopen(out_dir, iOid||'.rt1', 'w');
        f_log := UTL_FILE.fopen(log_dir, iOid||'.log', 'w');
```

```
            cLine := cHeader;
            printLine(f_out, cLine, CurCrc);
            cLine := 'EE;Server Error ';
            printLine(f_out, cLine, CurCrc);
            UTL_FILE.put_line(f_out, 'XX;'||toCode(CurCrc));
            UTL_FILE.put_line(f_out, '^~');
            UTL_FILE.fclose(f_out);
            cLine := 'Database unaccessible';
            UTL_FILE.put_line(f_log, cLine);
            UTL_FILE.fclose(f_log);
            update upload_histories set
                status = 'Error'
            where oid = iOid;
            iError := 1;
            return;
    end;

htp.p('MM;'||iOid||'.rt1;');

if iFirstLab != 0 then
            update upload_histories set
                lab_id = iFirstLab,
                status = 'Start'
            where oid = iOid;
            commit;
    else --htp.p(ioid);
            f_out := UTL_FILE.fopen(out_dir, to_char(iOid)||'.rt1', 'w');
--htp.p('aa');
            cLine := cHeader;
            printLine(f_out, cLine, CurCrc);
--htp.p('aa');
            cLine := 'EE;Id Error';
            printLine(f_out, cLine, CurCrc);
--htp.p('aa');
            UTL_FILE.put_line(f_out, 'XX;'||toCode(CurCrc));
            UTL_FILE.put_line(f_out, '^~');
            UTL_FILE.fclose(f_out);

f_log := UTL_FILE.fopen(log_dir, iOid||'.log', 'w');
            cLine := 'Id Error';
            UTL_FILE.put_line(f_log, cLine);
            UTL_FILE.fclose(f_log);

update upload_histories set
                status = 'Error'
            where oid = iOid;
```

```
        return;
    end if;

if cSum is null then
        f_out := UTL_FILE.fopen(out_dir, iOid||'.rt1', 'w');
        f_log := UTL_FILE.fopen(log_dir, iOid||'.log', 'w');
        cLine := cHeader;
        printLine(f_out, cLine, CurCrc);
        cLine := 'EE;checksum Error:'||checkSum;
        printLine(f_out, cLine, CurCrc);
        UTL_FILE.put_line(f_out, 'XX;'||toCode(CurCrc));
        UTL_FILE.put_line(f_out, '^~');
        UTL_FILE.fclose(f_out);
        cLine := 'Checksum error: '||checkSum;
        UTL_FILE.put_line(f_log, cLine);
        UTL_FILE.fclose(f_log);
        update upload_histories set
            status = 'Error',
            lab_id = iFirstLab
        where oid = iOid;
        return;
    end if;

Exception
    when utl_file.invalid_path then
        htp.p('MM;Server Error1');
    when utl_file.invalid_mode then
        htp.p('MM;Server Error2');
    when utl_file.invalid_operation then
        htp.p('MM;Server Error3');
    when utl_file.read_error then
        htp.p('MM;Server Error4');
    when utl_file.write_error then
        htp.p('MM;Server Error5');
    when utl_file.invalid_filehandle then
        htp.p('MM;Server Error6');
    when utl_file.internal_error then
        htp.p('MM;Server Error7');
    when others then
        f_out := UTL_FILE.fopen(out_dir, iOid||'.rt1', 'w');
        f_log := UTL_FILE.fopen(log_dir, iOid||'.log', 'w');
        cLine := 'VV;RT1;1;';
        printLine(f_out, cLine, CurCrc);
        cLine := 'EE;Server Error';
        printLine(f_out, cLine, CurCrc);
        UTL_FILE.put_line(f_out, 'XX;'||toCode(CurCrc));
        UTL_FILE.put_line(f_out, '^~');
        UTL_FILE.fclose(f_out);
```

```
        cLine := 'Database unaccessible';
        UTL_FILE.put_line(f_log, cLine);
        UTL_FILE.fclose(f_log);
        update upload_histories set
                status = 'Error'
        where oid = iOid;
end;

----------------------------------------
procedure start_proc(
        P_oid in integer) is cName     varchar2(50);
        cStatus   varchar2(10);
        iJobId    integer;
        iNum      integer;
        iFailure  integer;
        f_log     UTL_FILE.FILE_TYPE;
        f_out     UTL_FILE.FILE_TYPE;
        cLine     varchar2(50);
        CurCrc    integer;
begin
        CurCrc := 1;

select count(*) into iNum
        from upload_histories
        where oid = P_OID;

if iNum = 0 then
                htp.p('MM;WrongKey');
                return;
        end if;

select status, job_id
        into cStatus, iJobId
        from upload_histories
        where oid = P_OID;

if cStatus = 'Start' then update upload_histories set
                        status = 'Process'
                where oid = P_OID;
                commit;

--              rtqc_sync.processFile(P_OID);

dbms_job.submit(iJobId,
```

```
            'rtqc_sync.processFile('||P_OID||');', sysdate);

update upload_histories set
            job_id = iJobId
        where oid = P_OID;
        commit;

htp.p('MM;In Process');
    elsif cStatus = 'Process' then
        select count(*) into iFailure
        from dba_jobs
        where failures is not null
        and job = iJobId;

if iFailure = 0 then
            htp.p('MM;In Process');
        else
            f_out := UTL_FILE.fopen(out_dir, P_OID||'.rt1', 'w');
            cLine := 'VV;RT1;1;';
            printLine(f_out, cLine, CurCrc);
            cLine := 'EE;Database Unaccessible';
            printLine(f_out, cLine, CurCrc);
            UTL_FILE.put_line(f_out, 'XX;'||toCode(CurCrc));
            UTL_FILE.put_line(f_out, '^~');
            UTL_FILE.fclose(f_out);
            cLine := 'Database unaccessible';
            f_log := UTL_FILE.fopen(log_dir, P_OID||'.log', 'w');
            UTL_FILE.put_line(f_log, cLine);
            UTL_FILE.fclose(f_log);
            update upload_histories set
                status = 'Done'
            where oid = iOid;
            htp.p('MM;Done');
        end if;
    else
        htp.p('MM;Done');
    end if;

exception
    when others then
        f_out := UTL_FILE.fopen(out_dir, P_OID||'.rt1', 'w');
        cLine := 'VV;RT1;1;';
        printLine(f_out, cLine, CurCrc);
        cLine := 'EE;Server Unaccessible';
        printLine(f_out, cLine, CurCrc);
        UTL_FILE.put_line(f_out, 'XX;'||toCode(CurCrc));
        UTL_FILE.put_line(f_out, '^~');
        UTL_FILE.fclose(f_out);
```

```
        f_log := UTL_FILE.fopen(log_dir, P_OID||'.log', 'w');
        cLine := 'Database unaccessible';
        UTL_FILE.put_line(f_log, cLine);
        UTL_FILE.fclose(f_log);
        update upload_histories set
              status = 'Done'
        where oid = iOid;
        htp.p('MM;Done');
end;
```

---

```
procedure processFile(
     P_OID in integer) is pos          integer;
     pos1         integer;
     counter      integer := 0;
     iLabId       lab.id%type;
     cTestCode    test.code%type;
     cLotNumber   lot.lot_number%type;
     cInstCode    instrument.code%type;
     cReagCode    reagent.code%type;
     cMethCode    method.code%type;
     cReag        reagent.code%type;
     cMeth        method.code%type;
     cReagUse     instrument.reag_usage%type;
     cMethUse     instrument.meth_usage%type;
     iUnitId      unit.id%type;
     cName        INSTRUMENT.NAME%TYPE;
     iListId      integer;
     cInstSer     varchar2(15);
     iShift       integer;
     L_LEVEL      integer;
     rep_date     date;
     num_pts      integer;
     mean         varchar2(15);
     cUnit        varchar2(20);
     cDate        varchar2(25);
     cTime        varchar2(25);
     L_TEST       TEST.CODE%TYPE;
     iNum         integer;
     iNum1        integer;
     iNum2        integer;
     iNum3        integer;

L_EXPIR      varchar2(10);
     i            integer;
```

```
j           integer;
str         varchar2(50);
line        varchar2(500);
len         integer := 0;

dMonth      date;
flag        integer;
m_flag      integer;
cLot1       varchar2(15);
cLot2       varchar2(15);
cLot3       varchar2(15);

wrong_inst  boolean;
wrong_lot   boolean;
wrong_test  boolean;
wrong_reag  boolean;
wrong_mth   boolean;
wrong_unit  boolean;
wrong_lab   boolean;
wrong_id    boolean;

iCount      integer;
iCount1     integer;
iCount2     integer;
iCount3     integer;
f_out       UTL_FILE.FILE_TYPE;
f_log       UTL_FILE.FILE_TYPE;

iNumPts     integer;
nMean       number;
nSd         number;
iBCId       integer;
iLmsId      integer;
iCntryId    integer;
cCode       varchar2(3);
old_inst    varchar2(10);
old_lot     varchar2(15);

last_date   date;
ver         varchar2(10);
file        varchar2(240);
cLabLogin   varchar2(40);
iOldLab     integer;
content     long;

iError      integer;
cTableName  varchar2(20);
cFullName   varchar2(120);
```

```
    CurCrc         integer;
    checkSum       varchar2(8);
    cLine          varchar2(100);
    id_flag        integer;
    inst_flag      varchar2(6);
    cOutLiered     varchar2(1);
    lot_flag       varchar2(15);
    id_str         varchar2(40);
    inst_str       varchar2(500);
    cPasswd        varchar2(30);

iOldId         integer;
    cOldInst       varchar2(10);
    cOldSer        varchar2(20);
    cOldLot1       varchar2(15);
    cOldLot2       varchar2(15);
    cOldLot3       varchar2(15);

last_month     date;
    last_lot       lot.lot_number%type;
    last_id        integer;
    last_lab       integer;
    last_shift     integer;
    last_lmsid     integer;

last_inst      instrument.code%type;
    last_test      test.code%type;
    last_reag      reagent.code%type;
    last_meth      method.code%type;
    last_ser       varchar2(15);
    last_unitid    unit.id%type;
    dOldest        date;
    iOutlierCount  integer;

cursor Id is
        select lms.id
        from l_monthly_stats lms, base_config bc
        where bc.inst_code = cInstCode
--      and (nvl(bc.lot_number,'0') = nvl(cLot1,'0') or
--          nvl(bc.lot_number,'0') = nvl(cLot2,'0') or
--          nvl(bc.lot_number,'0') = nvl(cLot3,'0'))
--      and bc.id = lms.bcfg_id
--      and lab_id = iLabId
        and inst_ser = cInstSer;

begin
    old_inst := 's';
    old_lot := 'd';
```

```
last_id := 0;
last_lab := 0;
last_lot := null;
last_shift := 0;
last_lmsid := 0;

iCount := 0;
iCount1 := 0;
iCount2 := 0;
iCount3 := 0;

CurCrc := 1;

iLabId := 0;
iOldLab := 0;
iLabCount := 0;
iOldId := 0;

select length, obj.oid, obj.name
into filelen, iOid, file
from websys.ows_content cont, websys.ows_object obj
where cont.oid = obj.oid
and obj.oid = p_oid;

iOid := P_OID;
lrdata.set_object(iOid);

pos := instr(file, '\', -1);
if pos != 0 then
    cFileName := substr(file, pos+1);
else
    cFileName := file;
end if;
```
---
```
begin f_log := UTL_FILE.fopen(log_dir, P_OID||'.log', 'w');

if utl_file.is_open(f_out) then
    utl_file.fclose(f_out);
end if;
f_out := UTL_FILE.fopen(out_dir, P_OID||'.rt1', 'w');

if filelen = 0 then
    cLine := 'VV;RT1;1';
```

```
            printLine(f_out, cLine, CurCrc);
            update upload_histories set
                status = 'Done'
            where oid = P_OID;
            commit;

cLine := 'RT file format error';
            printLine(f_out, cLine, CurCrc);
            UTL_FILE.put_line(f_out, 'XX;'||toCode(CurCrc));
            UTL_FILE.put_line(f_out, '^~');
            UTL_FILE.fclose(f_out);

cLine := 'RT fiel format Error';
            UTL_FILE.put_line(f_log, cLine);
            UTL_FILE.fclose(f_log);
            return;
        end if;
----------------------------------------------------------------
    line := lrdata.get_line;

pos := instr(line, ';', 1,1);
    cCode := substr(line, 1, pos-1);

if cCode != 'VV' or pos = 0 then
        cLine := 'VV;RT1;1';
        printLine(f_out, cLine, CurCrc);
        update upload_histories set
            status = 'Done'
        where oid = P_OID;
        commit;
        cLine := 'RT file format error';
        printLine(f_out, cLine, CurCrc);
        UTL_FILE.put_line(f_out, 'XX;'||toCode(CurCrc));
        UTL_FILE.put_line(f_out, '^~');
        UTL_FILE.fclose(f_out);

cLine := 'RT file format Error';
        UTL_FILE.put_line(f_log, line);
        UTL_FILE.fclose(f_log);
        return;
    end if;

--------RT file---------- pos1 := instr(line, ';', 1, 4);
    if pos1 = 0 then
        str := line||';';
```

```
else
     str := substr(line, 1, pos1);
end if;

cLine := str||to_char(sysdate, 'mm/dd/yyyy_hh24:mi:ss');
printLine(f_out, cLine, CurCrc);

pos := instr(line, ';', 1, 5);

if pos != 0 then
     cTime := substr(line, pos1+1, pos-pos1-1);
else
     cTime := substr(line, pos1+1);
end if;

if length(cTime) >= 19 and pos1 != 0 then
     dTimeStamp := to_date(cTime,'mm/dd/yyyy_hh24:mi:ss');
else
     dTimeStamp := null;
end if;

---------------------------------------------------
  loop
  begin line := lrdata.get_line;
  exit when line is null;

line := ltrim(rtrim(line));

pos := instr(line, ';');
  cCode := substr(line, 1, pos-1);

if pos != 0 and cCode != 'CC' and cCode != 'XX'
       and cCode != '^' and cCode != '^~' then
-------------------------------ID-------------------------------
  if cCode = 'ID' then
       wrong_id := false;

pos1 := instr(line, ';', 1, 2);
       cName := substr(line, pos+1, pos1-pos-1);

pos := instr(line, ';', 1, 3);
       if pos != 0 then
            str := substr(line, pos1+1, pos-pos1-1);
       else
            str := substr(line, pos1+1);
       end if;
```

```
select count(*) into iNum
from lab_prefs
where login_name = cName;

if iNum != 0 then
     select lab_id, password into iLabId, cPasswd
     from lab_prefs
     where login_name = cName;
end if;

--htp.p(iOldlab);
--        ----wrong password or login-------------- if nvl(str,'0') != nvl(cPassWd,'0') or iNum = 0 then
     wrong_id := true;
     if iOldLab != 0 then
          select login_name into cName
          from lab_prefs
          where lab_id = iOldLab;

id_flag := 0;
          inst_flag := '0';
          lot_flag := '0';
          id_str := 'ID:'||cName;

printSummary(cName, iLabId, f_out, iCount,
               iCount1, iCount2,iCount3, CurCrc);

iNum := iCount + iCount1 + iCount2 + iCount3;
          line := 'Lab: '||iOldLab||
               ' Instrument: '||cInstCode;
          if cInstSer != 'dummy' then
               line := line ||' Serial #: '||cInstSer;
          end if;
          line := line ||' Lot Number: '||cLot1||
               ' '||cLot2||' '||cLot3;
          UTL_FILE.put_line(f_log, line);

line := '--Inserted: '||iCount||
               ' Updated: '||iCount1||
               ' Deleted: '||iCount2||
               ' Unchanged: '||iCount3;
          UTL_FILE.put_line(f_log, line);

iNum := 0;
          iCount := 0;
          iCount1 := 0;
```

```
            iCount2 := 0;
            iCount3 := 0;

end if;
    iOldLab := 0;
    raise id_error;
end if;

--    ----password and login are correct----------
      wrong_id := false;

--htp.p(iLabId);
--            ------------First Lab in RT file----------------------
      if iOldLab = 0 then
            iOldLab := iLabId;
            id_flag := 0;
            inst_flag := '0';
            lot_flag := '0';
            id_str := 'ID:'||cName;
            iLabCount := iLabCount + 1;
            lab_list(iLabCount) := iLabId;
            iNum := 0;
            iCount := 0;
            iCount1 := 0;
            iCount2 := 0;
            iCount3 := 0;
            iOldId := 0;

--            -----------New lab in RT file-----------------
      elsif iOldLab != iLabId and not wrong_id then
--            --------print last lab summary---------
            if iOldLab != 0 then
                  select login_name into cName
                  from lab_prefs
                  where lab_id = iOldLab;

id_flag := 0;
                  inst_flag := '0';
                  lot_flag := '0';
                  id_str := 'ID:'||cName;

printSummary(cName, iLabId, f_out, iCount,
                        iCount1, iCount2,iCount3, CurCrc);

iNum := iCount + iCount1 + iCount2 + iCount3;
                  line := 'Lab: '||iOldLab||
                        ' Instrument: '||cInstCode;
                  if cInstSer != 'dummy' then
```

```
                    line := line ||' Serial #: '||cInstSer;
                end if;
                line := line ||' Lot Number: '||cLot1||
                    ' '||cLot2||' '||cLot3;
                UTL_FILE.put_line(f_log, line);

line := '--Inserted: '||iCount||
                    ' Updated: '||iCount1||
                    ' Deleted: '||iCount2||
                    ' Unchanged: '||iCount3;
                UTL_FILE.put_line(f_log, line);

iCount := 0;
                iCount1 := 0;
                iCount2 := 0;
                iCount3 := 0;
            end if;

iOldId := 0;
            iNum := 0;
            for i in 1..iLabCount loop
                if iLabId = lab_list(i) then
                    iNum := 1;
                    exit;
                end if;
            end loop;
            if iNum = 0 then
                iLabCount := iLabCount + 1;
                lab_list(iLabCount) := iLabId;
            end if;
        end if;

iOldLab := iLabId;

select login_name into cName
        from lab_prefs
        where lab_id = iLabId;

cLine := 'ID;'||cName||';'||cPasswd||';';
        printLine(f_out, cLine, CurCrc);

flag := 0;

htp.p('CC;updating database (lab:'||iLabId||')');
htp.nl;
    end if;
-------------------------IR----------------------------------
    if cCode = 'IR' and not wrong_id then
```

```
wrong_inst := false;
wrong_lot := false;

pos1 := instr(line, ';', 1, 2);
cInstCode := substr(line, pos+1, pos1-pos-1);

select count(*) into iNum
from instrument
where code = cInstCode;

if iNum = 0 then
     wrong_inst := true;
     raise inst_error;
end if;

pos := instr(line, ';', 1, 3);
cInstSer := substr(line, pos1+1, pos-pos1-1);

if cInstSer is null then
     cInstSer := 'dummy';
end if;

pos1 := instr(line, ';', 1, 4);
str := substr(line, pos+1, pos1-pos-1);
pos := instr(line, ';', 1, 5);
cLot1 := substr(line, pos1+1, pos-pos1-1);

select count(*) into iNum
from lot
where lot_number = cLot1;

if iNum = 0 and cLot1 is not null then
     wrong_lot := true;
     cLotNumber := cLot1;
     raise lot_error;
end if;

pos1 := instr(line, ';', 1, 6);
str := substr(line, pos+1, pos1-pos-1);
pos := instr(line, ';', 1, 7);
cLot2 := substr(line, pos1+1, pos-pos1-1);

select count(*) into iNum
from lot
where lot_number = cLot2;

if iNum = 0 and cLot2 is not null then
```

```
        wrong_lot := true;
        cLotNumber := cLot2;
        raise lot_error;
end if;

pos1 := instr(line, ';', 1, 8);
str := substr(line, pos+1, pos1-pos-1);
pos := instr(line, ';', 1, 9);
cLot3 := substr(line, pos1+1, pos-pos1-1);

select count(*) into iNum
from lot
where lot_number = cLot3;

if iNum = 0 and cLot3 is not null then
        wrong_lot := true;
        cLotNumber := cLot3;
        raise lot_error;
end if;

pos1 := instr(line, ';', 1, 10);
str := substr(line, pos+1, pos1-pos-1);
pos := instr(line, ';', 1, 11);
cMethCode := substr(line, pos1+1, pos-pos1-1);
if length(cMethCode) = 0 or cMethCode = '_' then
        cMethCode := null;
end if;

if cMethCode is not null then
        select count(*) into iNum
        from method
        where code = cMethCode;
else
        iNum := 1;
end if;

if iNum = 0 and cMethCode is not null then
        raise mth_error;
end if;

pos1 := instr(line, ';', 1, 12);
str := substr(line, pos+1, pos1-pos-1);
pos := instr(line, ';', 1, 13);
if pos = 0 then
        cReagCode := substr(line, pos1+1);
else
        cReagCode := substr(line, pos1+1, pos-pos1-1);
end if;
```

```
if length(cReagCode) = 0 or cReagCode = '_' then
    cReagCode := null;
end if;

if cReagCode is not null then
    select count(*) into iNum
    from reagent
    where code = cReagCode;
else
    iNum := 1;
end if;

if iNum = 0 and cReagCode is not null then
    raise reag_error;
end if;

inst_str := line;
iOutlierCount := 0;

printLine(f_out, inst_str, CurCrc);

iListId := rtqc_update_data.createInstList(
    iLabId, cInstCode,
    cInstSer, cLot1, cLot2, cLot3,
    cReagCode, cMethCode);

if iListId = 0 then
    wrong_inst := true;
end if;

select reag_usage, meth_usage
into cReagUse, cMethUse
from instrument
where code = cInstCode;

if iOldId = 0 then
    iOldId := iListId;
    cOldInst := cInstCode;
    cOldSer := cInstSer;
    cOldLot1 := cLot1;
    cOldLot2 := cLot2;
    cOldLot3 := cLot3;
elsif iOldId != iListId then
    select login_name into cName
    from lab_prefs
    where lab_id = iOldLab;
```

```
            id_str := 'ID:'||cName;

iNum := iCount + iCount1 + iCount2 + iCount3;
            line := 'Lab: '||iOldLab||
                    ' Instrument: '||cOldInst;
            if cOldSer != 'dummy' then
                    line := line ||' Serial #: '||cOldSer;
            end if;
            line := line ||' Lot Number: '||cOldLot1||
                    ' '||cOldLot2||' '||cOldLot3;
            UTL_FILE.put_line(f_log, line);

line := '--Inserted: '||iCount||
                    ' Updated: '||iCount1||
                    ' Deleted: '||iCount2||
                    ' Unchanged: '||iCount3;

iOldId := iListId;
            cOldInst := cInstCode;
            cOldSer := cInstSer;
            cOldLot1 := cLot1;
            cOldLot2 := cLot2;
            cOldLot3 := cLot3;
        end if;
    end if;
------------------------LR------------------------------
    if substr(line, 1, pos-1) = 'LR' and not wrong_id
        and not wrong_inst and not wrong_lot then wrong_lot := false;

pos1 := instr(line, ';', 1, 2);
        if pos1 = 0 then
            cLotNumber := substr(line, pos+1);
        else
            cLotNumber := substr(line, pos+1, pos1-pos-1);
        end if;

select count(*) into iNum
        from lot
        where lot_number = cLotNumber;

if iNum = 0 then
            wrong_lot := true;
            raise lot_error;
        end if;
    end if;
------------------------SR------------------------------
```

```
if substr(line, 1, pos-1) = 'SR' and not wrong_id and
    ( not wrong_lot and  not wrong_inst ) then
begin
      pos1 := instr(line, ';', 1, 2);
      cTestCode := substr(line, pos+1, pos1-pos-1);

select count(*) into iNum from test
      where code = cTestCode;

if iNum = 0 then
            raise test_error;
      end if;

select count(*) into iNum
      from inst_tests
      where test_code = cTestCode
      and inst_code = cInstCode;

if iNum = 0 then
            raise test_error;
            wrong_test := true;
      end if;

pos := instr(line, ';', 1, 3);
      cMeth := substr(line, pos1+1, pos-pos1-1);
      if length(cMeth) = 0 or cMeth = '_' then
            cMeth := null;
            iNum := 1;
      else
            select count(*) into iNum
            from method
            where code = cMeth;
      end if;

if iNum = 0 then
            raise mth_error;
      end if;

pos1 := instr(line, ';', 1, 4);
      cReag := substr(line, pos+1, pos1-pos-1);
      if length(cReag) = 0 or cReag = '_' then
            cReag := null;
            iNum := 1;
      else
            select count(*) into iNum
            from reagent
            where code = cReag;
      end if;
```

```
if iNum = 0 then
    raise reag_error;
end if;

pos := instr(line, ';', 1, 5);
cUnit := substr(line, pos1+1, pos-pos1-1);

select count(*) into iNum
from unit
where description = cUnit
and test_code = cTestCode;

if iNum = 0 then
    raise unit_error;
end if;

select id into iUnitId
from unit
where test_code = cTestCode
and description = cUnit;

pos1 := instr(line, ';', 1, 6);
iShift := substr(line, pos+1, pos1-pos-1);

iNum := rtqc_update_data.insertTest(iListId,
        cTestCode, cReagCode, cMethCode, iUnitId,
        iShift);

if iNum = -1 then
    raise tlist_error;
end if;

pos := instr(line, ';', 1, 7);
cDate := substr(line, pos1+1, pos-pos1-1);
pos1 := instr(line, ';', 1, 8);
cTime := substr(line, pos+1, pos1-pos-1);

iError := rtqc_update_data.checkDateTime(cDate, cTime);

if iError != 0 then
    raise datetime_error;
end if;

pos := instr(line, ';', 1, 9);
str := substr(line, pos1+1, pos-pos1-1);

if isvalidNumber(str) then
```

```
if iNumPts > 9999 then
        iNumPts := 9999;
    elsif iNumPts < 0 then
        iNumPts := -1*iNumPts;
    else
        iNumPts := to_number(str);
    end if;
else
    iNumPts := 1;
end if;

pos1 := instr(line, ';', 1, 10);
str := substr(line, pos+1, pos1-pos-1);
if not isValidNumber(str) then
    nMean := 0.0;
elsif nMean > 999999 then
    nMean := 999999;
else
    nMean := to_number(str);
end if;

pos := instr(line, ';', 1, 11);
str := substr(line, pos1+1, pos-pos1-1);

if length(str) = 0 then
    nSd := null;
elsif isValidNumber(str) then
    if to_number(str) <= 0 then
        nSd := null;
    elsif nSd > 999999 then
        nSD := 999999;
    else
        nSd := to_number(str);
    end if;
else
    nSd := null;
end if;

--------------------Update Database--------------------------------- flag := 0;

rep_date := to_date(cDate ||' '|| cTime,
        'mm/dd/yyyy hh24:mi:ss');

dMonth := first_day(rep_date);
```

```
if cMethUse = 'INST' then
     cMeth := cMethCode;
end if;
if cReagUse = 'INST' then
     cReag := cReagCode;
end if;

iLmsId := Prep.PrepWriteLD(cTestCode, cLotNumber,
     cInstSer, cInstCode, cReagCode, cMethCode,
     iLabId, iShift, iUnitId, rep_date);

flag := rtqc_update_data.insertData(rep_date, iLmsId,
          iNumPts, nMean, nSd);

if last_month != dMonth or
     nvl(last_shift,0) != nvl(iShift,0) or
     last_lab != iLabId or
     last_lot != cLotNumber or
     last_id != iListId or
     last_month is null or
     last_lot is null then if last_lot is null or last_lot != cLotNumber then
          last_lot := cLotNumber;
     end if;

if last_id = 0 or last_id != iListId then
          last_id := iListId;
     end if;

if last_lab != iLabId then
          last_lab := iLabId;
     end if;

if last_month is null or last_month != dMonth then
          last_month := dMonth;
     end if;

if last_shift = 0 or last_shift != iShift then
          last_shift := iShift;
     end if;

if flag = 1 or flag = 3 then
          rtqc_update_data.checkstatslist(iLabId, iShift,
          cLotNumber, iListId, dMonth, flag);
     end if;
end if;
```

```
if flag = 1 or flag = 2 then select outliered into cOutLiered
    from lab_data
    where lms_id = iLmsId
    and rep_date_time = rep_date;

if cOutLiered = 'Y' then
        if id_flag = 0 then
            id_flag := iLabId;
        end if;

if iOutlierCount = 0 then
            printLine(f_out, inst_str, CurCrc);
        end if;

iOutlierCount := iOutlierCount + 1;

if lot_flag = '0' or lot_flag != cLotNumber then
            lot_flag := cLotNumber;
            cLine := 'LR;'||cLotNumber;
            printLine(f_out, cLine, CurCrc);
        end if;

cLine := replace(line, 'SR', 'OD');
        printLine(f_out, cLine, CurCrc);
    end if;
end if;

exception
    when no_data_found then
        cLine := 'EE;lab:'||cName||'; Database Unaccessible: '
            ||cTestCode||'('||cDate||')';
        printLine(f_out, cLine, CurCrc);
        flag := -1;
    when test_error then
        cLine := 'EE;Lab;'||cName||'; Unkown test: '||
            cTestCode|| ' for instrument '||cInstCode;
        printLine(f_out, cLine, CurCrc);
        cLine := 'Lab: '||iLabId ||
            ' Unkown test: '||cTestCode|| 'for instrument ' ||
            cInstCode;
        UTL_FILE.put_line(f_log, cLine);
        flag := -1;
    when reag_error then
        cLine := 'EE;Unknown reagent: '||cReag||' for test: '||cTestCode;
        printLine(f_out, cLine, CurCrc);
        line := 'Lab: '||iLabId ||' Unkown reagent: '||
```

```
                    cReag;
            UTL_FILE.put_line(f_log, line);
            flag := -1;
        when tlist_error then
            cLine := 'EE;Can not change unit: '||cUnit||' for test:
'||cTestCode;
            printLine(f_out, cLine, CurCrc);
            line := 'Lab: '||iLabId ||' Can not change unit: '||
                cUnit||' for test: '||cTestCode;
            UTL_FILE.put_line(f_log, line);
            flag := -1;
        when mth_error then
            cLine := 'EE;Unknown method: '||cMeth||' for test: '||cTestCode;
            printLine(f_out, cLine, CurCrc);
            line := 'Lab: '||iLabId ||' Unkown method: '||
                cMeth;
            UTL_FILE.put_line(f_log, line);
            flag := -1;
        when unit_error then
            cLine := 'EE;Wrong unit: '||cUnit||' for test: '||cTestCode;
            printLine(f_out, cLine, CurCrc);
            line := 'Lab: '||iLabId ||
                'Unknown Unit: '||cUnit;
            UTL_FILE.put_line(f_log, line);
            flag := -1;
        when datetime_error then
            cLine := 'EE;Wrong date/time: '||cDate||' '||cTime;
            printLine(f_out, cLine, CurCrc);
            line := 'Lab: '||iLabId ||
                'Date/Time format eroor: '||cDate||' '||cTime;
            UTL_FILE.put_line(f_log, line);
            flag := -1;
        when others then
            cLine := 'EE;lab:'||cName||'; Database Unaccessible: '
                ||cTestCode||'('||cDate||')';
            printLine(f_out, cLine, CurCrc);
            line := 'Lab: '||iLabId ||
                ' Can not update database: '||
                cTestCode||'('||cDate||')';
            UTL_FILE.put_line(f_log, line);
            flag := -1;
    end;

if flag != -1 then
        if flag = 1 then
            iCount := iCount + 1;
        elsif flag = 2 then
            iCount1 := iCount1 + 1;
```

```
            elsif flag = 3 then
                    iCount2 := iCount2 + 1;
            else
                    iCount3 := iCount3 + 1;
            end if;
        end if;
    end if;
/*
-------------------------CH-------------------------------------
        if cCode = 'CH' then pos1 := instr(line, ';', 1, 2);
        cTableName := substr(line, pos+1, pos1-pos-1);
        i := 3;
        while instr(line, ';', 1, i) != 0 loop
                pos := instr(line, ';', 1, i);
                cFieldName(i-2) := substr(line, pos1+1, pos-pos1-1);
                pos1 := pos;
                i := i + 1;

end loop;
        iFieldNum := i - 3;

end if;

-------------------------CD-------------------------------------
        if cCode = 'CD' and iFieldNum != 0 then
                for i in 1..iFieldNum loop
                        pos1 := instr(line, ';', 1, i+1);
                        cField(i) := substr(line, pos+1, pos1-pos-1);
                        pos := pos1;
                end loop;

insertTable(cTableName);
        end if;
*/
----------------------------------------------------------------
        if cCode = 'MM' then
                pos1 := instr(line, ';', 1, 2);
                str := substr(line, pos+1, pos1-pos-1);

if upper(str) = 'RESYNC' then pos := instr(line, ';', 1, 3);
                cInstCode := substr(line, pos1+1, pos-pos1-1);

select count(*) into iNum
                from instrument
```

```
                where code = cInstCode;

if iNum = 0 then
                wrong_inst := true;
                raise inst_error;
        end if;

pos1 := instr(line, ';', 1, 4);
        cInstSer := substr(line, pos+1, pos1-pos-1);
        if cInstSer is null then
                cInstSer := 'dummy';
        end if;

--htp.p(cInstSer);
        pos := instr(line, ';', 1, 5);
        cLot1 := substr(line, pos1+1, pos-pos1-1);

--htp.p(cLot1);

select count(*) into iNum
        from lot
        where lot_number = cLot1;

if iNum = 0 and cLot1 is not null then
                wrong_lot := true;
                cLotNumber := cLot1;
                raise lot_error;
        end if;

pos1 := instr(line, ';', 1, 6);
        cLot2 := substr(line, pos+1, pos1-pos-1);

--htp.p(cLot2);
        select count(*) into iNum
        from lot
        where lot_number = cLot2;

if iNum = 0 and cLot2 is not null then
                wrong_lot := true;
                cLotNumber := cLot2;
                raise lot_error;
        end if;

pos := instr(line, ';', 1, 7);
        cLot3 := substr(line, pos1+1, pos-pos1-1);

--htp.p(cLot3);
        select count(*) into iNum
```

```
                from lot
                where lot_number = cLot3;

if iNum = 0 and cLot3 is not null then
                    wrong_lot := true;
                    cLotNumber := cLot3;
                    raise lot_error;
            end if;

open Id;
            loop
                    fetch Id into iLmsId;
                    exit when Id%notfound;

delete from lab_data
                    where lms_id = iLmsId;
                    commit;
            end loop;
            close Id;

end if;
    end if;
------------------------------------------------------------
    end if;

exception
        when utl_file.invalid_path then
            cLine := 'EE:Lab;'||cName ||
                ';Server error: invalid path';
            printLine(f_out, cLine, CurCrc);
            line := 'Lab: '||iLabId ||' Server error: invalid path';
            UTL_FILE.put_line(f_log, line);
            exit;
        when utl_file.invalid_mode then
            cLine := 'EE;Lab;'||cName ||
                ';Server error: invalid operation';
            printLine(f_out, cLine, CurCrc);
            line := 'Lab: '||iLabId||' Server error: invalid mode';
            UTL_FILE.put_line(f_log, line);
            exit;
        when utl_file.invalid_operation then
            cLine := 'EE:Lab;'||cName ||
                ';Server error: invalid operation';
            printLine(f_out, cLine, CurCrc);
            line := 'Lab: '||iLabId||' Server error: invalid operation';
            UTL_FILE.put_line(f_log, line);
            exit;
        when utl_file.read_error then
```

```
            cLine := 'EE;Lab;'||cName||
                  ';Server error: read error';
            printLine(f_out, cLine, CurCrc);
            line := 'Lab: '||iLabId||' Server error: read error';
            UTL_FILE.put_line(f_log, line);
            exit;
        when reag_error then
            cLine := 'EE;Lab;'||cName ||
                  ';Unknown reagent: '||cReagCode;
            printLine(f_out, cLine, CurCrc);
            line := 'Lab: '||iLabId||' Unknown reagent: '||cReagCode;
            UTL_FILE.put_line(f_log, line);
        when mth_error then
            cLine := 'EE;Lab;'||cName||
                  'Unknown method: '||cMethCode;
            printLine(f_out, cLine, CurCrc);
            line := 'Lab: '||iLabId||' Unknown method: '||cMethCode;
            UTL_FILE.put_line(f_log, line);
        when inst_error then
            cLine := 'EE;Lab;'||cName||
                  ';Unknown instrument: '||cInstCode;
            printLine(f_out, cLine, CurCrc);
            line := 'Lab: '||iLabId||' Unknown instrument: '||cInstCode;
            UTL_FILE.put_line(f_log, line);
        when lot_error then
            cLine := 'EE;Lab;'||cName||
                  ';Unknown lot number: '||cLotNumber;
            printLine(f_out, cLine, CurCrc);
            line := 'Lab: '||iLabId||' Unknown lot number: '||cLotNumber;
            UTL_FILE.put_line(f_log, line);
        when id_error then
            cLine := 'EE;Id error for lab: '||cName;
            printLine(f_out, cLine, CurCrc);
            line := 'Id error for lab: '||cName;
            UTL_FILE.put_line(f_log, line);
            wrong_id := true;
        when others then
            cLine := 'EE;Lab;'||cName||
                  ';Database Error: '||cInstCode||
                  ','||cLotNumber||','||cTestCode||','||cDate;
            printLine(f_out, cLine, CurCrc);
            line := 'Lab: '||iLabId||' Database Error : '||cInstCode||','||cInstSer||
                  ','||cLotNumber||','||cTestCode||','||cDate||' '||cTime;
            UTL_FILE.put_line(f_log, line);
    end;
    end loop;
```

```
exception
    when utl_file.invalid_path then
        cLine := 'EE;Server error: invalid path';
        printLine(f_out, cLine, CurCrc);
        line := 'Server error: invalid path';
        UTL_FILE.put_line(f_log, line);
        flag := -1;
    when utl_file.invalid_mode then
        cLine := 'EE;Server error: invalid mode';
        printLine(f_out, cLine, CurCrc);
        line := 'Server error: invalid mode';
        UTL_FILE.put_line(f_log, line);
        flag := -1;
    when utl_file.invalid_operation then
        cLine := 'EE;Server error: invalid operation';
        printLine(f_out, cLine, CurCrc);
        line := 'Server error: invalid operation';
        UTL_FILE.put_line(f_log, line);
        flag := -1;
    when utl_file.read_error then
        cLine := 'EE;Server error: read_error';
        printLine(f_out, cLine, CurCrc);
        line := 'Server error: read error';
        UTL_FILE.put_line(f_log, line);
        flag := -1;
    when others then
        cLine := 'EE;Server error: Can''t update database';
        printLine(f_out, cLine, CurCrc);
        line := 'Server Unaccessible: ';
        UTL_FILE.put_line(f_log, line);
end;

----------------------------stats----------------------------
if nvl(iLabId,0) != 0 and not wrong_id then
if flag != -1 then
    select login_name into cName
    from lab_prefs
    where lab_id = iOldLab;

printSummary(cName, iLabId, f_out, iCount,
        iCount1, iCount2,iCount3, CurCrc);

iNum := iCount + iCount1 + iCount2 + iCount3;
    line := 'Lab: '||iOldLab||
        ' Instrument: '||cInstCode;
    if cInstSer != 'dummy' then
        line := line ||' Serial #: '||cInstSer;
    end if;
```

```
        line := line ||' Lot Number: '||cLot1||
                ' '||cLot2||' '||cLot3;
        UTL_FILE.put_line(f_log, line);

line := '--Inserted: '||iCount||
                ' Updated: '||iCount1||
                ' Deleted: '||iCount2||
                ' Unchanged: '||iCount3;
        UTL_FILE.put_line(f_log, line);

end if;
    end if;

------------------------------------------------------- last_date := sysdate;

if dTimeStamp is null then
    for i in 1..iLabCount loop
        select last_update into dOldest
        from lab_prefs
        where lab_id = lab_list(i);

if dOldest is null then
            dOldest := to_date('01/01/1997', 'dd/mm/rrrr');
        end if;

if dOldest < last_date then
            last_date := dOldest;
        end if;
    end loop;
else
    last_date := dTimeStamp;
end if;

rtqc_rtqa_func.get_qc_setup(
    f_out, last_date, CurCrc);

for i in 1..iLabCount loop
    iLabId := lab_list(i);
    rtqc_rtqa_func.get_baseconfig(
        f_out, last_date, iLabId, CurCrc);
end loop;

for i in 1..iLabCount loop
    iLabId := lab_list(i);
    rtqc_rtqa_func.get_group_stats(
        f_out, iLabId, CurCrc);
    update lab_prefs set
```

```
            last_update = sysdate
        where lab_id = iLabId;
    end loop;

UTL_FILE.put_line(f_out, 'XX;'||toCode(CurCrc));
    UTL_FILE.put_line(f_out, '^~');
    UTL_FILE.fclose(f_out);
    UTL_FILE.fclose(f_log);

update upload_histories set
        time_stamp = sysdate,
        date_from = sysdate,
        status = 'Done'
    where oid = P_OID;
    commit;

htp.p('CC;Done');
htp.nl;

Exception
    when others then
        update upload_histories set
            status = 'Done'
        where oid = P_OID;
        commit;
        line := 'Server Unaccessible';
        UTL_FILE.put_line(f_log, line);
        UTL_FILE.fclose(f_out);
        UTL_FILE.fclose(f_log);
end;
----------------------------------------
procedure printLine(
    f_out in utl_file.file_type,
    cLine in varchar2,
    CurCrc in out integer) is len    integer;
begin
    len := length(cLine) + 2;
    CurCrc := CRC(cLine||CR||LF, len, CurCrc);
    UTL_FILE.put_line(f_out, cLine);
end;
----------------------------------------
procedure printSummary(
    cName in varchar2,
    iLabId in integer,
    f_out in utl_file.file_type,
    iCount in integer,
```

```
        iCount1 in integer,
        iCount2 in integer,
        iCount3 in integer,
        CurCrc in out integer) is cLine   varchar2(400);
        iNum    integer;
        len     integer;
        host    varchar2(50);
        addr    varchar2(50);
begin
        iNum := iCount + iCount1 + iCount2 + iCount3;

cLine := 'MM;lab;'||cName||';Total data points read: '||iNum;
        printLine(f_out, cLine, CurCrc);

cLine := 'MM;lab;'||cName||';Total data inserted: '||iCount;
        printLine(f_out, cLine, CurCrc);

if iCount1 != 0 then
            cLine := 'MM;lab;'||cName||';Total data updated: '||iCount1;
            printLine(f_out, cLine, CurCrc);
        end if;

if iCount2 != 0 then
            cLine := 'MM;lab;'||cName||';Total data deleted: '||iCount2;
            printLine(f_out, cLine, CurCrc);
        end if;
end;
```

This is the package that contains the functions to output the return RT file.
Get_BaseConfig outputs the Assay records linked to the lab's instruments.
Get_QC_Setup outputs the configuration records that have been touched since the last sync.
Get_Group_Stats outputs the peer group stats.
Resync outputs all data for the lab.

```
package body rtqc_rtqa_func is

TYPE t_type is table of varchar2(20) INDEX BY BINARY_INTEGER;
    cFieldName   t_type;
    cField       t_type;
    iFieldNum    integer;
    cFileName    varchar2(40);
```

```
    LF constant char(1) := chr(10);
    CR constant char(1) := chr(13);

procedure get_baseconfig(
    f_out in utl_file.file_type,
    last_date in date,
    iLabId in integer,
    CurCrc in out integer) is flag        integer;
    cLine       varchar2(800);
    bc_rec base_config%rowtype;
    cInstCode   instrument.code%type;
    cLot1       lot.lot_number%type;
    cLot2       lot.lot_number%type;
    cLot3       lot.lot_number%type;
    cLot        lot.lot_number%type;
    cReagCode   varchar2(10);
    cMethCode   varchar2(10);

cursor bc is
        select * from base_config
        where inst_code = cInstCode
        and nvl(lot_number,'0') = nvl(cLot,'0');

cursor inst is
        select distinct inst_code, lot1, lot2, lot3
        from inst_list
        where lab_id = iLabId;
begin
    flag := 0;

open inst;
    loop
        fetch inst into cInstCode, cLot1, cLot2, cLot3;
        exit when inst%notfound;

cLot := cLot1;
        open bc;
        loop
            fetch bc into bc_rec;
            exit when bc%notfound;

if bc_rec.last_touch > last_date then if flag = 0 then
                    cLine := 'CH;base_config;id;'||
                        'inst_code;lot_number;'||
```

```
                    'test_code;meth_code;'||
                    'reag_code;assay_mean;'||
                    'assay_high;assay_low;'||
                    'last_touch;';
            printLine(f_out, upper(cLine), CurCrc);
            flag := 1;
        end if;
        if bc_rec.reag_code is null then
            cReagCode := '_';
        else
            cReagCode := bc_rec.reag_code;
        end if;
        if bc_rec.meth_code is null then
            cMethCode := '_';
        else
            cMethCode := bc_rec.meth_code;
        end if;
        cLine := 'CD;'||bc_rec.id||';'||bc_rec.inst_code||';'||
            bc_rec.lot_number||';'||bc_rec.test_code||';'||
            cMethCode||';'||cReagCode||';'||
            bc_rec.assay_mean||';'||bc_rec.assay_high||';'||
            bc_rec.assay_low||';'||
            to_char(bc_rec.last_touch,'mm/dd/rrrr_hh24:mi:ss')||';';
        printLine(f_out, cLine, CurCrc);
        end if;
end loop;
close bc;

cLot := cLot2;
open bc;
loop
    fetch bc into bc_rec;
    exit when bc%notfound;
    if bc_rec.last_touch > last_date then if flag = 0 then
            cLine := 'CH;base_config;id'||
                    'inst_code;lot_number;'||
                    'test_code;meth_code;'||
                    'reag_code;assay_mean;'||
                    'assay_high;assay_low;'||
                    'last_touch;';
            printLine(f_out, upper(cLine), CurCrc);
            flag := 1;
        end if;
        if bc_rec.reag_code is null then
            cReagCode := '_';
        else
```

```
              cReagCode := bc_rec.reag_code;
        end if;
        if bc_rec.meth_code is null then
              cMethCode := '_';
        else
              cMethCode := bc_rec.meth_code;
        end if;
        cLine := 'CD;'||bc_rec.id||';'||bc_rec.inst_code||';'||
              bc_rec.lot_number||';'||bc_rec.test_code||';'||
              cMethCode||';'||cReagCode||';'||
              bc_rec.assay_mean||';'||bc_rec.assay_high||';'||
              bc_rec.assay_low||';'||
              to_char(bc_rec.last_touch,'mm/dd/rrrr_hh24:mi:ss')||';';
        printLine(f_out, cLine, CurCrc);
        end if;
end loop;
close bc;

cLot := cLot3;
open bc;
loop
        fetch bc into bc_rec;
        exit when bc%notfound;

if bc_rec.last_touch > last_date then
        if flag = 0 then
              cLine := 'CH;base_config;id'||
                    'inst_code;lot_number;'||
                    'test_code;meth_code;'||
                    'reag_code;assay_mean;'||
                    'assay_high;assay_low;'||
                    'last_touch;';
              printLine(f_out, upper(cLine), CurCrc);
              flag := 1;
        end if;
        if bc_rec.reag_code is null then
              cReagCode := '_';
        else
              cReagCode := bc_rec.reag_code;
        end if;
        if bc_rec.meth_code is null then
              cMethCode := '_';
        else
              cMethCode := bc_rec.meth_code;
        end if;
        cLine := 'CD;'||bc_rec.id||';'||bc_rec.inst_code||';'||
              bc_rec.lot_number||';'||bc_rec.test_code||';'||
              cMethCode||';'||cReagCode||';'||
```

```
                    bc_rec.assay_mean||';'||bc_rec.assay_high||';'||
                    bc_rec.assay_low||';'||
                 to_char(bc_rec.last_touch,'mm/dd/rrrr_hh24:mi:ss')||';';
                 printLine(f_out, cLine, CurCrc);
                 end if;
              end loop;
              close bc;

end loop;
        close inst;
end;

procedure get_qc_setup(
        f_out in utl_file.file_type,
        last_date in date,
        CurCrc in out integer) is ver         varchar2(10);
        flag        integer;
        cLine       varchar2(800);
        len         integer;
        i           integer;
        dOldest     date;
        cReagCode   varchar2(10);
        cMethCode   varchar2(10);

act_rec     action%rowtype;
        ai_rec      action_x_inst%rowtype;
        cntry_rec   country%rowtype;
        cm_rec      ctl_material%rowtype;
        ic_rec      inst_class%rowtype;
        inst_rec    instrument%rowtype;
        it_rec      inst_tests%rowtype;
        itm_rec     inst_test_meth%rowtype;
        labs_rec    lab%rowtype;
        lg_rec      lab_group%rowtype;
        llg_rec     lgrp_lab%rowtype;
        lglg_rec    lab_group_lab_group%rowtype;
        lots_rec    lot%rowtype;
        llk_rec     lot_lot_kit%rowtype;
        lk_rec      lot_kit%rowtype;
        mth_rec     method%rowtype;
        reag_rec    reagent%rowtype;
        tst_rec     test%rowtype;
        trm_rec     test_reag_meth%rowtype;
        uni_rec     unit%rowtype;
        tm_rec      test_meth%rowtype;
```

```
cursor act is
    select * from action;
cursor ai is
    select * from action_x_inst;
cursor bc is
    select * from base_config;
cursor cntry is
    select * from country;
cursor cm is
    select * from ctl_material;
cursor inst is
    select * from instrument;
cursor ic is
    select * from inst_class;
cursor it is
    select * from inst_tests;
cursor itm is
    select * from inst_test_meth;
cursor labs is
    select * from lab;
cursor lg is
    select * from lab_group;
cursor lglg is
    select * from lab_group_lab_group;
cursor llg is
    select * from lgrp_lab;
cursor lots is
    select * from lot;
cursor lk is
    select * from lot_kit;
cursor llk is
    select * from lot_lot_kit;
cursor mth is
    select * from method;
cursor reag is
    select * from reagent;
cursor tst is
    select * from test;
cursor trm is
    select * from test_reag_meth;
cursor uni is
    select * from unit;
cursor tm is
    select * from test_meth;

begin
    flag := 0;
```

```
open reag;
loop
    fetch reag into reag_rec;
    exit when reag%notfound;

if reag_rec.last_touch > last_date then
        if flag = 0 then
            cLine := 'CH;reagent;'||
                'code;name;last_touch;';
            printLine(f_out, upper(cLine), CurCrc);
            flag := 1;
        end if;

cLine := 'CD;'||reag_rec.code||';'||reag_rec.name||';'||
            to_char(reag_rec.last_touch,'mm/dd/rrrr_hh24:mi:ss')||';';
        printLine(f_out, cLine, CurCrc);
    end if;
end loop;
close reag;

flag := 0;
open mth;
loop
    fetch mth into mth_rec;
    exit when mth%notfound;

if mth_rec.last_touch > last_date then
        if flag = 0 then
            cLine := 'CH;method;'||
                'code;name;last_touch;';
            printLine(f_out, upper(cLine), CurCrc);
            flag := 1;
        end if;
        cLine := 'CD;'||mth_rec.code||';'||mth_rec.name||';'||
            to_char(mth_rec.last_touch,'mm/dd/rrrr_hh24:mi:ss')||';';
        printLine(f_out, cLine, CurCrc);
    end if;
end loop;
close mth;

flag := 0;
open tst;
loop
    fetch tst into tst_rec;
    exit when tst%notfound;

if tst_rec.last_touch > last_date then
        if flag = 0 then
```

```
                cLine := 'CH;test;code;name;last_touch;'||
                    'german_acc_switches;german_prc_switches;'||
                    'gr_acc_absolute1;gr_acc_absolute2;gr_acc_absolute3;'||
                    'gr_acc_percent1;gr_acc_percent2;gr_acc_percent3;'||
                    'gr_acc_sd1;gr_acc_sd2;gr_acc_sd3;'||
                    'gr_prc_absolute1;gr_prc_absolute2;gr_prc_absolute3;'||
                    'gr_prc_percent1;gr_prc_percent2;gr_prc_percent3;'||
                    'gr_acc_combination;gr_prc_combination;';
                printLine(f_out, upper(cLine), CurCrc);
                flag := 1;
            end if;
            cLine := 'CD;'||tst_rec.code||';'||tst_rec.name||';'||
                to_char(tst_rec.last_touch,'mm/dd/rrrr_hh24:mi:ss')||';'||
                tst_rec.german_acc_switches||';'||
                tst_rec.german_prc_switches||';'||
                tst_rec.gr_acc_absolute1||';'||
                tst_rec.gr_acc_absolute2||';'||
                tst_rec.gr_acc_absolute3||';'||
                tst_rec.gr_acc_percent1||';'||
                tst_rec.gr_acc_percent2||';'||
                tst_rec.gr_acc_percent3||';'||
                tst_rec.gr_acc_sd1||';'||
                tst_rec.gr_acc_sd2||';'||
                tst_rec.gr_acc_sd3||';'||
                tst_rec.gr_prc_absolute1||';'||
                tst_rec.gr_prc_absolute2||';'||
                tst_rec.gr_prc_absolute3||';'||
                tst_rec.gr_prc_percent1||';'||
                tst_rec.gr_prc_percent2||';'||
                tst_rec.gr_prc_percent3||';'||
                tst_rec.gr_acc_combination||';'||
                tst_rec.gr_prc_combination||';';
            printLine(f_out, cLine, CurCrc);
        end if;
    end loop;
    close tst;

flag := 0;
    open cm;
    loop
        fetch cm into cm_rec;
        exit when cm%notfound;
        if cm_rec.last_touch > last_date then
            if flag = 0 then
                cLine := 'CH;ctl_material;'||
                    'id;name;last_touch;';
                printLine(f_out, upper(cLine), CurCrc);
                flag := 1;
```

```
            end if;
            cLine := 'CD;'||cm_rec.id||';'||cm_rec.name||';'||
                  to_char(cm_rec.last_touch,'mm/dd/rrrr_hh24:mi:ss')||';';
            printLine(f_out, cLine, CurCrc);
      end if;
end loop;
close cm;

flag := 0;
open lots;
loop
      fetch lots into lots_rec;
      exit when lots%notfound;
      if lots_rec.last_touch > last_date then
            if flag = 0 then
                  cLine := 'CH;lot;lot_number;expir_date;matl_id;'||
                        'lot_level;level_desc;last_touch;';
                  printLine(f_out, upper(cLine), CurCrc);
                  flag := 1;
            end if;
            cLine := 'CD;'||lots_rec.lot_number||';'||to_char(lots_rec.expir_date,
'mm-dd-rrrr') ||';';
            cLine := cLine ||lots_rec.matl_id||';'||lots_rec.lot_level||';';
            cLine := cLine
||lots_rec.level_desc||';'||to_char(lots_rec.last_touch,'mm/dd/rrrr_hh24:mi:ss')||';';
            printLine(f_out, cLine, CurCrc);
      end if;
end loop;
close lots;

flag := 0;
open cntry;
loop
      fetch cntry into cntry_rec;
      exit when cntry%notfound;
      if cntry_rec.last_touch > last_date then
            if flag = 0 then
                  cLine := 'CH;country;'||
                        'id;name;last_touch;';
                  printLine(f_out, upper(cLine), CurCrc);
                  flag := 1;
            end if;
            cLine := 'CD;'||cntry_rec.id||';'||cntry_rec.name||';'||
                  to_char(cntry_rec.last_touch,'mm/dd/rrrr_hh24:mi:ss')||';';
            printLine(f_out, cLine, CurCrc);
      end if;
end loop;
close cntry;
```

```
flag := 0;
open uni;
loop
      fetch uni into uni_rec;
      exit when uni%notfound;
      if uni_rec.last_touch > last_date then
            if flag = 0 then
                  cLine := 'CH;unit;id;description;conv_factor;'||
                        'test_code;unit_type;default_dp;last_touch;';
                  printLine(f_out, upper(cLine), CurCrc);
                  flag := 1;
            end if;
            cLine := 'CD;'||uni_rec.id||';'||uni_rec.description||';';
            cLine := cLine ||uni_rec.conv_factor||';'||uni_rec.test_code||';';
            cLine := cLine ||uni_rec.unit_type||';'||uni_rec.default_dp||';';
            cLine := cLine
||to_char(uni_rec.last_touch,'mm/dd/rrrr_hh24:mi:ss')||';';
            printLine(f_out, cLine, CurCrc);
      end if;
end loop;
close uni;

flag := 0;
open ic;
loop
      fetch ic into ic_rec;
      exit when ic%notfound;
      if ic_rec.last_touch > last_date then
            if flag = 0 then
                  cLine := 'CH;inst_class;'||
                        'id;name;last_touch;';
                  printLine(f_out, upper(cLine), CurCrc);
                  flag := 1;
            end if;
            cLine := 'CD;'||ic_rec.id||';'||ic_rec.name||';'||
                  to_char(ic_rec.last_touch,'mm/dd/rrrr_hh24:mi:ss')||';';
            printLine(f_out, cLine, CurCrc);
      end if;
end loop;
close ic;

flag := 0;
open inst;
loop
      fetch inst into inst_rec;
      exit when inst%notfound;
```

```
if inst_rec.last_touch > last_date then
    if flag = 0 then
        cLine := 'CH;instrument;code;name;manu;'||
            'instc_id;meth_usage;reag_usage;last_touch;';
        printLine(f_out, upper(cLine), CurCrc);
        flag := 1;
    end if;
    cLine := 'CD;'||inst_rec.code||';'||inst_rec.name||';';
    cLine := cLine ||inst_rec.manu||';'||inst_rec.instc_id||';';
    cLine := cLine ||inst_rec.meth_usage||';'||inst_rec.reag_usage||';'||
        to_char(inst_rec.last_touch,'mm/dd/rrrr hh24:mi:ss')||';';
    printLine(f_out, cLine, CurCrc);
end if;
end loop;
close inst;

flag := 0;
open it;
loop
    fetch it into it_rec;
    exit when it%notfound;
    if it_rec.last_touch > last_date then
        if flag = 0 then
            cLine := 'CH;inst_tests;'||
                'inst_code;test_code;seq;unit_id;last_touch';
            printLine(f_out, upper(cLine), CurCrc);
            flag := 1;
        end if;
        cline := 'CD;'||it_rec.inst_code||';'||it_rec.test_code||';';
        cLine := cLine ||it_rec.seq||';'||it_rec.unit_id||';'||
            to_char(it_rec.last_touch,'mm/dd/rrrr hh24:mi:ss')||';';
        printLine(f_out, cLine, CurCrc);
    end if;
end loop;
close it;

flag := 0;
open lk;
loop
    fetch lk into lk_rec;
    exit when lk%notfound;
    if lk_rec.last_touch > last_date then
        if flag = 0 then
            cLine := 'CH;lot_kit;'||
                'id;last_touch;';
            printLine(f_out, upper(cLine), CurCrc);
            flag := 1;
        end if;
```

```
            cLine :=
'CD;'||lk_rec.id||';'||to_char(lk_rec.last_touch,'mm/dd/rrrr_hh24:mi:ss')||';';
            printLine(f_out, cLine, CurCrc);
        end if;
    end loop;
    close lk;

flag := 0;
    open llk;
    loop
        fetch llk into llk_rec;
        exit when llk%notfound;
        if llk_rec.last_touch > last_date then
            if flag = 0 then
                cLine := 'CH;lot_lot_kit;'||
                    'lot_number;lk_id;last_touch;';
                printLine(f_out, upper(cLine), CurCrc);
                flag := 1;
            end if;
            cLine := 'CD;'||llk_rec.lot_number||';'||
llk_rec.lk_id||';'||to_char(llk_rec.last_touch,'mm/dd/rrrr_hh24:mi:ss')||';';
            printLine(f_out, cLine, CurCrc);
        end if;
    end loop;
    close llk;

flag := 0;
    open act;
    loop
        fetch act into act_rec;
        exit when act%notfound;
        if act_rec.last_touch > last_date then
            if flag = 0 then
                cLine := 'CH;action;code;name;last_touch;'||
                    'question_string;instrument_action;icon_string;';
                printLine(f_out, upper(cLine), CurCrc);
                flag := 1;
            end if;
            cLine := 'CD;'||act_rec.code||';'||act_rec.name||';';
            cLine := cLine
||to_char(act_rec.last_touch,'mm/dd/rrrr_hh24:mi:ss')||';'||
                act_rec.question_string||';'||
                act_rec.instrument_action||';'||
                act_rec.icon_string||';';
            printLine(f_out, cLine, CurCrc);
        end if;
```

```
end loop;
close act;

flag := 0;
open ai;
loop
    fetch ai into ai_rec;
    exit when ai%notfound;
    if ai_rec.last_touch > last_date then
        if flag = 0 then
            cLine := 'CH;action_x_inst;'||
                'inst_code;action_code;last_touch;';
            printLine(f_out, upper(cLine), CurCrc);
            flag := 1;
        end if;
        cLine := 'CD;'||ai_rec.inst_code||';'||ai_rec.action_code||';'||
            to_char(ai_rec.last_touch,'mm/dd/rrrr_hh24:mi:ss')||';';
        printLine(f_out, cLine, CurCrc);
    end if;
end loop;
close ai;

flag := 0;
open itm;
loop
    fetch itm into itm_rec;
    exit when itm%notfound;
    if itm_rec.last_touch > last_date then
        if flag = 0 then
            cLine := 'CH;inst_test_meth;inst_code;'||
                'test_code;meth_code;last_touch';
            printLine(f_out, upper(cLine), CurCrc);
            flag := 1;
        end if;
        cLine := 'CD;'||itm_rec.inst_code||';'||itm_rec.test_code||';'||
            itm_rec.meth_code||';'||
            to_char(itm_rec.last_touch,'mm/dd/rrrr_hh24:mi:ss')||';';
        printLine(f_out, cLine, CurCrc);
    end if;
end loop;
close itm;

/* flag := 0;
open tm;
loop
    fetch tm into tm_rec;
    exit when tm%notfound;
```

```
            if tm_rec.last_touch > last_date then
                if flag = 0 then
                    cLine := 'CH;test_meth;'||
                        'test_code;meth_code;';
                    printLine(f_out, upper(cLine), CurCrc);
                    flag := 1;
                end if;
                cLine := 'CD;'||tm_rec.test_code||';'||tm_rec.meth_code||';';
                printLine(f_out, cLine, CurCrc);
            end if;
        end loop;
        close tm;
*/
exception
    when others then
        cLine := 'EE;Server: Can''t get QC setup data';
        printLine(f_out, cLine, CurCrc);
end;

---------------------------------------- procedure printLine(
    f_out in utl_file.file_type,
    cLine in varchar2,
    CurCrc in out integer) is len     integer;
begin
    len := length(cLine) + 2;
    CurCrc := CRC(cLine||CR||LF, len, CurCrc);
    UTL_FILE.put_line(f_out, cLine);
end;

------------------------ procedure resync(
    f_out in utl_file.file_type,
    P_LAB_ID in integer,
    CurCrc in out integer) is iLmsId      integer;
    iBcId       integer;
    dMonth      date;
    iCntryId    integer;
    ld_rec      lab_data%rowtype;
    lms_rec     l_monthly_stats%rowtype;
    gms_rec     g_monthly_stats%rowtype;
    flag        integer;
    cLine       varchar2(500);
    len         integer;
```

```
cInstCode    instrument.code%type;
cTestCode    test.code%type;
cReagCode    reagent.code%type;
cMethCode    method.code%type;
cLotNumber   lot.lot_number%type;
cLot1        lot.lot_number%type;
cLot2        lot.lot_number%type;
cLot3        lot.lot_number%type;
cReag        reagent.code%type;
cMeth        method.code%type;
cInstSer     varchar2(20);
cName        varchar2(20);
cReagUse     instrument.reag_usage%type;
cMethUse     instrument.meth_usage%type;
iUnitId      integer;
cUnit        unit.description%type;
iShift       integer;

cursor lms is
    select id, shift, inst_ser, unit_id
    from l_monthly_stats
    where lab_id = P_LAB_ID
    and bcfg_id = iBcId;

cursor ld is
    select * from lab_data
    where lms_id = iLmsId;

cursor gms is
    select * from g_monthly_stats
    where bcfg_id = iBCId
    and (country_id = iCntryId or
        country_id is null)
    and nvl(mtd_num_pts,0) != 0
    and rep_month in (select distinct month from stats_list
        where lab_id = P_LAB_ID);

cursor bcfg is
    select inst_code, inst_ser, lot1, lot2, lot3, reag_code, meth_code
    from inst_list
    where lab_id = P_LAB_ID;

cursor tl is
    select test_code, tl.reag_code, tl.meth_code
    from test_list tl, inst_list il
    where lab_id = P_LAB_ID
    and il.inst_code = cInstCode
    and il.id = tl.ilist_id
```

```
            and tl.seq is not null;

begin
    select country_id into iCntryId
    from lab
    where id = P_LAB_ID;

select login_name into cName
    from lab_prefs
    where lab_id = P_LAB_ID;

cLine := 'ID;'||cName||';';
    printLine(f_out, cLine, CurCrc);

open bcfg;
    loop
        fetch bcfg
        into cInstCode, cInstSer, cLot1, cLot2, cLot3, cReag, cMeth;
        exit when bcfg%notfound;

select reag_usage, meth_usage into cReagUse, cMethUse
        from instrument
        where code = cInstCode;

if cInstSer = 'dummy' then
            cInstSer := null;
        end if;

cLine :='IR;'||cInstCode||';'||cInstSer||
                ';1;'||cLot1||';2;'||cLot2||';3;'||cLot3||';'||
                cReagUse||';'||cReag||';'||
                cMethUse||';'||cMeth||';';
        printLine(f_out, cLine, CurCrc);

for i in 1..3 loop if i = 1 then
            cLotNumber := cLot1;
        elsif i = 2 then
            cLotNumber := cLot2;
        else
            cLotNumber := cLot3;
        end if;

if cLotNumber is not null then cLine := 'LR;'||cLotNumber||';';
            printLine(f_out, cLine, CurCrc);
```

```
open tl;
loop
    fetch tl into cTestCode, cReagCode, cMethCode;
    exit when tl%notfound;

if cReagCode is null then
        cReagCode := cReag;
    end if;

if cMethCode is null then
        cMethCode := cMeth;
    end if;

select id into iBcId
    from base_config
    where inst_code = cInstCode
    and lot_number = cLotNumber
    and test_code = cTestCode
    and nvl(reag_code,'0') = nvl(cReagCode,'0')
    and nvl(meth_code,'0') = nvl(cMethCode,'0');

open lms;
    loop
        fetch lms into iLmsId, iShift, cInstSer, iUnitId;
        exit when lms%notfound;

select description into cUnit
        from unit
        where id = iUnitId;

open ld;
        loop
            fetch ld into ld_rec;
            exit when ld%notfound;

if cReagCode is null then
                cReagCode := '_';
            end if;
            if cMethCode is null then
                cMethCode := '_';
            end if;

cLine := 'SR;'|| cTestCode ||';'||cMethCode||';';
            cLine := cLine || cReagCode ||';'|| cUnit ||';';
```

```
                        cLine := cLine || iShift ||';';
                        cLine := cLine || to_char(ld_rec.rep_date_time,
'mm/dd/yyyy;hh:mi:ss')||';';
                        cLine := cLine
||ld_rec.num_pts||';'||ld_rec.mean||';'||ld_rec.sd||';';
                        cLine := cLine ||ld_rec.outliered||';';

printLine(f_out, cLine, CurCrc);
                        end loop;
                        close ld;

end loop;
                    close lms;

end loop;
                close tl;
            end if;
            end loop;
        end loop;
        close bcfg;

open bcfg;
        loop
            fetch bcfg into cInstCode, cInstSer, cLot1, cLot2, cLot3, cReag,
cMeth;
            exit when bcfg%notfound;

cLine := 'IR;'||cInstCode;
            printLine(f_out, cLine, CurCrc);

for i in 1..3 loop if i = 1 then
                cLotNumber := cLot1;
            elsif i = 2 then
                cLotNumber := cLot2;
            else
                cLotNumber := cLot3;
            end if;

if cLotNumber is not null then cLine := 'LR;'||cLotNumber||';';
                printLine(f_out, cLine, CurCrc);

open tl;
                loop
                        fetch tl into cTestCode, cReagCode, cMethCode;
```

```
exit when tl%notfound;

if cReagCode is null then
    cReagCode := cReag;
end if;

if cMethCode is null then
    cMethCode := cMeth;
end if;

select count(*) into iBCId
from base_config
where inst_code = cInstCode
and lot_number = cLotNumber
and test_code = cTestCode
and nvl(reag_code,'0') = nvl(cReagCode,'0')
and nvl(meth_code,'0') = nvl(cMethCode,'0');

if iBCId != 0 then select id into iBCId from base_config
where inst_code = cInstCode
and lot_number = cLotNumber
and test_code = cTestCode
and nvl(reag_code,'0') = nvl(cReagCode,'0')
and nvl(meth_code,'0') = nvl(cMethCode,'0');

if cReagCode is null then
    cReagCode := '_';
end if;
if cMethCode is null then
    cMethCode := '_';
end if;

open gms;
loop
    fetch gms into gms_rec;
    exit when gms%notfound;

if gms_rec.country_id is not null then
        select name into cName
        from country
        where id = gms_rec.country_id;
    else
        cName := null;
    end if;

cLine := 'GR;'||cName||';'||cTestCode||
```

```
                    ';'||cMethCode||';'||cReagCode||
                    ';'||to_char(gms_rec.rep_month, 'mm/dd/rrrr')||';';

cline := cLine||gms_rec.mtd_num_pts||';'||
                    fmtNum(gms_rec.mtd_mean)||';'||
                    fmtNum(gms_rec.mtd_sd)||';'||
                    gms_rec.cum_num_pts||';'||
                    fmtNum(gms_rec.cum_mean)||';'||
                    fmtNum(gms_rec.cum_sd)||';';

printLine(f_out, cLine, CurCrc);

end loop;
         close gms;
         end if;

end loop;
       close tl;
     end if;
     end loop;
   end loop;
   close bcfg;
end;

------------------------ procedure get_group_stats(
     f_out in utl_file.file_type,
     P_LAB_ID in integer,
     CurCrc in out integer) is datefrom date;
   TYPE c_type is table of varchar2(10) INDEX BY BINARY_INTEGER;
   cMonth c_type;
   cMonth1      varchar2(10);
   cMonth2      varchar2(10);
   iListId      integer;
   cInstCode    varchar2(15);
   cTestCode    varchar2(15);
   cReagCode    varchar2(15);
   cMethCode    varchar2(15);
   cLotNumber   varchar2(15);
   cLot1   varchar2(15);
   cLot2   varchar2(15);
   cLot3   varchar2(15);
   cReag   varchar2(15);
   cMeth   varchar2(15);
   gms_rec      g_monthly_stats%rowtype;
   iBcId        integer;
```

```
i           integer;
line        varchar2(500);
cLine       varchar2(100);
iNum        integer;
len         integer;
cName       varchar2(50);
iCntryId    integer;

cursor gms is
    select * from g_monthly_stats
    where bcfg_id = iBCId
    and (country_id = iCntryId or
        country_id is null)
    and nvl(mtd_num_pts,0) != 0
    and (to_char(rep_month, 'mm/rrrr') = cMonth1 or
        to_char(rep_month, 'mm/rrrr') = cMonth2);

cursor bcfg is
    select distinct inst_code, lot1, lot2, lot3, reag_code, meth_code
    from inst_list
    where lab_id = P_LAB_ID;

cursor tl is
    select distinct test_code, tl.reag_code, tl.meth_code
    from test_list tl, inst_list il
    where lab_id = P_LAB_ID
    and il.inst_code = cInstCode
    and il.id = tl.ilist_id
    and tl.seq is not null;

begin cMonth1 := to_char(sysdate, 'mm/rrrr');
    cMonth2 := to_char(add_months(sysdate, -1), 'mm/rrrr');

select country_id into iCntryId
    from lab
    where id = P_LAB_ID;

open bcfg;
    loop
        fetch bcfg into cInstCode, cLot1, cLot2, cLot3, cReag, cMeth;
        exit when bcfg%notfound;

cLine := 'IR;'||cInstCode;
        printLine(f_out, cLine, CurCrc);

for i in 1..3 loop
```

```
if i = 1 then
      cLotNumber := cLot1;
elsif i = 2 then
      cLotNumber := cLot2;
else
      cLotNumber := cLot3;
end if;

if cLotNumber is not null then cLine := 'LR;'||cLotNumber||';';
      printLine(f_out, cLine, CurCrc);

open tl;
      loop
            fetch tl into cTestCode, cReagCode, cMethCode;
            exit when tl%notfound;

if cReagCode is null then
                  cReagCode := cReag;
            end if;

if cMethCode is null then
                  cMethCode := cMeth;
            end if;

select count(*) into iBCId from base_config
            where inst_code = cInstCode
            and lot_number = cLotNumber
            and test_code = cTestCode
            and nvl(reag_code,'0') = nvl(cReagCode,'0')
            and nvl(meth_code,'0') = nvl(cMethCode,'0');

if iBCId != 0 then select id into iBCId from base_config
            where inst_code = cInstCode
            and lot_number = cLotNumber
            and test_code = cTestCode
            and nvl(reag_code,'0') = nvl(cReagCode,'0')
            and nvl(meth_code,'0') = nvl(cMethCode,'0');

if cReagCode is null then
                  cReagCode := '_';
            end if;
            if cMethCode is null then
                  cMethCode := '_';
```

```
            end if;

open gms;
        loop
                fetch gms into gms_rec;
                exit when gms%notfound;

if gms_rec.country_id is not null then
                        select name into cName
                        from country
                        where id = gms_rec.country_id;
                else
                        cName := null;
                end if;

cLine := 'GR;'||cName||';'||cTestCode||
                        ';'||cMethCode||';'||cReagCode||
                        ';'||to_char(gms_rec.rep_month, 'mm/dd/rrrr')||';';

cline := cLine||gms_rec.mtd_num_pts||';'||
                        fmtNum(gms_rec.mtd_mean)||';'||
                        fmtNum(gms_rec.mtd_sd)||';'||
                        gms_rec.cum_num_pts||';'||
                        fmtNum(gms_rec.cum_mean)||';'||
                        fmtNum(gms_rec.cum_sd)||';';

printLine(f_out, cLine, CurCrc);

end loop;
            close gms;
            end if;

end loop;
        close tl;
    end if;
    end loop;
    end loop;
    close bcfg;

exception
    when others then
        htp.p('EE;Server: Can''t get group stats');
end;
/*
----------------------------------------------------------
function getField(
    fieldName in varchar2) return varchar2 is
```

```
        i integer;
begin
    for i in 1..iFieldNum loop
        if upper(cFieldName(i)) != upper(fieldName) then
            return cField(i);
        end if;
    end loop;
    return null;
exception
    when others then
        htp.p('rtqc_sync.getField: Error');
END;
```

```
procedure insertTable(
    cTableName in varchar2) is act_rec      action%rowtype;
    ai_rec       action_x_inst%rowtype;
    cntry_rec    country%rowtype;
    cm_rec       ctl_material%rowtype;
    ic_rec       inst_class%rowtype;
    inst_rec     instrument%rowtype;
    it_rec       inst_tests%rowtype;
    itm_rec      inst_test_meth%rowtype;
    lab_rec      lab%rowtype;
    lg_rec       lab_group%rowtype;
    llg_rec      lgrp_lab%rowtype;
    lglg_rec     lab_group_lab_group%rowtype;
    lot_rec      lot%rowtype;
    llk_rec      lot_lot_kit%rowtype;
    lk_rec       lot_kit%rowtype;
    mth_rec      method%rowtype;
    reag_rec     reagent%rowtype;
    tst_rec      test%rowtype;
    trm_rec      test_reag_meth%rowtype;
    uni_rec      unit%rowtype;
    tm_rec       test_meth%rowtype;
    iNum         integer;
    iId          integer;
begin if upper(cTableName) = 'ACTION' then
        act_rec.code := getField('CODE');

if act_rec.code is not null then select count(*) into iNum
```

```
            from action
            where nvl(code,'0') = nvl(act_rec.code,'0');

if iNum = 0 then
                act_rec.name := getField('NAME');
                act_rec.icon_string := getField('ICON_STRING');
                act_rec.question_string := getField('QUESTION_STRING');
                act_rec.instrument_action := getField('INSTRUMENT_ACTION');

insert into action
                    (code, name, icon_string, last_touch,
                    question_string, instrument_action)
                values
                    (act_rec.code, act_rec.name, act_rec.icon_string,
                    sysdate, act_rec.question_string,
                    act_rec.instrument_action);
                commit;
        end if;
        end if;
end if;

if upper(cTableName) = 'ACTION_X_INST' then ai_rec.action_code := getField('ACTION_CODE');
        ai_rec.inst_code := getField('INST_CODE');

select count(1) into iNum
        from action_x_inst
        where action_code = ai_rec.action_code
        and inst_code = ai_rec.inst_code;

if iNum = 0 then
            insert into action_x_inst
                (action_code, inst_code)
            values
                (ai_rec.action_code, ai_rec.inst_code);
            commit;
        end if;
end if;

if upper(cTableName) = 'COUNTRY' then
        cntry_rec.name := getField('NAME');

select count(*) into iNum
        from country
        where name = cntry_rec.name;

if iNum = 0 then
```

```
            select max(id) into ild
            from country;

if ild is null then
                ild := 1;
            else
                ild := ild + 1;
            end if;
            insert into country
            (id, name, last_touch)
            values
            (ild, cntry_rec.name, sysdate);
        end if;
    end if;

if upper(cTableName) = 'CTL_MATERIAL' then
        cm_rec.name := getField('NAME');

select count(*) into iNum
        from ctl_material
        where name = cm_rec.name;

if iNum = 0 then
            select max(id) into ild
            from ctl_material;

if ild is null then
                ild := 1;
            else
                ild := ild + 1;
            end if;
            insert into ctl_material
                (id, name, last_touch)
            values
                (ild, cm_rec.name, sysdate);
        end if;
    end if;

if upper(cTableName) = 'INST_CLASS' then
        cntry_rec.name := getField('NAME');

select count(*) into iNum
        from inst_class
        where name = ic_rec.name;

if iNum = 0 then
            select max(id) into ild
            from inst_class;
```

```
            if iId is null then
                    iId := 1;
            else
                    iId := iId + 1;
            end if;
            insert into inst_class
            (id, name, last_touch)
            values
            (iId, ic_rec.name, sysdate);
      end if;
end if;

if upper(cTableName) = 'INSTRUMENT' then
      inst_rec.code := getField('CODE');

select count(*) into iNum
      from instrument
      where code = inst_rec.code;

if iNum = 0 then
            inst_rec.reag_usage := getField('REAG_USAGE');
            inst_rec.meth_usage := getField('METH_USAGE');
            inst_rec.manu := getField('MANU');
            inst_rec.instc_id := getField('INSTC_ID');

select count(*) into iNum
            from inst_class
            where id = inst_rec.instc_id;
            if iNum = 0 then
                    inst_rec.instc_id := null;
            end if;

inst_rec.name := getField('NAME');

insert into instrument
                    (code, name, reag_usage, meth_usage, manu,
                     instc_id, last_touch)
            values
                    (inst_rec.code, inst_rec.name, inst_rec.reag_usage,
                     inst_rec.meth_usage,inst_rec.manu,
                     inst_rec.instc_id, sysdate);
      end if;
end if;

if upper(cTableName) = 'LOT' then
      lot_rec.lot_number := getField('LOT_NUMBER');
```

```
        select count(*) into iNum
        from lot
        where lot_number = lot_rec.lot_number;

if iNum = 0 then
                lot_rec.lot_level := getField('LOT_LEVEL');
                lot_rec.expir_date := getField('EXPIR_DATE');
                lot_rec.level_desc := getField('LEVEL_DESC');
                lot_rec.matl_id := getField('MATL_ID');

select count(*) into iNum
                from ctl_material
                where id = lot_rec.matl_id;

if iNum = 0 then
                        lot_rec.matl_id := null;
                end if;

insert into lot
                (lot_number, lot_level, expir_date, level_desc,
                 matl_id, last_touch)
                values
                (lot_rec.lot_number, lot_rec.lot_level,
                 lot_rec.expir_date, lot_rec.level_desc,
                 lot_rec.matl_id, sysdate);
        end if;
end if;

if upper(cTableName) = 'METHOD' then
        mth_rec.code := getField('CODE');

select count(*) into iNum
        from method
        where code = mth_rec.code;

if iNum = 0 then
                mth_rec.name := getField('NAME');
                insert into method
                (code, name, last_touch)
                values
                (mth_rec.code, mth_rec.name, sysdate);
        end if;
end if;

if upper(cTableName) = 'REAGENT' then
        reag_rec.code := getField('CODE');

select count(*) into iNum
```

```
            from reagent
            where code = reag_rec.code;

if iNum = 0 then
                reag_rec.name := getField('NAME');
                insert into reagent
                (code, name, last_touch)
                values
                (reag_rec.code, reag_rec.name, sysdate);
            end if;
    end if;

if upper(cTableName) = 'TEST' then
            tst_rec.code := getField('CODE');

select count(*) into iNum
            from test
            where code = tst_rec.code;

if iNum = 0 then
                tst_rec.name := getField('NAME');
                insert into test
                (code, name, last_touch)
                values
                (tst_rec.code, tst_rec.name, sysdate);
            end if;
    end if;

if upper(cTableName) = 'UNIT' then
            uni_rec.test_code := getField('TEST_CODE');
            uni_rec.description := getField('DESCRIPTION');

select count(*) into iNum
            from unit
            where test_code = uni_rec.test_code
            and description = uni_rec.description;

if iNum = 0 then
            select max(id) into iId
                from unit;

if iId is null then
                    iId := 1;
                else
                    iId := iId + 1;
                end if;
                uni_rec.conv_factor := getField('CONV_FACTOR');
                uni_rec.default_dp := getField('DEFAULT_DP');
```

```
            uni_rec.unit_type := getField('UNIT_TYPE');
            insert into unit
            (id, description, test_code, conv_factor, default_dp, last_touch)
            values
            (ild, uni_rec.description, uni_rec.test_code,
             uni_rec.conv_factor, uni_rec.default_dp, sysdate);
        end if;
    end if;

exception
    when others then
        htp.p('rtqc_sync.insertTable: Error');
end;
*/
end;
```

What is claimed and desired to be secured by Letters Patent is as follows:

1. A method for evaluating a hematology analyzer by comparing data generated by performing an operation on the analyzer and stored in a client database on a client computer, with data generated by performing the operation on like analyzers, comprising the steps of:

collecting group data generated by performing substantially the same operation on a group of like instruments;

storing said group data in a global database on a server computer;

conducting said operation on an individual like instrument and generating individual data from said operation;

accessing said global database and retrieving said group data corresponding to said individual data;

transferring said retrieved group data to said client database; and comparing said individual data with said group data.

2. A method as set forth in claim 1, wherein said collecting step comprises grouping said data into categories for comparative analysis.

3. A method as set forth in claim 2, wherein said grouping step includes categorizing said data by at least one of geographic region, instrument type, composition utilized, and time period of collection.

4. A method as set forth in claim 1, wherein said step of accessing further comprises storing at least a portion of said retrieved group data in said client database before performing said comparing step.

5. A method as set forth in claim 2, wherein said retrieving step includes selecting a subset of said group data according to a parameter.

6. A method as set forth in claim 5, wherein said parameter is a specified group of instruments.

7. A method as set forth in claim 5, wherein said parameter is a specified geographic area.

8. A method as set forth in claim 5, wherein said parameter is a specified test procedure.

9. A method as set forth in claim 5, wherein said parameter is a specified time period.

10. A method as set forth in claim 1, wherein said accessing step comprises transmitting said individual data from said client computer to said server computer and storing said individual data in said global database before retrieving said group data so that said group data in said accessing step includes said individual data.

11. A computer-readable medium having computer-executable instructions for performing the method recited in claim 1.

12. A computing system having a memory and a processor, said processor being operable to execute the instructions for the method recited in claim 1.

13. A method for evaluating a hematology analyzer by comparing individual data generated by performing an operation on the analyzer and stored in a client database on a client computer, with group data generated by performing the operation on a group of like instruments and storing the data in a global database on a server computer, comprising the steps of:

conducting the like operation on an individual like instrument and generating individual data from said operation;

accessing the global database and retrieving group data corresponding to said individual data; and transferring said retrieved group data to said client database at said client computer; and comparing said individual data on said client computer with said group data.

14. A method for evaluating a hematology analyzer by comparing individual data generated by performing an operation on the analyzer and stored in a client database on a client computer with group data generated by performing the operation on a group of like instruments, comprising the steps of:

collecting group data generated by performing substantially the same operation on a group of like instruments;

storing said group data in a global database on a server computer; and transferring said group data from said global database corresponding to individual data for a hematology analyzer to a client computer having a client database containing the individual data to enable a comparison of the individual data with said group data.

* * * * *